(12) United States Patent
Belmabkhout et al.

(10) Patent No.: US 10,751,691 B2
(45) Date of Patent: Aug. 25, 2020

(54) METAL ORGANIC FRAMEWORKS FOR GAS SEPARATION APPLICATIONS

(71) Applicant: King Abdullah University of Science and Technology, Thuwal (SA)

(72) Inventors: Youssef Belmabkhout, Thuwal (SA); Mohamed Eddaoudi, Thuwal (SA); Dalal A. Alezi, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 0 days.

(21) Appl. No.: 16/239,669

(22) Filed: Jan. 4, 2019

(65) Prior Publication Data

US 2019/0224643 A1    Jul. 25, 2019

Related U.S. Application Data

(63) Continuation-in-part of application No. 15/506,331, filed as application No. PCT/US2015/046756 on Aug. 25, 2015.

(Continued)

(51) Int. Cl.
*B01D 53/72* (2006.01)
*B01D 53/02* (2006.01)
(Continued)

(52) U.S. Cl.
CPC ....... *B01J 20/226* (2013.01); *B01J 20/28033* (2013.01); *C10L 3/103* (2013.01); *C10L 3/104* (2013.01); *C07F 5/003* (2013.01); *C07F 5/069* (2013.01); *C07F 15/025* (2013.01); *C10L 2200/0286* (2013.01); *C10L 2200/04* (2013.01); *C10L 2290/542* (2013.01)

(58) Field of Classification Search
None
See application file for complete search history.

(56) References Cited

U.S. PATENT DOCUMENTS

| 9,102,691 B2 | 8/2015 | Zhou et al. |
| 9,724,668 B2 | 8/2017 | Zhou et al. |
| 10,322,402 B2 | 6/2019 | Alezi et al. |

FOREIGN PATENT DOCUMENTS

WO    2016033086 A1    3/2016

OTHER PUBLICATIONS

Allen, "The Cambridge Structural Database: A Quarter of a Million Crystal Structures and Rising", Acta Crystallographica Section B, Structural Science, vol. 58, 2002, pp. 380-388.

(Continued)

*Primary Examiner* — Daniel Berns
(74) *Attorney, Agent, or Firm* — Billion & Armitage; Gregory S. Schwartz

(57) ABSTRACT

Embodiments of the present disclosure describe a method of sorbing one or more compounds from a $H_2S$-containing fluid comprising contacting a M-soc-MOF composition with a fluid containing at least $H_2S$ and one or more $C_{2+}$ compounds; and sorbing at least one of the one or more $C_{2+}$ compounds from the fluid. Embodiments of the present disclosure further describe a method of sorbing one or more compounds from a fluid comprising contacting a M-soc-MOF composition with a fluid containing at least $H_2S$ and one or more of $CO_2$ and $CH_4$; and sorbing at least $H_2S$ from the fluid.

10 Claims, 62 Drawing Sheets

Related U.S. Application Data

(60) Provisional application No. 62/614,030, filed on Jan. 5, 2018, provisional application No. 62/041,516, filed on Aug. 25, 2014.

(51) Int. Cl.

| | | |
|---|---|---|
| *B01D 53/14* | (2006.01) | |
| *B01D 53/44* | (2006.01) | |
| *B01D 53/80* | (2006.01) | |
| *B01D 53/81* | (2006.01) | |
| *B01D 53/96* | (2006.01) | |
| *C10L 3/06* | (2006.01) | |
| *C10L 3/10* | (2006.01) | |
| *B01J 31/16* | (2006.01) | |
| *B01J 20/22* | (2006.01) | |
| *B01J 20/28* | (2006.01) | |
| *C07F 15/02* | (2006.01) | |
| *C07F 5/06* | (2006.01) | |
| *C07F 5/00* | (2006.01) | |

(56) References Cited

OTHER PUBLICATIONS

Barthelet, et al., "[VIII(H2O)]3O(O2CC6H4CO2)3—(Cl, 9H2O) (MIL-59): A Rare Example of Vanadocarboxylate with a Magnetically Frustrated Three-Dimensional Hybrid Framework", Chemical Communications, Jun. 11, 2002, pp. 1492-1493.

Brant, et al., "Single-Metal-Ion-Based Molecular Building Blocks (MBBs) Approach to the Design and Synthesis of Metal-Organic Assemblies", Journal of Molecular Structure, vol. 796, 2006, pp. 160-164.

Brown, et al., "Quantum Rotation of Hydrogen in Single-Wall Carbon Nanotubes", Chemical Physics Letters, vol. 329, 2000, pp. 311-316.

Cote, et al., "Porous, Crystalline, Covalent Organic Frameworks", Science, vol. 310, Nov. 18, 2005, pp. 1166-1170.

Dybtsev, et al., "Rigid and Flexible: A Highly Porous Metal-Organic Framework with Unusual Guest-Dependent Dynamic Behavior", Angewandte Chemie International Edition, vol. 43, 2004, pp. 5033-5036.

Eddaoudi, et al., "Geometric Requirements and Examples of Important Structures in the Assembly of Square Building Blocks", PNAS, vol. 99, No. 8, Apr. 16, 2002, pp. 4900-4904.

Eddaoudi, et al., "Modular Chemistry: Secondary Building Units as a Basis for the Design of Highly Porous and Robust Metal-Organic Carboxylate Frameworks", Accounts of Chemical Research,. vol. 34, No. 4, Feb. 17, 2001, pp. 319-330.

Evans, et al., "Crystal Engineering of NLO Materials Based on Metal-Organic Coordination Networks", Accounts of Chemical Research, vol. 35, No. 7, Apr. 20, 2002, pp. 511-522.

Ferey, et al., "A Chromium Terephthalate-Based Solid with Unusually Large Pore Volumes and Surface Area", Science, vol. 309, Sep. 23, 2005, pp. 2040-2042.

Ferey, et al., "A Hybrid Solid with Giant Pores Prepared by a Combination of Targeted Chemistry, Simulation, and Powder Diffraction", Angewandte Chemie International Edition, vol. 43, 2004, pp. 6296-6301.

Ferey, et al., "Crystallized Frameworks with Giant Pores: Are There Limits to the Possible?", Accounts of Chemical Research, vol. 38, No. 4, Jan. 19, 2005, pp. 217-225.

Ferey, et al., "Hydrogen Adsorption in the Nanoporous Metal-Benzenedicarboxylate M(OH)(O2C—C6H4—CO2) (M=Al3+, Cr3+), MIL-53", Chemical Communications, vol. 24, Nov. 4, 2003, pp. 2976-2977.

Forster, et al., "Hydrogen Adsorption in Nanoporous Nickel(II) Phosphates", Journal of the American Chemical Society, vol. 125, Jan. 10, 2003, pp. 1309-1312.

Fujita, et al., "Coordination Assemblies from a Pd(II)-Cornered Square Complex", Accounts of Chemical Research, vol. 38, No. 4, Feb. 15, 2005, pp. 371-380.

Hirsch, et al., "Spherical Aromaticity of Inorganic Cage Molecules", Angewandte Chemie International Edition, vol. 40, No. 15, 2001, pp. 2834-2838.

Kahn, "Chemistry and Physics of Supramolecular Magnetic Materials", Accounts of Chemical Research, vol. 33, No. 10, Oct. 2000, pp. 647-657.

Kaye, et al., "Hydrogen Storage in the Dehydrated Prussian Blue Analogues M3[Co(CN)6]2 (M=Mn, Fe, Co, Ni, Cu, Zn)", Journal of the American Chemical Society, vol. 127, Apr. 15, 2005, pp. 6506-6507.

Kitagawa, et al., "Functional Porous Coordination Polymers", Angewandte Chemie International Edition, vol. 43, 2004, pp. 2334-2375.

Lee, et al., "Achieving High Density of Adsorbed Hydrogen in Microporous Metal Organic Frameworks", Advanced Materials, vol. 17, 2005, pp. 2703-2706.

Lee, et al., "Gas Sorption Properties of Microporous Metal Organic Frameworks", Journal of Solid State Chemistry, vol. 178, 2005, pp. 2527-2532.

Li, et al., "Coordinatively Unsaturated Metal Centers in the Extended Porous Framework of Zn3(BDC)3.6CH3OH (BDC=1,4-Benzenedicarboxylate)", Journal of the American Chemical Society, vol. 120, No. 9, Feb. 20, 1998, pp. 2186-2187.

Li, et al., "Design and Synthesis of an Exceptionally Stable and Highly Porous Metal-Organic Framework", Nature, vol. 402, Nov. 18, 1999, pp. 276-279.

Liu, et al., "4-Connected Metal-Organic Assemblies Mediated via Heterochelation and Bridging of Single Metal Ions: Kagome Lattice and the M6L12 Octahedron", Journal of the American Chemical Society, vol. 127, Apr. 27, 2005, pp. 7266-7267.

Liu, et al., "Molecular Building Blocks Approach to the Assembly of Zeolite-Like Metal-Organic Frameworks (ZMOFs) With Extra-Large Cavities", Chemical Communications, Feb. 2, 2006, pp. 1488-1490.

MacGillivray, et al., "A Chiral Sphericalmolecular Assembly Held Together by 60 Hydrogen Bonds", Nature, vol. 389, Oct. 2, 1997, pp. 469-472.

Moon, et al., "Redox-Active Porous Metal-Organic Framework Producing Silver Nanoparticles from AgI Ions at Room Temperature", Angewandte Chemie International Edition, vol. 44, 2005, pp. 1261-1265.

Moulton, et al., "Crystal Engineering of a Nanoscale Kagome Lattice", Angewandte Chemie, vol. 114, No. 15, 2002, pp. 2945-2948.

Moulton, et al., "From Molecules to Crystal Engineering: Supramolecular Isomerism and Polymorphism in Network Solids", Chemical Reviews, vol. 101, No. 6, May 12, 2001, pp. 1629-1658.

Nicol, et al., "Dynamics of Molecular Hydrogen Adsorbed in CoNa—A Zeolite", Journal of Physical Chemistry, vol. 92, 1988, pp. 7117-7121.

O'Keeffe, et al., "Frameworks for Extended Solids: Geometrical Design Principles", Journal of Solid State Chemistry, vol. 152, 2000, pp. 3-20.

Ren, et al., "Neutron Scattering Study of H2 Adsorption in Single-Walled Carbon Nanotubes", Applied Physics Letters, vol. 79, No. 22, Nov. 26, 2001, pp. 3684-3686.

Rosi, et al., "Hydrogen Storage in Microporous Metal-Organic Frameworks", Science, vol. 300, May 16, 2003, pp. 1127-1129.

Rowsell, et al., "Characterization of H2 Binding Sites in Prototypical Metal-Organic Frameworks by Inelastic Neutron Scattering", Journal of the American Chemical Society, vol. 127, 2005, pp. 14904-14910.

Seidel, et al., "High-Symmetry Coordination Cages via Self-Assembly", Accounts of Chemical Research, vol. 35, No. 11, Aug. 21, 2002, pp. 972-983.

Seo, et al., "A Homochiral Metal-Organic Porous Material for Enantioselective Separation and Catalysis", Nature, vol. 404, Apr. 27, 2000, pp. 982-986.

(56) References Cited

OTHER PUBLICATIONS

Silvera, "The Solid Molecular Hydrogens in the Condensed Phase: Fundamentals and Static Properties", Reviews of Modern Physics, vol. 52, No. 2, Part I, Apr. 1980, pp. 393-452.
Sudik, et al., "Metal-Organic Frameworks Based on Trigonal Prismatic Building Blocks and the New "acs" Topology", Inorganic Chemistry, vol. 44, No. 9, Mar. 31, 2005, pp. 2998-3000.
Volkringer, et al., "A New Indium Metal-Organic 3D Framework With 1,3,5-Benzenetricarboxylate, MIL-96 (In), Containing µ3-Oxo-Centered Trinuclear Units and a Hexagonal 18-Ring Network", Materials Research Bulletin, vol. 41, 2006, pp. 948-954.
Wang, et al., "Design, Synthesis, and Photochemical Behavior of Poly(benzyl ester) Dendrimers with Azobenzene Groups Throughout Their Architecture", Journal of Organic Chemistry, vol. 69, No. 26, Dec. 1, 2004, pp. 9073-9084.
Wu, et al., "A Homochiral Porous Metal-Organic Framework for Highly Enantioselective Heterogeneous Asymmetric Catalysis", Journal of the American Chemical Society, vol. 127, No. 25, Jun. 4, 2005, pp. 8940-8941.
Yaghi, et al., "Construction of a New Open-Framework Solid From 1,3,5-Cyclohexanetricarboxylate and Zinc(II) Building Blocks", Journal of the Chemical Society, Dalton Transactions, Jan. 1, 1997, pp. 2383-2384.
Yaghi, et al., "Reticular Synthesis and the Design of New Materials", Nature, vol. 423, Jun. 12, 2003, pp. 705-714.
Yaghi, et al., "Selective Guest Binding by Tailored Channels in a 3-D Porous Zinc(II)-Benzenetricarboxylate Network", Journal of the American Chemical Society, vol. 119, No. 12, 1997, pp. 2861-2868.
Yang, et al., "Zinc Phosphate with Gigantic Pores of 24 Tetrahedra", Journal of the American Chemical Society, vol. 121, Aug. 31, 1999, pp. 8389-8390.
Zhao, et al., "Hysteretic Adsorption and Desorption of Hydrogen by Nanoporous Metal-Organic Frameworks", Science, vol. 306, Nov. 5, 2004, pp. 1012-1015.
"International Search Report and Written Opinion", International Application No. PCT/US2015/046756, dated Nov. 2, 2015, 10 pages.
Babarao, et al., "Molecular simulations for adsorptive separation of CO2/CH4 Mixture in metal-exposed, catenated, and charged metal-Organic Frameworks", Langmuir Article, 2009, 5239-5247.
Belmabkhout, et al., "Simultaneous Adsorption of H2S and CO2 on Triamine-Grafted Pore-Expanded Mesoporous MCM-41 Silica", Energy Fuels 2011, 25, 1310-1315.
Christophe, et al., "Synthesis, Single-Crystal X-ray Microdiffraction, and NMR Characterizations of the Giant Pore Metal-Organic Framework Aluminum Trimesate MIL-100", Chemistry of Materials Communication, American Chemical Society, 2009, 5695-5697.
Felipe, et al., "High Methane Storage Capacity in Aluminum Metal-Organic Frameworks", Journal of the American Chemical Society, 2014, 5271-5274.
Hiroyasu, et al., "Ultrahigh Porosity in Metal-Organic Frameworks", Science, vol. 329, Jul. 23, 2010, 424-429.
Liu, et al., "Assembly of metal-organic frameworks (MOFs) based on indium-timer building blocks: A porous MOF with soc Topology and High hydrogen storage", Angew.Chem. Int., Ed., 2007, 3278-3283.
Liu, et al., "Assembly of Metal-organic Frameworks (MOFs) Based on Indium-Trimr Building Blocks: a Porous MOF with soc Topology and High Hydrogen Storage", Angew. Chem. Int. Ed. 2007, 46, 3278-3283.
Moeller, et al., "Insights on Adsorption Characterization of Metal-Organic Frameworks: A benchmark Study on the Novel soc-MOF", Microporous and Mesoporous Materials, 2010, 345-353.
Mohamed, et al., "Zeolite-like metal—organic frameworks (ZMOFs): design, synthesis, and properties", Chem Soc Rev, Royal Society of Chemistry, 2015, 228-249.
Morris, et al., "Gas Storage in Nanoporous Materials", Gas Storage Materials, Angewandte Chemie Int. Ed., 2008, 4966-4981.

Mowat, et al., "Synthesis, characterisation and adsorption properties of microporous scandium carboxylates with ridig and flexible frameworks", Microporous and Mesoporous Materials, 2011, 322-333.
Mueller, et al., "Metal-organic frameworks—prospective industrial applications", Journal of Materials Chemistry, 2006, 626-636.
Pang, et al., "Highly monodisper M'-based soc-MOFs(M=In and Ga) with cubic and truncated cubic morphologies", Journal of the American Chemical Society, 2012, 13176-13179.
Peng, et al., "Computational screening of porous carbons, zeolites, and metal organic frameworks for desulfurization and decarburization of biogas, natural gas, and flue gas", AIChE Journal, Aug. 2013, 2928-2942.
Thomas, et al., "High valence 3p and transition metal based MOFs", Chem Soc Rev, Royal Society of Chemistry, 2014, 6097-6115.
Vincent, et al., "A Supermolecular building approach for the design and construction of metal-organic frameworks", Chem Soc Rev, Royal Society of Chemistry, 2014, 6141-6172.
Yabing, et al., "Methane storage in metal-organic frameworks", Chem Soc Rev, Royal Society of Chemistry, 2014, 5657-5678.
Yu, et al., "High Pressure Excess Isotherms for Adsorption of Oxygen and Nitrogen in Zeolites", Langmuir, 2011, 10648-10656.
"International Search Report and Written Opinion", International Application No. PCT/US2015/059383, dated Mar. 24, 2016, 15 pages.
Bae, "Carborane-based metal-organic frameworks as highly selective sorbents for CO2 over methane", Chem. Commun., 2008, 4135-4137.
Bloch, et al., "Hydrocarbon Separations in a Metal-Organic Framework with Open Iron(II) Coordination Sites", Mar. 30, 2012, vol. 335, 1606-1610.
Bourrelly, et al., "Different Adsorption Behaviors of Methane and Carbon Dioxide in the Isotypic Nanoporous Metal Terephthalates MIL-53 and MIL-47", J. Am. Chem. Soc. Sep. 13, 2005, 127, 13519-13521.
Eddaoudi, et al., "Systematic Design of Pore Size and Functionality in Isoreticular MOFs and Their Application in Methane Storage", Science, vol. 295, Jan. 18, 2002, 469-472.
Hamon, et al., "Comparative Study of Hydrogen Sulfide Adsorption in the MIL-53(Al, Cr, Fe), MIL-47(V), MIL-100(Cr), and MIL-101(Cr) Metal-Organic Frameworks at Room Temperature", J. Am. Chem. Soc. 2009, 131, 8775-8777.
Leclerc, et al., "Infrared study of the influence of reducible iron(III) metal sites on the adsorption of CO, CO2, propane, propene and propyne in the mesoporous metal-organic framework MIL-100w", Phys. Chem. Chem. Phys., 2011, 13, 11748-11756.
Lee, et al., "A Comparison of the H2 Sorption Capacities of Isostructural Metal-Organic Frameworks With and Without Accessible Metal Sites: [{Zn2(abtc)(dmf)2}3] and [{Cu2(abtc)(dmf)2}3] versus [{Cu2(abtc)}3]", Angew. Chem. Int. Ed. 2008, 47, 7741-7745.
Li, et al., "Selective gas adsorption and separation in metal-organic frameworks", Chem. Soc. Rev., 2009, 38, 1477-1504.
Matsuda, et al., "Highly controlled acetylene accommodation in a metal-organic microporous material", Nature, vol. 436, Jul. 14, 2005, 238-241.
Mendes, et al., "Separation of Hexane Isomers on Rigid Porous Metal Carboxylate-Based Metal-Organic Frameworks", Adsorption Science & Technology vol. 32 No. 6 2014, 475-488.
Noro, et al., "A new, Methane Adsorbent, Porous Coordination Polymer [{CuSiF6(4,4'-bipyridine)2}]", Angew. Chem. Int. Ed. 2000, 39, No. 12 2081-2084.
Safarik, et al., "Olefin/Paraffin Separations by Reactive Absorption: A Review", Ind. Eng. Chem. Res. 1998, 37, 2571-2581.
Xiang, et al., "Rationally tuned micropores within enantiopure metal-organic frameworks for highly selective separation of acetylene and ethylene", nature communications, Feb. 22, 2011, 7 pages.
Yoon, et al., "Controlled Reducibility of a Metal-Organic Framework with Coordinatively Unsaturated Sites for Preferential Gas Sorption", Angew. Chem. Int. Ed. 2010, 49, 5949-5952.
Zhang, et al., "Microporous metal-organic frameworks for acetylene storage and separation", CrystEngComm, 2011, 13, 5983.

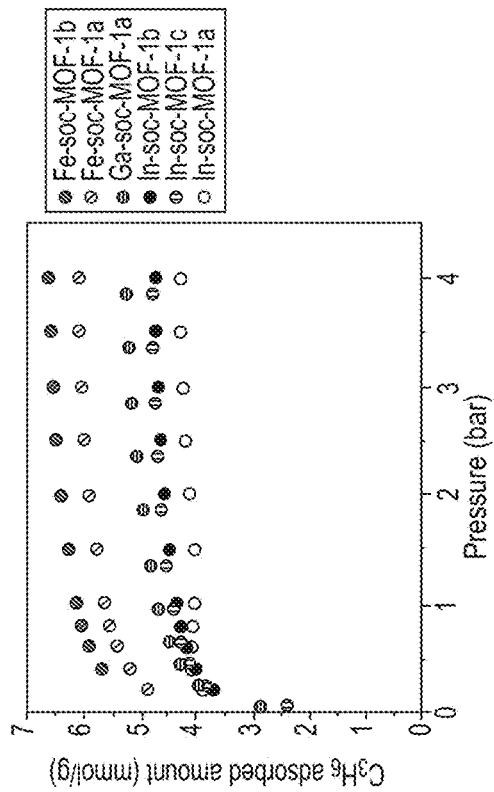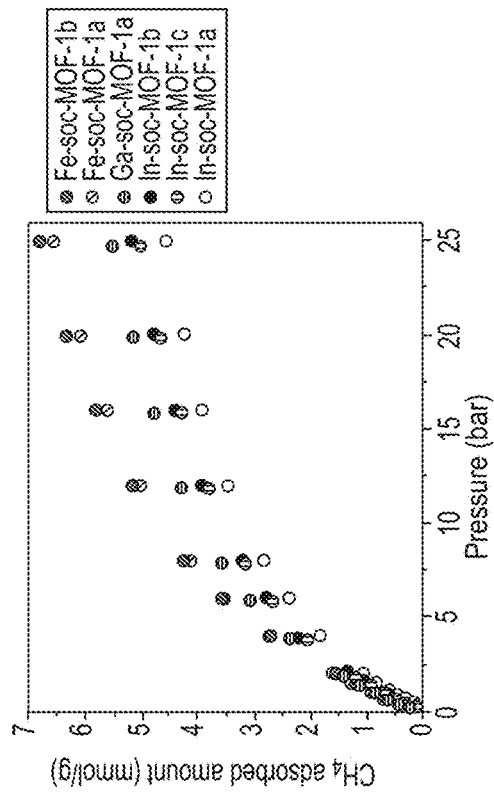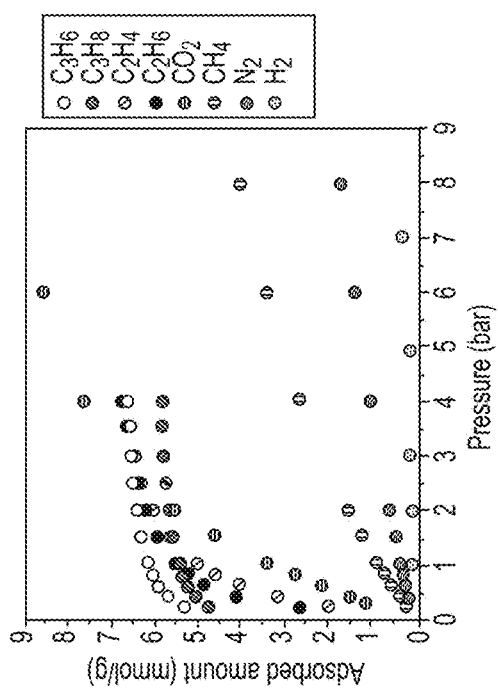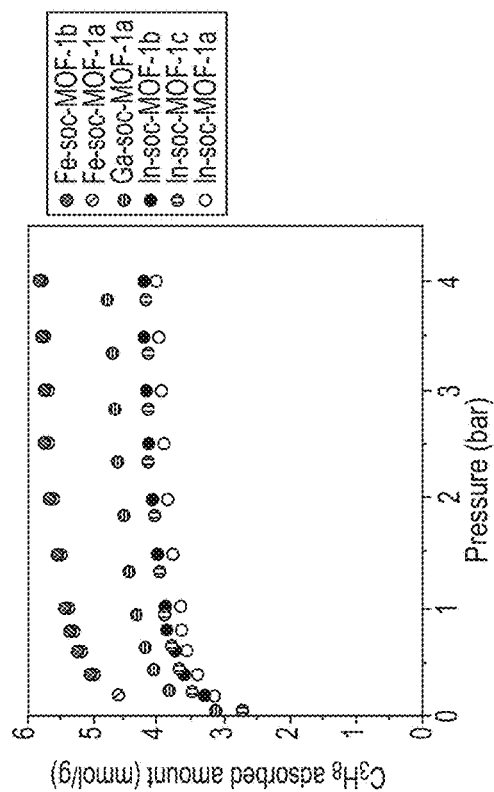
FIG. 10a
FIG. 10b
FIG. 10c
FIG. 10d

METAL ORGANIC FRAMEWORKS FOR GAS SEPARATION APPLICATIONS

BACKGROUND

Gas feedstocks, such as refinery-off gases (ROG) and natural gas (NG), are important sources for the production of light valuable commodities, including $H_2$ and $CH_4$, which are used to feed most catalytic processes in the petrochemical industry. Moreover, ROG and NG are prime sources for the isolation of polymer/chemical-grade light olefins and other paraffins, such as ethane, propane and n-butane ($C_{2+}$).

Accordingly, the upgrading of ROG and NG, i.e., the elimination of various undesirable gas components, to valuable commodities, such as $H_2$, $CH_4$ and polymer-grade $C_2H_4$ and $C_3H_6$, is of prime importance and remains a major challenge facing oil and gas engineers/technologists in gas plants. Practically, ROG are collected from a variety of units in oil refineries, and the associated quality/quantity depends on the crude oil composition and the type of refining/separation/purification processes being implemented. Essentially, the ROG stream is mainly generated in the cracking units, where the long-chain hydrocarbon products are cracked to produce shorter molecular chains or lighter hydrocarbon components. Thus, the ROG are composed of various feedstocks and, if recovered, are of economic value as a prospective added revenue for refineries and petrochemical complexes. Namely, recovered $H_2$ supplies hydrocracking processes for the production of valuable olefins and additional gasoline fractions from heavy fractions, whereas $CH_4$ and $C_{2+}$ are used as feedstocks in catalytic reforming and polyolefin production. Because the compositions of ROG and NG are relatively complex (Tables 1 and 2), the recovery of the valuable products with high purity and the desired specifications can be intricate.

TABLE S1

Typical composition of refinery-off gas (ROG)

| Components of ROG | Typical ROG Composition |
|---|---|
| $H_2$ | ~5-35% |
| CO | 0.1-0.5% |
| $N_2$ | 3-10% |
| $CO_2$ | 0.1-0.5% |
| $CH_4$ | 30-50% |
| $C_2H_2$ | 1-15 ppm (vol) |
| Ethylene | 5-20% |
| Ethane | 15-25% |
| Methyl acetylene & propadiene | 60-80 ppm (vol) |
| Propane | 1-5% |
| Propylene | 1-5% |
| Butadiene | 0-0.1% |
| Butylene | 0.1-0.3% |
| Butanes | 0.5-1% |
| $C_{5+}$ | 0.2-1.5% |

TABLE 2

Typical composition of natural gas

| Natural Gas Components | Typical Raw Natural Gas Composition | Natural Gas Pipeline Specifications |
|---|---|---|
| $CH_4$ | ~70-90% | >96% |
| $CO_2$ | Up to 10% | <2% |
| Total inerts ($N_2$, $CO_2$) | Up to 50% | <4% |
| $H_2S$ | Up to 20% | <4 ppm |
| $H_2O$ | Saturated | <120 ppm |
| $C_{2+}$ hydrocarbons | Up to 20% | 950-1,050 Btu/scf Dew point <-20° C. |

For instance, the $H_2$ and $CH_4$ contained in the ROG must be separated from $C_{2+}$ and $H_2S$, whereas $C_3H_6$ must be $H_2S$ free to be used as a feedstock for the production of polymers. Clearly, the presence of acid gases, such as $H_2S$, makes ROG and NG upgrading schemes complex and multistage operations, particularly with regard to the poisoning of the adsorbent/catalysts used in ROG processing.

Various approaches have been deployed to tackle these challenging separations, including membrane and/or adsorbent technologies. ROG and NG upgrades are mainly accomplished using energy-intensive separations, such as distillation and chemical-based absorption. Several recent studies have suggested the potential to reduce the high-energy penalty via deploying a new generation of advanced physical adsorbents. In this context, porous solid adsorbents have great potential for gas/vapor separations, driven either by (i) equilibrium, (ii) kinetics processes, (iii) a combination thereof and/or molecular sieving. The successful deployment of any of the aforementioned separation mechanisms is directly correlated to the ability to fine-tune the pore aperture size and/or functionality in a selected porous material.

Metal-organic frameworks (MOFs) have received considerable attention as adsorbents or membranes for gas separation applications. This relatively new family of hybrid porous solids has been explored for the selective adsorption of hydrocarbon mixtures based on different separation mechanisms. Essentially, equilibrium-based processes are the conventional routes for hydrocarbon separation using MOFs. Recently, kinetics and full molecular sieving based-separations of hydrocarbons have been reported using MOF adsorbents because of their unique tunable structural/chemical features with respect to the other classes of porous materials.

Although a wide assortment of MOF modulations for targeted separation have already been proposed, combined experimental and theoretical studies focusing on this family of materials for the selective ad-sorption of hydrocarbons (vs $CH_4$ and $H_2$) are scarce. Furthermore, only a very limited number of MOFs have been shown to retain their structural integrity and stability upon $H_2S$ adsorption. The highly challenging pre-treatment (prior to the olefin-paraffin separation) of ROG (or NG) using MOFs as adsorbents/membranes for the production of high-purity $H_2$, $CH_4$ and polymer-grade $C_{2+}$ streams has not been considered previously.

SUMMARY

In general, embodiments of the present disclosure describe methods of capturing one or more compounds from a fluid.

Accordingly, embodiments of the present disclosure describe methods of sorbing one or more compounds from a fluid comprising contacting a M-soc-MOF composition with a fluid and sorbing one or more compounds from the fluid.

Embodiments of the present disclosure further describe a method of sorbing one or more compounds from a $H_2S$-containing fluid comprising contacting a M-soc-MOF composition with a fluid containing at least $H_2S$ and one or more other chemical species and sorbing one or more $C_{2+}$ compounds from the fluid.

Embodiments of the present disclosure also describe a method of sorbing one or more compounds from a $CO_2$- and/or $CH_4$-containing fluid comprising contacting a M-soc-MOF composition with a fluid containing at least $H_2S$ and one or more of $CO_2$ and $CH_4$ and sorbing at least $H_2S$ from the fluid.

The details of one or more examples are set forth in the description below. Other features, objects, and advantages will be apparent from the description and from the claims.

BRIEF DESCRIPTION OF DRAWINGS

This written disclosure describes illustrative embodiments that are non-limiting and non-exhaustive. In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

Reference is made to illustrative embodiments that are depicted in the figures, in which:

FIGS. 10A-10D are graphical views of adsorption isotherms: (a) adsorption of $H_2$, $N_2$, $CH_4$, $C_2H_6$, $C_2H_6$, $C_3H_8$ and $C_3H_6$ on Fe-soc-MOF-1b and adsorption of $C_3H_6$ (b), $C_3H_8$ (c) and $CH_4$ (d) on all $In^{3+}$, $Fe^{3+}$ and $Ga^{3+}$ soc-MOF analogues at 298 K, according to one or more embodiments of the present disclosure.

DETAILED DESCRIPTION

Figure 1:
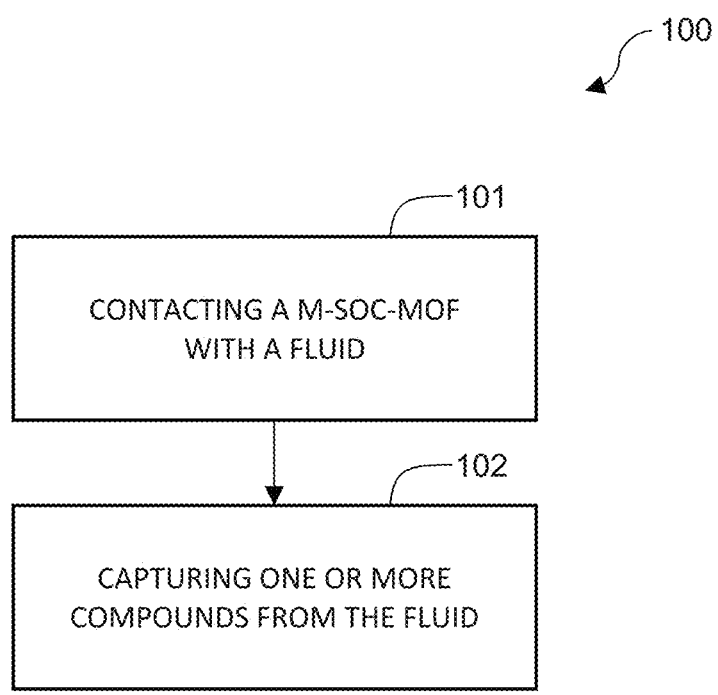
FIG. 1 is a flowchart of a method of sorbing one or more compounds from a fluid, according to one or more embodiments of the present disclosure.

The invention of the present disclosure relates to methods of separating one or more compounds using sorbent materials based on a series of isostructural metal-organic frameworks with soc topology. The series of isostructural metal-organic frameworks with soc topology (M-soc-MOFs) may include one or more trivalent metals, including, but not limited to, one or more of $In^{3+}$, $Fe^{3+}$, $Ga^{3+}$, and $Al^{3+}$. The M-soc-MOFs may host one or more extra-framework counter-ions, including, but not limited to, one or more of $NO_3^-$, $Cl^-$, $Br^-$, and $OH^-$. The ability to select the intra-framework metal and/or extra-framework counter-ion permits fine-tuning and fabrication of equilibrium-based M-soc-MOFs with unprecedented dual chemical stability and gas/vapor selectivity suitable for upgrading various gas feedstocks, such as refinery-off gases (ROG) and natural gas (NG). For example, in some embodiments, the M-soc-MOFs may be used for separation-based production of high-quality hydrocarbons ($CH_4$, $C_3H_8$, and n-$C_4H_{10}$) and olefins from $H_2S$-containing gas streams. In other embodiments, the M-soc-MOFs may be used for the selective adsorption of $H_2S$ in $CO_2$— and $CH_4$-containing gas streams. In this way, the M-soc-MOFs of the present disclosure may be tuned to meet the requirements of a variety of gas separation/purification applications.

In general, metal organic frameworks (MOFs) are a versatile and promising class of crystalline solid state materials which allow porosity and functionality to be tailored towards various applications. For example, MOF materials exhibit exceptionally high specific surface area, in addition to tunable pore size and functionality (e.g., permselectivity toward mono-branched and n-paraffins), which make them suitable for many applications including gas storage, gas separation, catalysis, drug delivery, light-emitting devices, and sensing.

MOFs comprise a network of nodes and ligands, wherein a node has a connectivity capability at two or more functional sites, and a ligand has a connectivity capability at least at two functional sites, each of which connect to a node. Nodes are typically metal ions or metal containing clusters. In some instances, ligands with node connectivity capability at two or more functional sites can also be characterized as nodes. In some instances, ligands can include two functional sites capable of each connecting to a node, and optionally one or more additional functional sites which do not connect to nodes within a particular framework. In some embodiments, ligands can be poly-functional, or polytopic, and comprise two or more functional sites capable of each connecting to a node. In some embodiments, polytopic ligands can be heteropolytopic, wherein at least one of the two or more functional sites differ from another functional site.

A MOF can comprise a metal-based node and an organic ligand which extrapolate to form a coordination network. Such coordination networks have advantageous crystalline and porous characteristics affecting structural integrity and interaction with foreign species (e.g., hydrocarbons). The particular combination of nodes and ligands within a framework will dictate the framework topology and functionality. Through ligand modification or functionalization, the environment in the internal pores can be modified to suit specific applications.

MOF can be represented by the formula [(node)a(ligand)b(solvent)c]n, wherein n represents the number of molecular building blocks. Solvent represents a guest molecule occupying pores within the MOF, for example as a result of MOF synthesis, and can be evacuated after synthesis to provide a MOF with unoccupied pores. Accordingly, the value of c can vary down to zero, without changing the definitional framework of the MOF. Therefore, in many instances, MOFs can be defined as [(node)a(ligand)b]n, without reference to a solvent or guest molecule component.

The M-soc-MOFs of the present disclosure offer several key attributes that are attractive for gas upgrading/separations: (i) high chemical and thermal stability associated with its relatively high porosity; (ii) the presence of accessible open metal sites that are appropriate for tuning and enhancing the strength of interactions with acid gases, particularly $H_2S$; and (iii) the presence of extra-framework anions within the cavities, which is ideal for further tuning the adsorption properties of the soc-MOF adsorbent. The M-soc-MOFs of the present disclosure as described in greater detail below thus may be used to sorb one or more compounds from a fluid.

FIG. 1 is a flowchart of a method of sorbing one or more compounds from a fluid comprising contacting 101 a M-soc-MOF composition with a fluid and sorbing 102 one or more compounds from the fluid. Contacting 101 may include mixing, bringing in close proximity, chemically contacting, physically contacting or combinations thereof. Fluids may include general liquids and gases. In some embodiments, fluids include industrial process fluids. Examples of specific fluids include one or more of refinery-off gases (ROG), natural gas (NG), and biogas. Fluids can further comprise water, including water in a liquid form, a gaseous form, or combinations thereof. In many embodiments, the fluid may include one or more chemical species. For example, the one or more chemical species may include one or more of $H_2S$, $H_2$, $O_2$, $N_2$, $CH_4$, $CO_2$, and $C_{2+}$ compounds (e.g., $C_2H_4$, $C_2H_6$, $C_3H_6$, $C_3H_8$, and $n-C_4H_{10}$). In an embodiment, the M-soc-MOF may exhibit a selectivity for $C_{2+}$ compounds over the other chemical species in the fluid. In an embodiment, the M-soc-MOF may exhibit a selectivity for $H_2S$ over one or more of $CH_4$ and $CO_2$.

In one embodiment, sorbing 102 comprises absorbing. In one embodiment, sorbing 102 comprises adsorbing. In one embodiment, sorbing 102 comprises a combination of adsorbing and absorbing. Sorbing 102 can include selective sorption (i.e., sorption of a single compound), or simultaneous sorption (e.g., sorption of a plurality of compounds). The M-soc-MOF compositions can sorb about 1% to about 99.9%, about 1% to about 90%, about 1% to about 50% or about 1% to about 30% of one or more compounds in a fluid. Sorbing 102 can occur at ambient temperature, at an elevated temperature, at a cooled temperature, or over a temperature range. In one embodiment, a temperature can be selectively changed to manipulate sorption and/or desorption of different compounds. Sorbing 102 can occur at ambient pressure, at an elevated pressure, at a cooled pressure, or over a pressure range. In one embodiment, pressure can be selectively changed to manipulate sorption and/or desorption of different compounds. In addition to or in the alternative to, a concentration of one or more M-soc-MOF compositions can be varied to affect a rate and/or magnitude of sorbing 102. One or more of temperature, pressure and M-soc-MOF concentration can be regulated to produce a simultaneous sorption of compounds, or a subsequent, step-wise sorption (i.e., in series) of compounds from a fluid. In series sorption generally includes sorbing a quantity of a first compound via a MOF, and subsequently sorbing a quantity of a second compound via the same MOF while at least a portion of the quantity of the first compound remains sorbed. Simultaneous sorption generally includes contacting a plurality of compounds with an MOF, and sorbing a quantity of each of the two compounds with the MOF.

Figure 2:
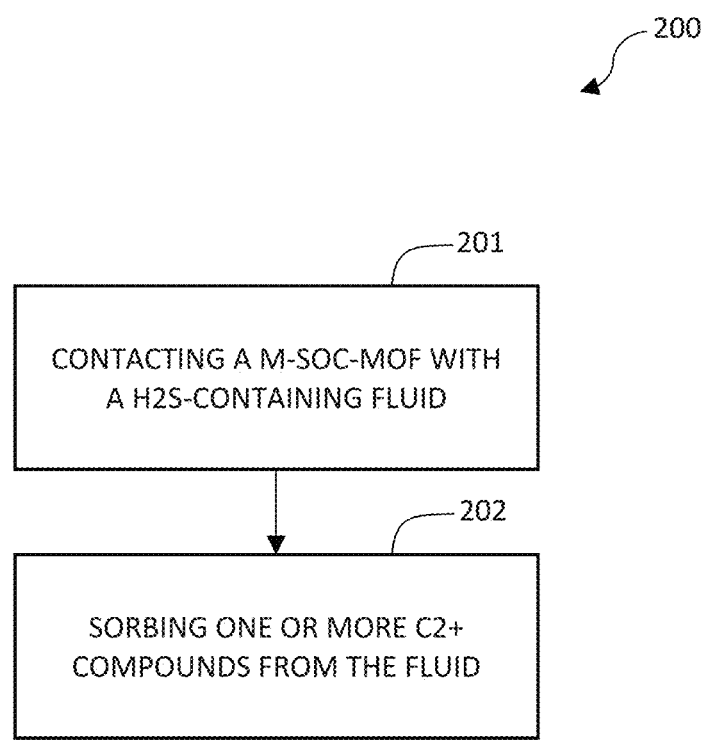
FIG. 2 is a flowchart of a method of sorbing one or more compounds from a $H_2S$-containing fluid, according to one or more embodiments of the present disclosure.

In some embodiments, the M-soc-MOFs may be used for separation-based production of high-quality hydrocarbons ($CH_4$, $C_3H_8$, and $n-C_4H_{10}$) and olefins from $H_2S$-containing gas streams. See, for example, FIG. 2, which is a flowchart of a method 200 of sorbing one or more compounds from a $H_2S$-containing fluid, according to one or more embodiments of the present disclosure. As shown in FIG. 2, the method comprises contacting 201 a M-soc-MOF with a $H_2S$-containing fluid and sorbing 202 one or more $C_{2+}$ compounds from the fluid. In some embodiments, the method further comprises sorbing $H_2S$ from the fluid. In many embodiments, the M-soc-MOFs exhibit an equilibrium-based selectivity. For example, in some embodiments, the M-soc-MOFs may be used as equilibrium-based adsorbents for the separation/purification of $H_2$, $CH_4$, and/or $C_{2+}$ fractions from $H_2S$-containing ROG and/or NG.

The fluid (e.g., $H_2S$-containing fluid) may contain one or more of $H_2S$, one or more $C_{2+}$ compounds, and one or more other chemical species. The one or more $C_{2+}$ compounds may include one or more of $C_2H_6$, $C_2H_4$, $C_3H_6$, $C_3H_8$, and $n-C_4H_{10}$. The one or more other chemical species may include one or more of $H_2$, $CH_4$, and $N_2$. In many embodiments, the M-soc-MOFs exhibit a selectivity for the one or more $C_{2+}$ compounds over the one or more other chemical species. For example, the M-soc-MOFs may exhibit a selectivity for (e.g., sorb) one or more $C_{2+}$ compounds over one or more of $CH_4$, $H_2$, and $N_2$. In many embodiments, the M-soc-MOFs exhibit a high tolerance and/or chemical stability in the presence of $H_2S$. For example, the M-soc-MOFs may maintain their structural integrities and separation performances upon exposure to $H_2S$. In other embodiments, the M-soc-MOFs exhibit a selectivity for the one or more $C_{2+}$ compounds and $H_2S$ over the one or more other chemical species. For example, the M-soc-MOFs may exhibit a selectivity for one or more $C_{2+}$ compounds and $H_2S$ over one or more of $CH_4$, $H_2$, and $N_2$.

Figure 3:
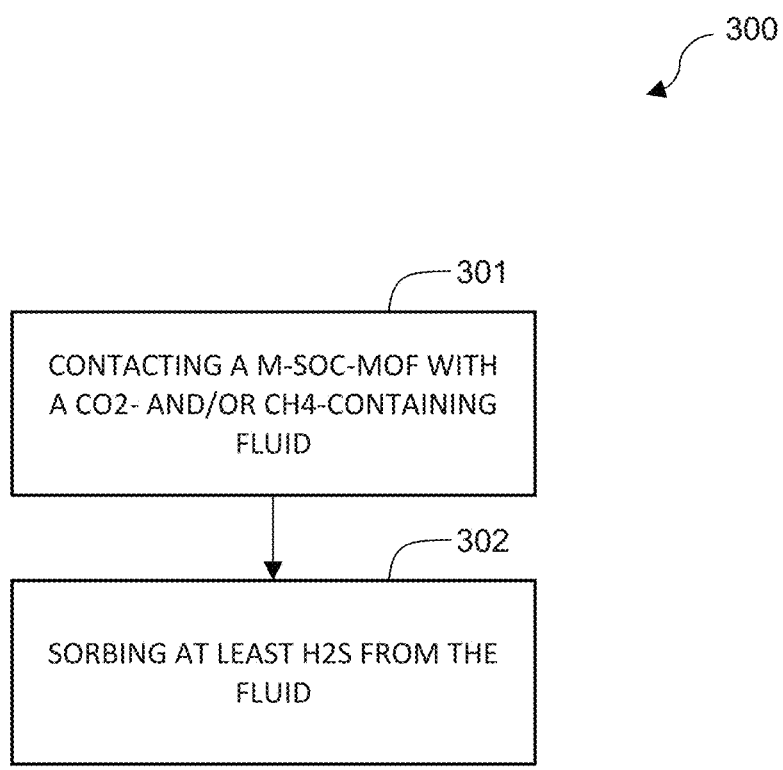
FIG. 3 is a flowchart of a method of sorbing one or more compounds from a $CO_2$- and/or $CH_4$-containing fluid, according to one or more embodiments of the present disclosure.

In some embodiments, the M-soc-MOFs may be used for the selective adsorption of $H_2S$ in $CO_2$- and $CH_4$-containing gas streams, such as ROG and NG. See, for example, FIG. 3, which is a flowchart of a method 300 of capturing one or more compounds from a $CO_2$- and/or $CH_4$-containing fluid, according to one or more embodiments of the present disclosure. As shown in FIG. 3, the method comprises contacting 301 a M-soc-MOF with a $CO_2$- and/or $CH_4$-containing fluid and sorbing 302 at least $H_2S$ from the fluid. In many embodiments, the M-soc-MOFs exhibit an equilibrium-based selectivity. For example, in some embodiments, the M-soc-MOFs may be used as equilibrium-based adsorbents for NG and/or ROG upgrading.

The fluid (e.g., $CO_2$- and/or $CH_4$-containing fluid) may contain one or more of $H_2S$, $CO_2$, and $CH_4$. In an embodiment, the fluid is a $CO_2$-containing fluid that further includes $H_2S$. In an embodiment, the fluid is a $CH_4$-containing fluid that further includes $H_2S$. In an embodiment, the fluid is a $CO_2$- and $CH_4$-containing stream that further includes $H_2S$. In many embodiments, the M-soc-MOFs exhibit a selectivity for $H_2S$ over one or more of $CO_2$ and $CH_4$. For example, the M-soc-MOF may exhibit a selectivity for $H_2S$ over $CO_2$ in a $CO_2$-containing stream. The M-soc-MOF may exhibit a selectivity for $H_2S$ over $CH_4$ in a $CH_4$-containing stream. The M-soc-MOF may exhibit a selectivity for $H_2S$ over $CO_2$ and $CH_4$ in a $CO_2$- and $CH_4$-containing stream. In addition or in the alternative, in many embodiments, the M-soc-MOFs exhibit a high tolerance and/or chemical stability in the presence of $H_2S$. In some embodiments, the M-soc-MOFs exhibit a selectivity for $H_2S$ and/or $CO_2$ over $CH_4$. For example, the M-soc-MOF may exhibit a selectivity for $H_2S > CO_2 >> CH_4$. In these embodiments, the M-soc-MOF may be used for the subsequent removal of $H_2S$ and $CO_2$.

Embodiments of the present disclosure also describe M-soc-MOFs suitable for any of the methods of the present disclosure. The M-soc-MOFs may include one or more metals or metal clusters, and one or more ligands. In many embodiments, the metals (M) of the M-soc-MOF may include one or more trivalent metals (e.g., methods capable of exhibiting a 3+ oxidation state). For example, M of the M-soc-MOF may include one or more of $In^{3+}$, $Fe^{3+}$, $Ga^{3+}$, and $Al^{3+}$. In many embodiments, the M-soc-MOFs include one or more counter-ions. For example, the counter-ions may include one or more of $NO_3^-$, $Cl^-$, $Br^-$, and $OH^-$. In many embodiments, the M-soc-MOFs include a tetracarboxylate ligand. For example, the ligand may include 3,3', 5,5'-azobenzenetetracarboxylate ($ABTC^{4-}$) ligands. Any combination of the M, counter-ions, and ligands described in the present disclosure may be used to construct M-soc-MOFs suitable for any of the methods of the present disclosure.

Figure 8:
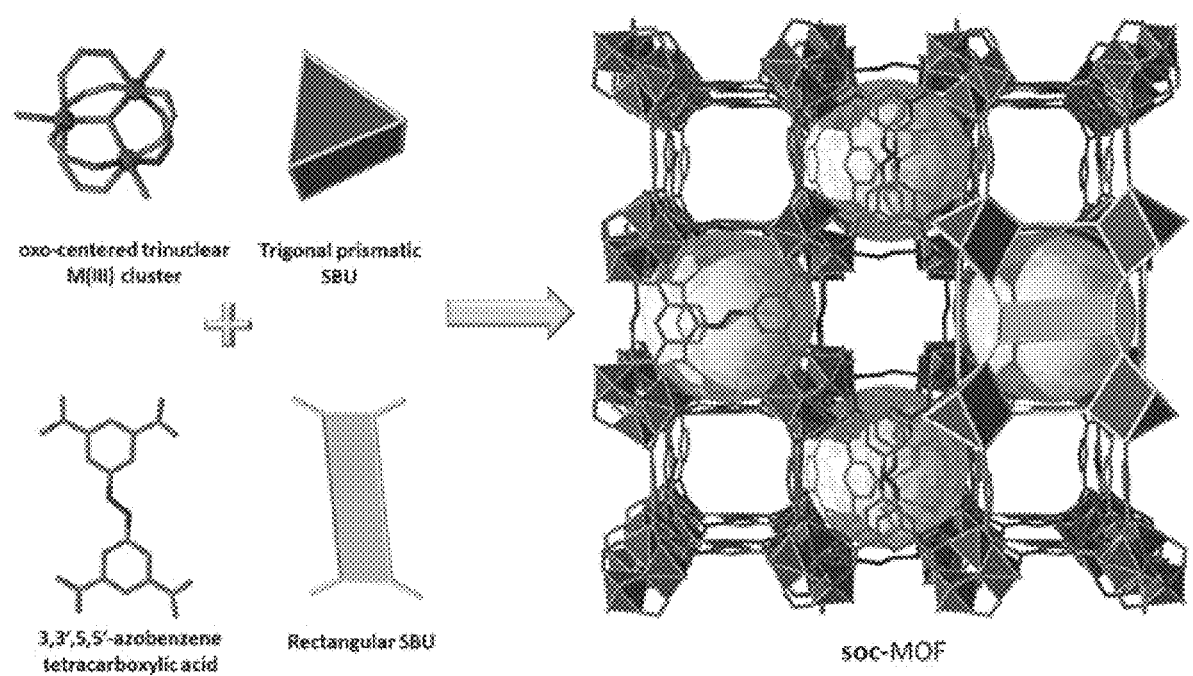
FIG. 8 is a schematic diagram showing structure of the soc-MOF: (left-top) polyhedral representation of the $\mu_3$-oxygen-centered trinuclear metal carboxylate clusters ([$M_3O$ $(O_2C—)_6$], where M=$In^{3+}$, $Fe^{3+}$, $Ga^{3+}$ and $Al^{3+}$, which can be viewed as a 6-connected node having a trigonal-prismatic geometry); (left-bottom) representation of the organic ligand (ABTC, which is shown as a 4-connected rectangular-planar geometry); crystal structure of the cuboidal cage-type soc-MOF (M, plum; C, gray; N, light blue; and O, red; the cavity space is indicated by yellow vdW spheres; hydrogen atoms, $Cl^-$ and $NO_3^-$ ions are omitted for clarity), according to one or more embodiments of the present disclosure.

In an embodiment, the M-soc-MOFs include a series of isostructural soc-MOFs (FIG. 8) possessing suitable structural/chemical features for their efficient use as an equilibrium-based adsorbent for the separation/purification of $H_2$, $CH_4$ and $C_{2+}$ fractions from $H_2S$-containing ROG or NG, among other things. These M-soc-MOFs may be constructed from an assembly of inorganic trinuclear molecular building blocks comprising rigid $\mu_3$-oxygen-centered trinuclear metal carboxylate clusters, generated in situ, bridged by tetradentate ligands. In an embodiment, for example, the trinuclear metal carboxylate clusters may be represented as M3O $(O_2C—)_6$, where M is $In^{3+}$, $Fe^{3+}$, $Ga^{3+}$, or $Al^{3+}$. In an embodiment, the ligand may be 3,3',5,5'-azobenzenetetracarboxylate ($ABTC^{4-}$). Together, the trinuclear metal carboxylate clusters and tetradentate ligand may give an extended (4,6)-connected MOF. Other metals and ligands may be used, as described in greater detail herein.

In an embodiment, the M-soc-MOF is In-soc-MOF, wherein a counter-ion is $NO_3^-$ (In-soc-MOF-1a). In an embodiment, the M-soc-MOF is In-soc-MOF, wherein a counter-ion is $Cl^-$ (In-soc-MOF-1b). In an embodiment, the M-soc-MOF is In-soc-MOF, where a counter-ion is BP (In-soc-MOF-1c). In an embodiment, the M-soc-MOF is Fe-soc-MOF, wherein a counter-ion is $NO_3^-$ (Fe-soc-MOF-1a). In an embodiment, the M-soc-MOF is Fe-soc-MOF, wherein a counter-ion is $Cl^-$ (Fe-soc-MOF-1b). In an embodiment, the M-soc-MOF is Ga-soc-MOF, wherein a counter-ion $NO_3^-$ (Ga-soc-MOF-1a). In an embodiment, the M-soc-MOF is Al-soc-MOF-, wherein a counter-ion is $OH^-$ (Al-soc-MOF-1d).

In a preferred embodiment, the M-soc-MOF is one or more of Fe-soc-MOF, Ga-soc-MOF, and Al-soc-MOF. Each of these M-soc-MOFs may exhibit enhanced $C_{2+}/CH_4$ and/or $H_2S/CO_2$ and/or $H_2S/CH_4$ adsorption selectivities. For example, in an embodiment, each of these M-soc-MOFs may exhibit enhanced selectivity for one or more of $C_{2+}$ compounds (e.g., $C_2H_4$, $C_3H_6$, and n-$C_4H_{10}$) over one or more of $CH_4$, $H_2$, and $N_2$. In an embodiment, each of these M-soc-MOFs may exhibit enhanced selectivity for $H_2S$ over one or more of $CO_2$ and $CH_4$, or for $H_2S$ and/or $CO_2$ over $CH_4$. In another preferred embodiment, the M-soc-MOF is one or more of Ga-soc-MOF and Al-soc-MOF. Each of these M-soc-MOFs may maintain structural integrity and separation performance upon exposure to $H_2S$. For example, in an embodiment, Ga-soc-MOF and Al-soc-MOF may exhibit enhanced selectivity for $C_{2+}$ over other chemical species and maintain chemical stability in the presence of $H_2S$. In another preferred embodiment, the M-soc-MOF is Ga-soc-MOF as it exhibits a selectivity for $H_2S$ and/or $CO_2$ over $CH_4$. While preferred embodiments are disclosed herein, such disclosure shall not be limiting, as any of the M-soc-MOFs described herein are capable of providing a selectivity and chemical stability suitable for any of the methods described herein.

Embodiments of the present disclosure further describe thin-film membranes based on any of the M-soc-MOFs described in the present disclosure and methods of fabricating the same.

Embodiments of the present invention further provide the use of stable MOFs and MOF compositions, particularly M-soc-MOFs, for the subsequent (i.e., in series) or simultaneous removal of $CO_2$, $H_2S$, and condensable hydrocarbons. Embodiments as described have the potential to reduce the number of processes in the natural gas or biogas overall treatment scheme. It is expected that the regeneration of M-soc-MOF compositions will be cost effective in comparison to conventional amine scrubbing. M-soc-MOF compositions also exhibit high affinity for condensable hydrocarbons ($C_2H_6$, $C_3H_8$, etc.) at the inverse of zeolites and activated carbons.

Figure 4:
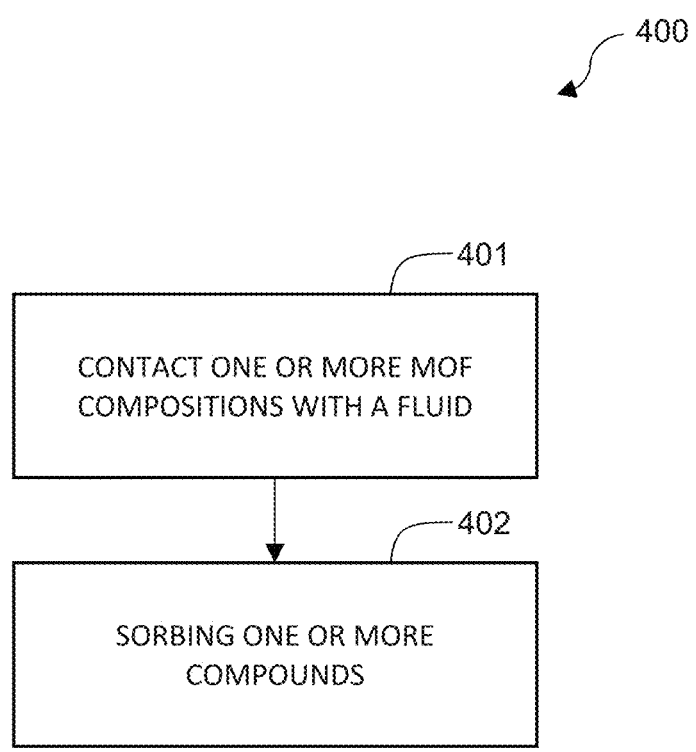
FIG. 4 is a flowchart of a method of removing one or more compounds from a fluid, according to one or more embodiments of the present disclosure.

FIG. 4 is a block flow diagram of a method 400 of removing one or more compounds from one a fluid, according to an embodiment. Method 400 includes contacting 401 one or more metal organic framework (MOF) compositions with a fluid and sorbing 402 one or more compounds from the fluid with the one or more MOF compositions. In particular, method 400 includes contacting 401 one or more M-soc-MOF compositions with a fluid and sorbing 402 one or more compounds from the fluid with the one or more M-soc-MOF compositions.

One compound which can be sorbed by an M-soc-MOF from a fluid is $CO_2$. $CO_2$ can be sorbed from a fluid comprising $H_2O$ and/or $CH_4$ by an M-soc-MOF with selectivity over one or more of $H_2O$ and $CH_4$. One compound which can be sorbed by an M-soc-MOF from a fluid is $H_2S$. $H_2S$ can be sorbed from a fluid comprising $H_2O$ and/or $CH_4$ by an M-soc-MOF with selectivity over one or more of $H_2O$ and $CH_4$. $CO_2$ and $H_2S$ can be simultaneously sorbed from a fluid comprising $H_2O$ and/or $CH_4$ by an M-soc-MOF with selectivity over one or more of $H_2O$ and $CH_4$. $CO_2$ and $H_2S$ can be sorbed from a fluid comprising $H_2O$ and/or $CH_4$ in series by an M-soc-MOF with selectivity over one or more of $H_2O$ and $CH_4$. In a specific embodiment, $CO_2$ and $H_2S$ can be simultaneously sorbed from natural gas and/or biogas by an M-soc-MOF with selectivity over other one or more of $H_2O$ and $CH_4$. In a specific embodiment, $CO_2$ and $H_2S$ can be sorbed from a fluid comprising $H_2O$ and/or $CH_4$ in series by an M-soc-MOF with selectivity over other one or more of $H_2O$ and $CH_4$. Generally, the above sorption abilities and stability in the presence of water of suitable M-soc-MOFs as disclosed herein is an advantageous aspect unavailable from other M-soc-MOFs and industrial materials such as zeolites and activated carbon.

Condensable hydrocarbons can be sorbed by an M-soc-MOF from a fluid. Examples of condensable hydrocarbons include ethane, propane, butane, pentane, and hexane. In some embodiments, examples of condensable hydrocarbons include straight chained alkanes with 6 carbons or less. Condensable hydrocarbons and one or more of $CO_2$ and $H_2S$ can be simultaneously sorbed from a fluid, with selectivity over other one or more of $H_2O$ and $CH_4$. Condensable hydrocarbons and one or more of $CO_2$ and $H_2S$ can be sorbed in series from a fluid, with selectivity over other one or more of $H_2O$ and $CH_4$. The ability to sorb condensable hydrocarbons is one advantageous aspect of suitable M-soc-MOFs as disclosed herein over other materials such as zeolites and activated carbon.

Figure 5:
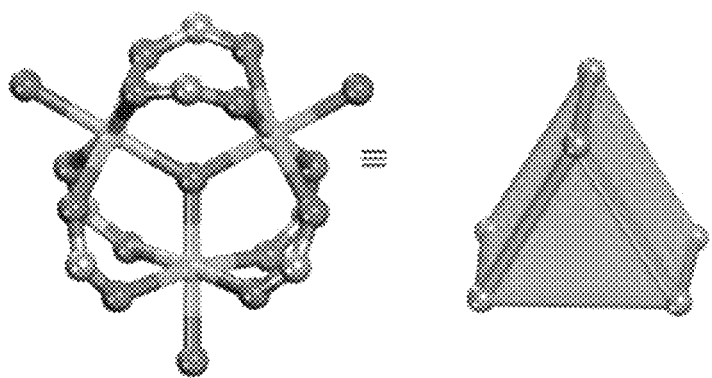
FIG. 5 is a schematic diagram of a ball-and-stick structure and a polyhedral representation of a trimer molecular building block, according to one or more embodiments of the present disclosure.
Figure 6:
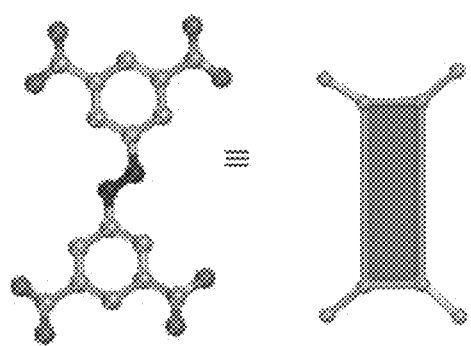
FIG. 6 is a schematic diagram of a ball-and-stick structure and a polyhedral representation of a suitable organic ligand, according to one or more embodiments of the present disclosure.

M-soc-MOFs suitable for the methods disclosed herein include M-soc-MOFs comprising one or more trimer molecular building blocks (TMBB), as shown in FIG. 5, and one or more organic ligands, as shown in FIG. 6. FIG. 5 illustrates a ball-and-stick structure and a polyhedral representation of a TMBB. FIG. 6 illustrates a ball-and-stick structure and a polyhedral representation of one example of a suitable organic ligand. A TMBB comprises three metal carboxylate octahedra, each octahedral generally described as [MO$_5$(H$_2$O)], wherein M=a metal. A TMBB can be generally described as M$_3$O$_x$(CO$_2$)$_y$. One example of a TMBB can be described as [Ga$_3$O(CO$_2$)$_6$(H$_2$O)$_3$]. One example of a TMBB can be described as [In$_3$O(CO$_2$)$_6$]. One example of a TMBB can be described as [Al$_3$O(CO$_2$)$_6$]. The three metal octahedra are metal-centered, and all share one central μ$_3$-oxo anion. In each octahedron, the apical position can be occupied by a terminal water molecule. The metal-carboxylate clusters generate a rigid node with fixed geometry involving multiple metal-oxygen coordination bonds which induce the stability of the node and subsequently enhance the thermal stability and overall rigidity of the framework.

Suitable metals (M) include trivalent metals (i.e., metals capable of exhibiting a +3 oxidation state). Trivalent metals include aluminum, scandium, titanium, vanadium, chromium, manganese, iron, cobalt, nickel, copper, gallium, germanium, arsenic, yttrium, zirconium, niobium, molybdenum, palladium, silver, indium, tin, antimony, lanthanum, cerium, praseodymium, samarium, europium gadolinium, terbium, erbium, thulium, ytterbium, lutetium, tantalum, tungsten, rhenium, osmium, iridium, platinum, gold, lead, and bismuth. Particularly suitable trivalent metals include gallium, indium, iron, scandium, and aluminum. The three trivalent metals yield an overall cationic framework (+1 per formula unit) that is balanced by [NO$_3$]$^{-1}$ ions. The disordered [NO$_3$]$^{-1}$ ions occupy statistically two positions on the threefold axis with equal probability. A broad range of suitable trivalent metals advantageously allows for M-soc-MOFs to be customized for particular purposes. For example, lighter trivalent metals can provide an M-soc-MOF with increased sorption uptake per unit volume.

Figure 7:
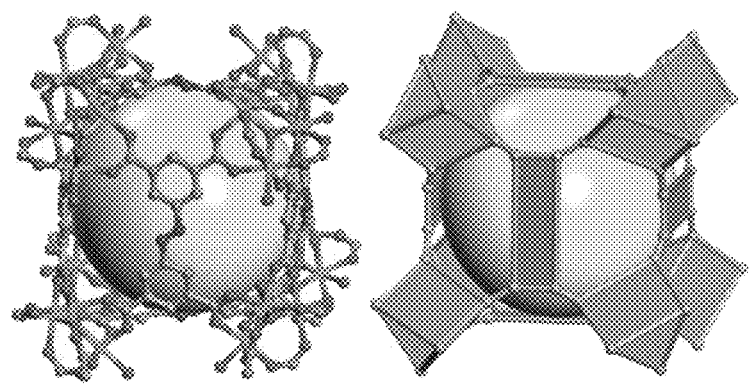
FIG. 7 is a schematic diagram of a ball-and-stick structure and a polyhedral representation of a M-soc-MOF, according to one or more embodiments of the present disclosure.

Each TMBB unit is linked by six separate organic ligands, as shown in FIG. 5, to produce a novel 3D structure having an soc-topology, as shown in FIG. 7. Suitable ligands are tetradentate. Suitable tetradentate ligands include rectangular planar ligands. A generally suitable ligand is a tetracarboxylate ligand. One particular suitable ligand is amidetetracarboxylate:

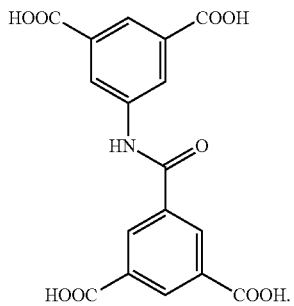 [SMILES: O=C(O)c1cc(NC(=O)c2cc(C(=O)O)cc(C(=O)O)c2)cc(C(=O)O)c1]

One particular suitable ligand is 3,3',5,5'-azobenzenetetracarboxylate:

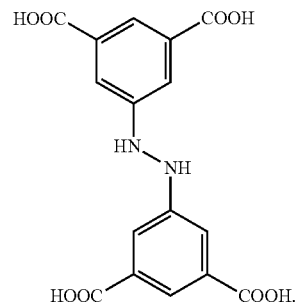 [SMILES: O=C(O)c1cc(NNc2cc(C(=O)O)cc(C(=O)O)c2)cc(C(=O)O)c1]

FIG. 7 illustrates a ball-and-stick structure and a polyhedral representation of a suitable M-soc-MOF comprised of a plurality of 6-connected TMBBs networked by organic tetradentate planar ligands. In FIG. 7, hydrogen atoms, water molecules, and [NO$_3$]— ions are omitted for clarity. One example M-soc-MOF can be described as [In$_3$O (C$_{16}$N$_2$O$_8$H$_6$)$_{1.5}$(H$_2$O)$_3$](H$_2$O)$_3$(NO$_3$). All such M-soc-MOFs are characterized by an soc-topology, and can generally be denoted as M-soc-MOFs. The soc-topology of M-soc-MOF provides unique structure features, including the presence of isolated nanometer-scale carcerand-like capsules, which anchor nitrate ions, and which are strictly accessible through the two main channels by very restricted windows. Such characteristics provide high, localized charge density advantageous for chemical and physical sorption of compounds.

Other interesting structural features of the crystalline structure are its two types of infinite channels. The first type is hydrophilic, due to the water molecules coordinated to the indium centers which are pointed inside these channels. Guest water molecules occupy the remaining free volume in these channels and form hydrogen bonds with coordinated water molecules. The second type of channels can be guest free, and have an approximately 1 nm diameter.

M-soc-MOFs can have a BET surface area of at least about 800 m$^2$/g, at least about 900 m$^2$/g, at least about 1,000 m$^2$/g, at least about 1,200 m$^2$/g, at least about 1,400 m$^2$/g, or at least about 1,600 m$^2$/g. In a specific embodiment, an M-soc-MOF has a BET surface area of at least about 800 m$^2$/g. In a specific embodiment, an M-soc-MOF has a BET surface area of about 1,000 m$^2$/g. In a specific embodiment, an M-soc-MOF has a BET surface area of about 1,000 m$^2$/g to about 1,600 m$^2$/g.

M-soc-MOFs can have an average pore volume of at least about 0.2 cm$^3$/g, at least about 0.25 cm$^3$/g, at least about 0.3 cm$^3$/g, at least about 0.45 cm$^3$/g, at least about 0.6 cm$^3$/g, or at least about 0.65 cm$^3$/g. In a specific embodiment, an M-soc-MOF has an average pore volume of at least about 0.2 cm$^3$/g. In a specific embodiment, an M-soc-MOF has an average pore volume of about 0.3 cm$^3$/g. In a specific embodiment, an M-soc-MOF has an average pore volume of about 0.3 cm$^3$/g to about 0.65 cm$^3$/g.

The following Examples are intended to illustrate the above invention and should not be construed as to narrow its scope. One skilled in the art will readily recognize that the Examiners suggest many other ways in which the invention could be practiced. It should be understand that numerous variations and modifications may be made while remaining within the scope of the invention.

Example 1

The following Example describes a cooperative experimental/modeling strategy that was used to unveil the structure/gas separation performance relationship for a series of isostructural metal-organic frameworks (MOFs) with soc-topology (square-octahedral) hosting different extra-framework counter ions ($NO_3^-$, $Cl^-$ and $Br^-$). $In^{3+}$—, $Fe^{3+}$—, $Ga^{3+}$— and the newly isolated Al(III)-based isostructural soc-MOF were extensively studied and evaluated for the separation-based production of high-quality fuels (i.e., $CH_4$, $C_3H_8$ and n-$C_4H_{10}$) and olefins. The structural/chemical fine-tuning of the soc-MOF platform promoted equilibrium-based selectivity toward $C_{2+}$ ($C_2H_6$, $C_2H_4$, $C_3H_6$ $C_3H_8$, and n-$C_4H_{10}$) and conferred the desired chemical stability toward $H_2S$. The noted dual chemical stability and gas/vapor selectivity, which have rarely been reported for equilibrium-based separation agents, are essential for the production of high-purity $H_2$, $CH_4$ and $C_{2+}$ fractions in high yields. Interestingly, the evaluated soc-MOF analogues exhibited high selectivity for $C_2H_4$, $C_3H_6$ and n-$C_4H_{10}$. In particular, the Fe, Ga and Al analogues presented relatively enhanced $C_{2+}/CH_4$ adsorption selectivities. Notably, the Ga and Al analogues were found to be technically preferable because their structural integrities and separation performances were maintained upon exposure to $H_2S$, indicating that these materials are highly tolerant to $H_2S$. Therefore, the Ga-soc-MOF was further examined for the selective adsorption of $H_2S$ in the presence of $CO_2$- and $CH_4$-containing streams, such as refinery-off gases (ROG) and natural gas (NG). Grand canonical Monte Carlo (GCMC) simulations based on a specific force field describing the interactions be-tween the guest molecules and the Ga sites supported and confirmed the considerably higher affinity of the Ga-soc-MOF for $C_{2+}$ (as exemplified by n-$C_4H_{10}$) than for $CH_4$. The careful selection of an appropriate metal for the trinuclear inorganic molecular building block (MBB), i.e., a Ga metal center, imbues the soc-MOF platform with the requisite hydrolytic stability, $H_2S$ stability, and exceptional gas selectivity for ROG and NG upgrading. Finally, the soc-MOF was deployed as a continuous film on a porous support, and its gas permeation properties as a membrane were evaluated.

Materials and Methods

Organic Synthesis 3,3',5,5'-azabenzene tetracarboxylic acid (ABTC) was synthesized in our lab by recently published procedure (Scheme 1). Briefly, A mixture of 5-nitroisophthalic acid (19 g, 90 mmol) and NaOH (50 g, 1250 mmol) in 250 ml of reverse osmosis water was placed into a 1 L 3-neck round bottom flask and stirred vigorously at 333 K. To this slurry 100 g of D-glucose dissolved in 150 ml of reverse osmosis water was slowly added. The resulted brown mixture was cooled down to room temperature and air was bubbled through reaction mixture overnight always under stirring. The reaction mixture was cooled with an ice bath and the sodium salt of 3,3',5,5'-azobenzene tetracarboxylic acid was recovered by filtration and washed with small amount of cold water. The resulting yellow solid was then dissolved in 200 ml of reverse osmosis water and this solution was acidified to pH=1 by the addition of conc. HCl. The resulting orange solid was collected by filtration on the fritted funnel, washed with reverse osmosis water and dried in vacuum oven at 373 K to provide 10.5 g of target compound. Yield 70%. $^1H$ and $^{13}C$ NMR data are in a good agreement with previously reported data.

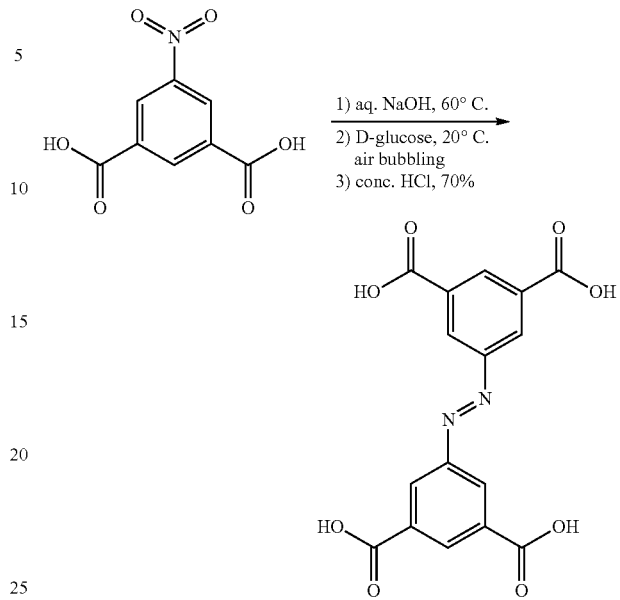

Scheme 1

Other Chemicals and Solvents

All other chemicals and solvents were used as received unless otherwise stated from Fisher Scientific, Acros Organics, Sigma-Aldrich, Combi Blocks or TCI America. DMF was dried over $CaH_2$. DI water=deionized water. $^1H$ and $^{13}C$ NMR spectra were recorded at room temperature with Bruker Avance 500 and 600 MHz spectrometers using $CDCl_3$ or DMSO-d6 as the solvents, and referenced to the corresponding solvent peaks (7.26 and 77.16 ppm for $CDCl_3$, and 2.50 and 39.52 ppm for DMSO-d6, respectively).

Synthesis and X-Ray Crystal Structure Analysis

Figure 9:
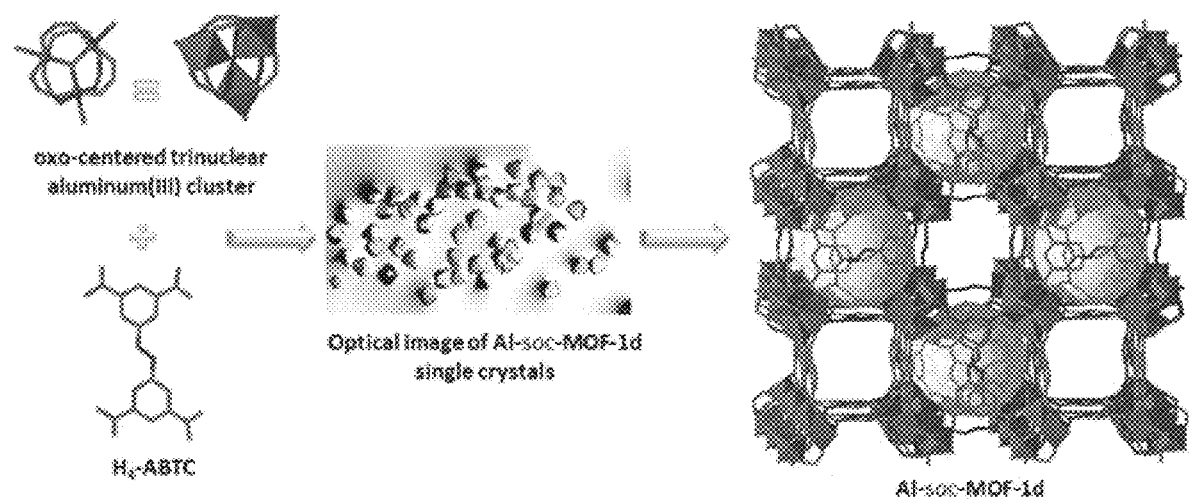
FIG. 9 is a schematic diagram of an assembly of Al-soc-MOF-1d, according to one or more embodiments of the present disclosure.
Figure 11:
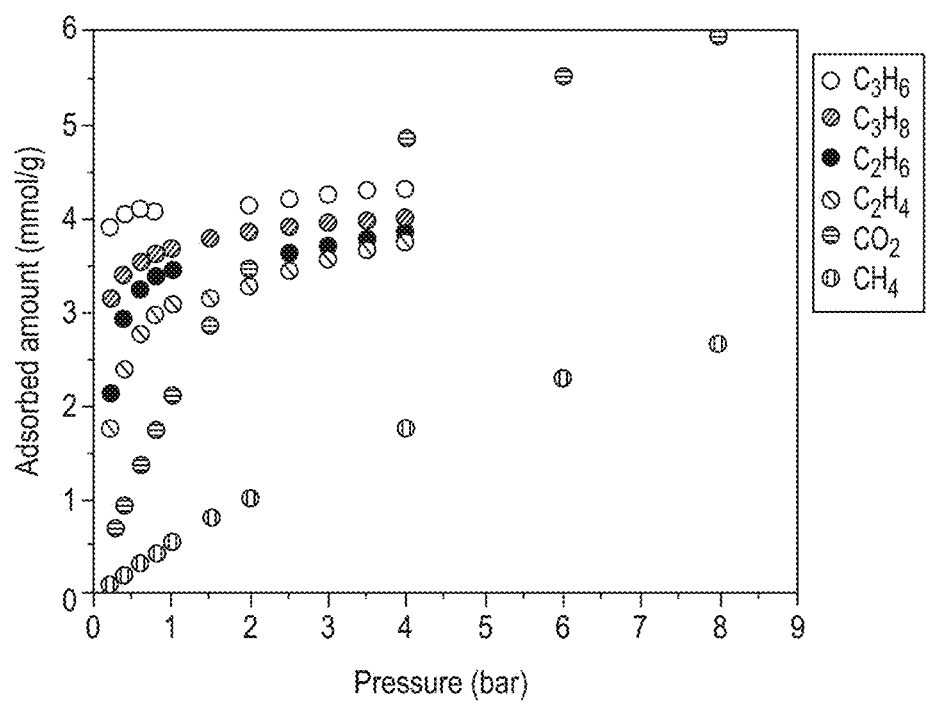
FIG. 11 are graphical views of the adsorption of $N_2$, $CH_4$, $CO_2$, $C_2H_6$, $C_2H_6$, $C_3H_8$ and $C_3H_6$ on In-soc-MOF-1a at 298 K, according to one or more embodiments of the present disclosure.
Figure 12:
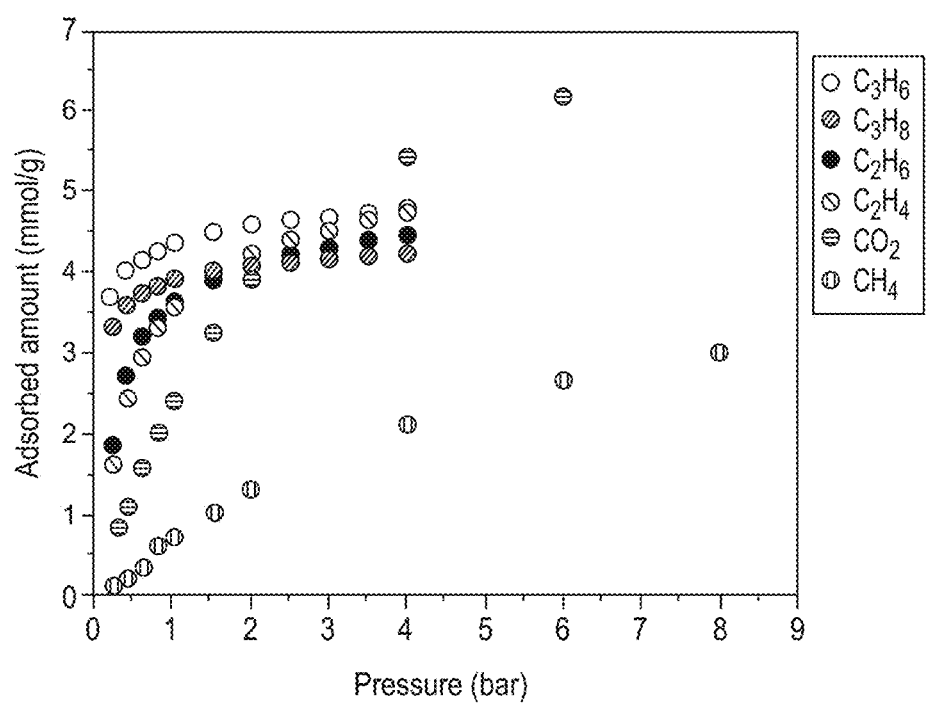
FIG. 12 are graphical views of the adsorption of $CH_4$, $CO_2$, $C_2H_6$, $C_2H_6$, $C_3H_8$ and $C_3H_6$ on In-soc-MOF-1b at 298 K, according to one or more embodiments of the present disclosure.
Figure 13:
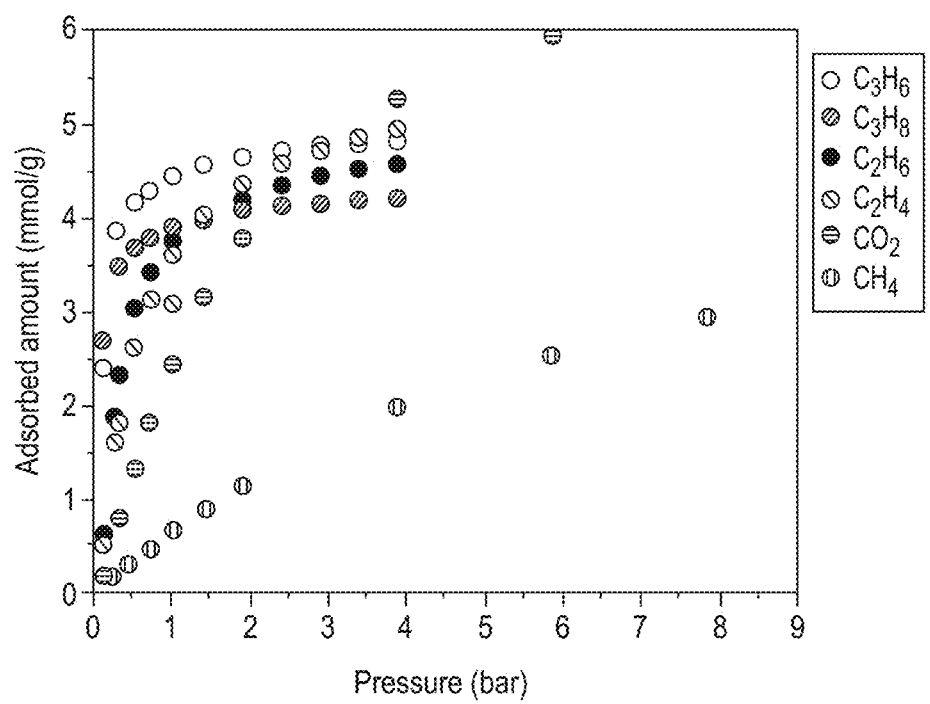
FIG. 13 are graphical views of the adsorption of $CH_4$, $CO_2$, $C_2H_6$, $C_3H_8$ and $C_3H_6$ on In-soc-MOF-1c at 298 K, according to one or more embodiments of the present disclosure.
Figure 14:
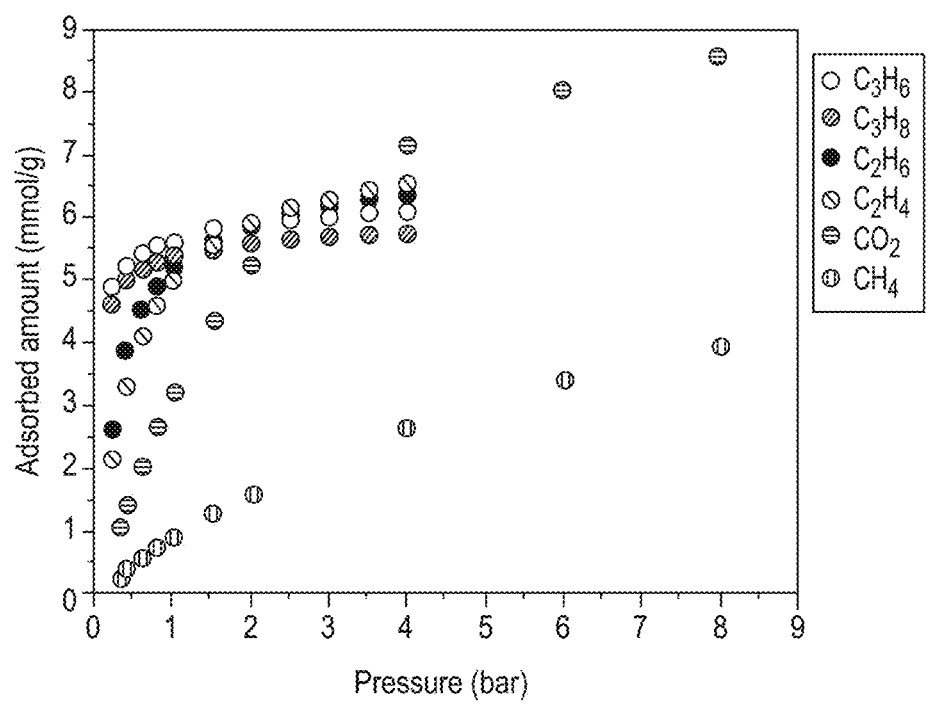
FIG. 14 are graphical views of the adsorption of $CH_4$, $CO_2$, $C_2H_6$, $C_3H_8$ and $C_3H_6$ on Fe-soc-MOF-1a at 298 K, according to one or more embodiments of the present disclosure.
Figure 15:
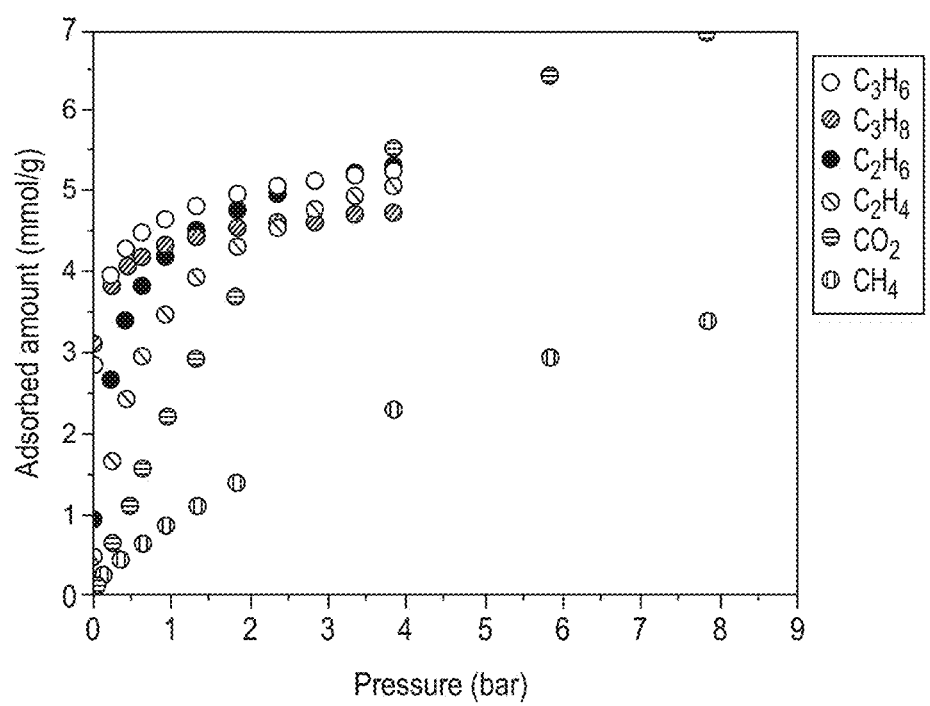
FIG. 15 are graphical views of the adsorption of $CH_4$, $CO_2$, $C_2H_6$, $C_3H_8$ and $C_3H_6$ on Ga-soc-MOF-1a at 298 K, according to one or more embodiments of the present disclosure.

The $In^{3+}$-, $Fe^{3+}$-, and $Ga^{3+}$-soc-MOF analogues were synthesized following the published procedure. The synthesis of the Al-soc-MOF-1d analogue was substantially more tedious because of the challenges in growing suitable crystals for single-crystal determination. After countless attempts using different conditions, the introduction of a modulator—acetic acid—was found to be crucial for isolating the targeted Al-soc-MOF-1d (see the synthetic procedure presented be-low). FIG. 9 depicts simple description of the assembly of the newly isolated Al-soc-MOF-1d.

Single-Crystal Conditions for the Al-soc-MOF-1d

A solution of $AlC_3.6H_2O$ (13 mg, 0.054 mmol) and 3,3',5,5' azobenzenetetracarboxylic acid (10 mg, 0.028 mmol) in N,N-dimethylformamide (DMF) (2 mL), acetonitrile ($CH_3CN$) (2 mL), and acetic acid (1 mL) was prepared in a Pyrex vial with a polytetrafluoroethylene (PTFE)-lined phenolic cap and subsequently placed into a preheated oven at 150° C. for 3 days to yield pure orange crystals (FIG. 9).

Scale-Up Conditions for the Al-soc-MOF-1d

A solution of $AlC_3.6H_2O$ (265.6 mg, 1.1 mmol) and 3,3',5,5' azobenzenetetracarboxylic acid (200 mg, 0.56 mmol) in DMF (40 mL), acetonitrile (CH$_3$CN) (40 mL), and acetic acid (20 mL) was prepared in a round-bottom pressure flask and subsequently placed into a pre-heated oven at 150° C. for 3 days to give pure orange crystals. The Al-soc-MOF-1d was activated by first washing the as-synthesized crystals with 3×20 mL of DMF, followed by solvent exchange with acetonitrile for 6 days in a 65° C. oven. The adsorption studies were generally conducted on a freshly isolated MOF; typically, 30 to 40 mg of each activated sample was transferred (dry) to a 6-mm large bulb glass sample cell. Then, the sample was evacuated at room temperature using a turbomolecular vacuum pump (residual pressure below 10-7 mbar), kept at 220° C. for 24 h, then gradually heated to 220° C. at a rate of 1° C./min, and finally cooled to room temperature.

Instrumentation and Procedures

Single-crystal X-ray diffraction data were collected using a Bruker X8 PROSPECTOR APEX2 CCD diffractometer (Cu Kα, λ=1.54178 Å). Indexing was performed using APEX2 (Difference Vectors method). Data integration and reduction were performed using SaintPlus 6.01. Absorption correction was performed by multi-scan method implemented in SADABS. Space groups were determined using XPREP implemented in APEX2.1 Structure was solved using SHELXS-97 (direct methods) and refined using SHELXL-97 (full-matrix least-squares on F2) contained in APEX2.

Powder X-ray diffraction (PXRD) measurements were carried out at room temperature on a PANalytical X'Pert PRO diffractometer 45 kV, 40 mA for Cu Kα (λ=1.5418 Å), with a step size of 0.05° in 2θ.

Quantachrome Low-pressure gas N$_2$ sorption measurements were performed on a fully automated autosorb-1 high resolution gas adsorption analyzer (Quantachrome) at relative pressures up to 1 atm. The cryogenic temperatures were controlled using liquid nitrogen and argon baths at 77 K.

3FLEX Low-pressure gas sorption measurements at 298K. Low pressure gas adsorption measurements at 298 K were performed on 3-Flex Surface Characterization Analyzer (Micromeritics) at relative pressures up to 1 atm.

C$_4$H$_{10}$/CH$_4$ Column breakthrough test. The homemade set-up for adsorption column breakthrough testing is composed of a stainless steel column. The column is 27 mm in length with 4 mm of inner (6.4 mm outer) diameter. The gas composition downstream the column is monitored using a hidden mass spectrometer. In a typical experiment, 0.1-0.4 g of adsorbent was treated at 403-433 K overnight in vacuum (in oven). After backfill with argon, the column is then transferred to a thermostatic chamber where helium is flushed trough the column at 3.5 cm$^3$ min$^{-1}$. The gas flow is then switched to the desired n-C$_4$H$_{10}$/CH$_4$ (2/98) gas mixture at the same flow rate. The complete breakthrough of n-C$_4$H$_{10}$ and CH$_4$ were indicated by the downstream gas composition reaching that of the feed gas.

H$_2$S/CO$_2$/CH$_4$ Column breakthrough tests. For H$_2$S containing gases, the mixed gas testing measurements were carried out using custom made column breakthrough set-up, designed in collaboration with L&C (Hilleah, Fla. USA). The stainless steel column used in the breakthrough test with a capacity of packing up to 2 g of materials. The column downstream is monitored using a MKS mass spectrometer. In a typical experiment, 0.1-0.4 g of adsorbent was treated at 403-433 K overnight in vacuum (in situ). The gas flow is then switched to the desired CO$_2$/H$_2$S/CH$_4$:5/5/90 gas mixture at the same flow rate (10 cm$^3$/min). The complete breakthrough of CH$_4$, CO$_2$ and H$_2$S were indicated by the downstream gas composition reaching that of the feed gas.

In-situ FTIR. Fourier Transform InfraRed (FTIR) spectra were measured using Thermo Nicolet 6700 series spectrometer equipped with quantum Mercuric Cadmium Telluride (MCT-A) detector operating at liquid nitrogen temperature. Each IR spectrum was the average of 128 spectra recorded in the 4000-650 cm$^{-1}$ spectral range with a resolution of 4 cm$^{-1}$.

Diffuse Reflectance Infrared Fourier Transform Spectroscopy (DRIFTS) experiments were performed using Praying Mantis module equipped with a dome sealed reaction chamber (ZnSe window) allowing a controlled in situ environment.

KBr powder was used to collect the background spectrum. Sample was mixed with KBr (1 wt %) for sample spectrum collection. KBr and KBr+sample powders were dried at 200° C. under ultrahigh vacuum (<1 mTorr) prior transferring to the reaction chamber in glovebox environment. Before measurement sample was heated at 200° C. under vacuum (1 torr) in the sealed reaction chamber.

TG-DSC. Enthalpy of adsorption for CO$_2$ was measured using SENSYS evo TG-DSC from Setaram Instrumentation that can carry out simultaneous high resolution DSC and TGA experiments. In a typical experiment, the sample was activated in-situ 403-433 K under continuous dry N$_2$ flow at the rate of 15 ml/min. For sorption experiment, baseline was obtained under dry N$_2$ flow at the rate of 15 ml/min at 25° C. The desired gas was connected at auxiliary gas port and gas was changed from N$_2$ to CH$_4$, C$_3$H$_8$ and n-C$_4$H$_{10}$ exactly after 1 hour and TGA and DSC signal were monitored for few hours to obtain uptake and heat of sorption respectively.

High-pressure gas sorption measurements. Adsorption equilibrium measurements of pure gases were performed using a Rubotherm gravimetric-densimetric apparatus (Bochum, Germany) (FIG. 9), composed mainly of a magnetic suspension balance (MSB) and a network of valves, mass flow meters, and temperature and pressure sensors. The MSB overcomes the disadvantages of other commercially available gravimetric instruments by separating the sensitive microbalance from the sample and the measuring atmosphere, and is able to perform adsorption measurements across a wide pressure range (i.e., from 0 to 20 MPa). The adsorption temperature may also be controlled within the range of 77 K to 423 K. In a typical adsorption experiment, the adsorbent is precisely weighed and placed in a basket suspended by a permanent magnet through an electromagnet. The cell in which the basket is housed is then closed and vacuum or high pressure is applied. The gravimetric method allows the direct measurement of the reduced gas adsorbed amount (Ω). Correction for the buoyancy effect is required to determine the excess and absolute adsorbed amount using equations 1 and 2, where $V_{adsorbent}$ and Vss and $V_{adorbed}$ phase refer to the volume of the adsorbent, the volume of the suspension system, and the volume of the adsorbed phase, respectively.

$$\Omega = m_{absolute} - \rho_{gas}(V_{adsorbent} + V_{ss} + V_{adsorbed\text{-}phase}) \quad (1)$$

$$\Omega = m_{excess} - \rho_{gas}(V_{adsorbent} + V_{ss}) \quad (2)$$

The buoyancy effect resulting from the adsorbed phase may be taken into account via correlation with the pore volume or with the theoretical density of the sample.

These volumes are determined using the helium isotherm method by assuming that helium penetrates in all open pores of the materials without being adsorbed. The density of the gas is determined using the Refprop equation of state (EOS)

database and checked experimentally using a volume-calibrated titanium cylinder. By weighing this calibrated volume in the gas atmosphere, the local density of the gas is also determined. Simultaneous measurement of adsorption capacity and gas-phase density as a function of pressure and temperature is therefore possible.

The pressure is measured using two Drucks high pressure transmitters ranging from 0.5 to 34 bar and 1 to 200 bar, respectively, and one low pressure transmitter ranging from 0 to 1 bar. Prior to each adsorption experiment, about 200 mg of sample is outgassed at 473 K at a residual pressure of $10^{-6}$ mbar. The temperature during adsorption measurements is held constant by using a thermostat-controlled circulating fluid.

Results and Discussion

The M-soc-MOFs of the present disclosure offer several key attributes that make it attractive for gas upgrading/separations: (i) high chemical and thermal stability associated with its relatively high porosity; (ii) the presence of accessible open metal sites that are appropriate for tuning and enhancing the strength of interactions with acid gases, particularly $H_2S$; and (iii) the presence of extra-framework anions within the cavities, which is ideal for further tuning the adsorption properties of the soc-MOF adsorbent.

Accordingly, the effect of different intra-framework metals on soc-MOF stability upon exposure to $H_2S$ and the associated adsorption properties of $H_2$, $CH_4$, $C_2H_4$, $C_3H_6$ and $C_{2+}$ ($C_2H_6$, $C_3H_8$ and n-$C_4H_{10}$) were evaluated. In an embodiment, the Ga-based soc-MOF analogue (Ga-soc-MOF-1a) exhibited outstanding equilibrium-based separation performance for $CH_4$/n-$C_4H_{10}$, $H_2S/CO_2$, and $H_2S/CH_4$ mixtures based on real co-absorption measurements. To gain better insight into the adsorption mechanisms governing the separation of $CH_4$ from n-$C_4H_{10}$, molecular simulations integrating advanced quantum and force field-based tools were conducted on Ga-soc-MOF-1a. A relatively inexpensive and newly isolated aluminum-based soc-MOF (Al-soc-MOF-1d) was further considered as a cost-effective material for various separation applications. Finally, to expand the applicability of the soc-MOF platform and broaden its scope to cover membrane technology, a pure soc-MOF continuous membrane on a porous alumina support was successfully fabricated for the first time and its performance evaluated for select gas separations.

Figure 16:
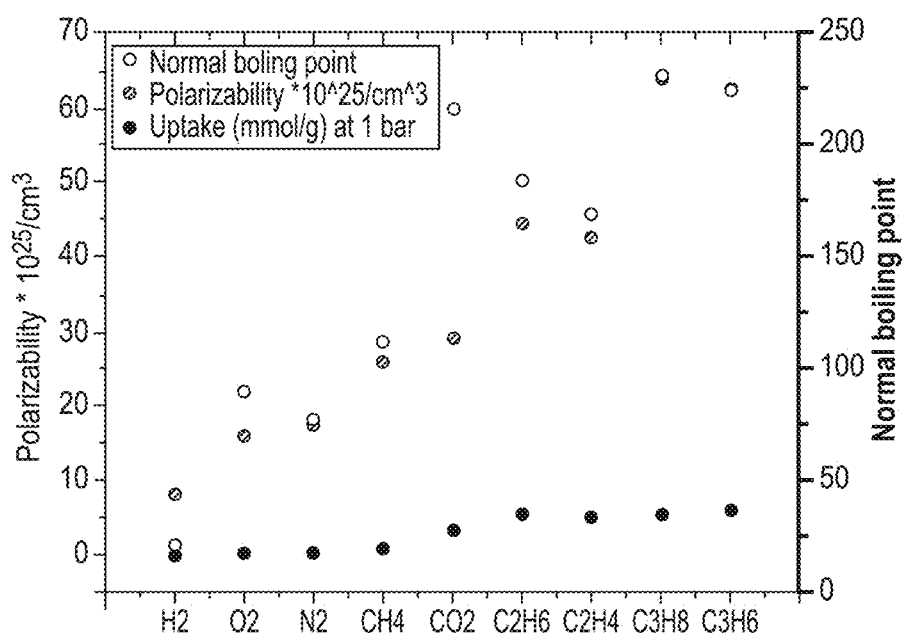
FIG. 16 is a graphical view of the adsorption uptake as a function of probe molecules normal boiling point and polarizabilities for Fe-soc-MOF-1b, according to one or more embodiments of the present disclosure.

Adsorption Properties of $In^{3+}$, $Fe^{3+}$ and $Ga^{3+}$ isostructural soc-MOFs Early results based on studies of the parent soc-MOF (In-soc-MOF-1a, based on the indium trimer $[In_3O(O_2C-)_6]$ and the ABTC ligand) revealed the impact/importance of the localized charge density in a contracted pore system of approximately 1 nm for enhancing the strength of the interactions between the adsorbed $H_2$ molecules and the host adsorbent. Therefore, the unique properties of M-soc-MOF-1 were explored, namely, the confined space associated with a localized charge density, on the adsorption of relatively polarizable light hydrocarbons, such as $CH_4$ and $C_{2+}$, and acid gases ($CO_2$ and $H_2S$). The apparent surface area and pore volume estimated for the evaluated M-soc-MOF-1, where M=$In^{3+}$, $Fe^{3+}$, $Ga^{3+}$ or $Al^{3+}$, are summarized in Table 3. Recognizing the importance of the selected metal center for the chemical stability, adsorption properties, and subsequent practical deployment of the associated MOF, the effects of the metal and counter-anion on the performances of the soc-MOF for ROG- and NG-related separations were investigated. In this context, the single-gas adsorption of various probe molecules, including $CH_4$, $C_2H_6$, $C_3H_8$, $C_4H_{10}$ and $H_2$, was first investigated in detail for the $In^{3+}$, $Fe^{3+}$ and $Ga^{3+}$ analogues (FIGS. 10-15). Interestingly, the systematic investigation revealed substantial adsorption steepness in the adsorption isotherms when comparing supercritical gases, such as $N_2$, $CH_4$ and $H_2$, to vapors, such as $C_{2+}$ (FIG. 10a). In contrast, $CO_2$ showed an intermediate adsorption isotherm steepness consistent with its moderate normal boiling point. The correlation between the adsorption uptakes for Fe-soc-MOF-1b at 1 bar and the normal boiling points of different gases/vapors is illustrated in FIG. 16. It is important to note that in a purely equilibrium-driven adsorption mechanism, the steep-ness in the adsorption isotherm is directly correlated with the strength of the interactions between the guest molecules and soc-MOF frame-work, reflecting the relative affinities of specific molecules.

TABLE 3

Summary of the assigned naming system denoting the counter-ion present in each of the soc-MOF analogues described herein and their corresponding BET areas and pore volumes

| Compound Abbreviation | Counter-ion | BET area ($m^2/g$) | Pore volume $cm^3/g$ |
|---|---|---|---|
| In-soc-MOF-1a | $NO_3-$ | 1220 | 0.50 |
| In-soc-MOF-1b | Cl– | 1240 | 0.50 |
| In-soc-MOF-1c | Br– | 1240 | 0.50 |
| Fe-soc-MOF-1a | $NO_3-$ | 1700 | 0.69 |
| Fe-soc-MOF-1b | Cl– | 1650 | 0.65 |
| Ga-soc-MOF-1a | $NO_3-$ | 1350 | 0.48 |
| Al-soc-MOF-1d | OH– | 1500 | 0.56 |

Therefore, the impact of the nature of the metal contained in the soc-MOF on the separation performances relevant to ROG and NG upgrading, e.g., $C_3H_8$ over $CH_4$ was evaluated. Analyzing of the single-gas adsorption data of $C_3H_8$ and $CH_4$ (FIGS. 10A-10D, 17) using a combination of a Toth model and ideal adsorbed solution theory (IAST) for all soc-MOF analogues showed that Fe-soc-MOF-1b exhibited the highest $C_3H_8/CH_4$ selectivity (ca. 600-800 at 1 bar), whereas the trends of In-soc-MOF-1b and Ga-soc-MOF-1a showed more or less the same performance (Table 4).

TABLE 4

Comparison of $C_3H_8/CH_4$ selectivity of soc-MOF adsorbents as compared to best conventional MOFs

| MOF | IAST $C_3H_8/CH_4$ selectivity at 1 bar | Composition |
|---|---|---|
| 13X | 158 | 5/95 |
| MFM-202a | 90 | 50/50 |
| RE-1,4-NDC-fcu-MOFs | 325 | 5/95 |
| tbo-MOF-2 | 140 | 5/95 |

TABLE 4-continued

Comparison of $C_3H_8/CH_4$ selectivity of soc-MOF adsorbents as compared to best conventional MOFs

| MOF | IAST $C_3H_8/CH_4$ selectivity at 1 bar | Composition |
|---|---|---|
| Ga-soc-MOF-1a | 370 | 5/95 |
| In-soc-MOF-1c | 500 | 5/95 |
| Fe-so-MOF-1b | 800 | 5/95 |

Figure 18:
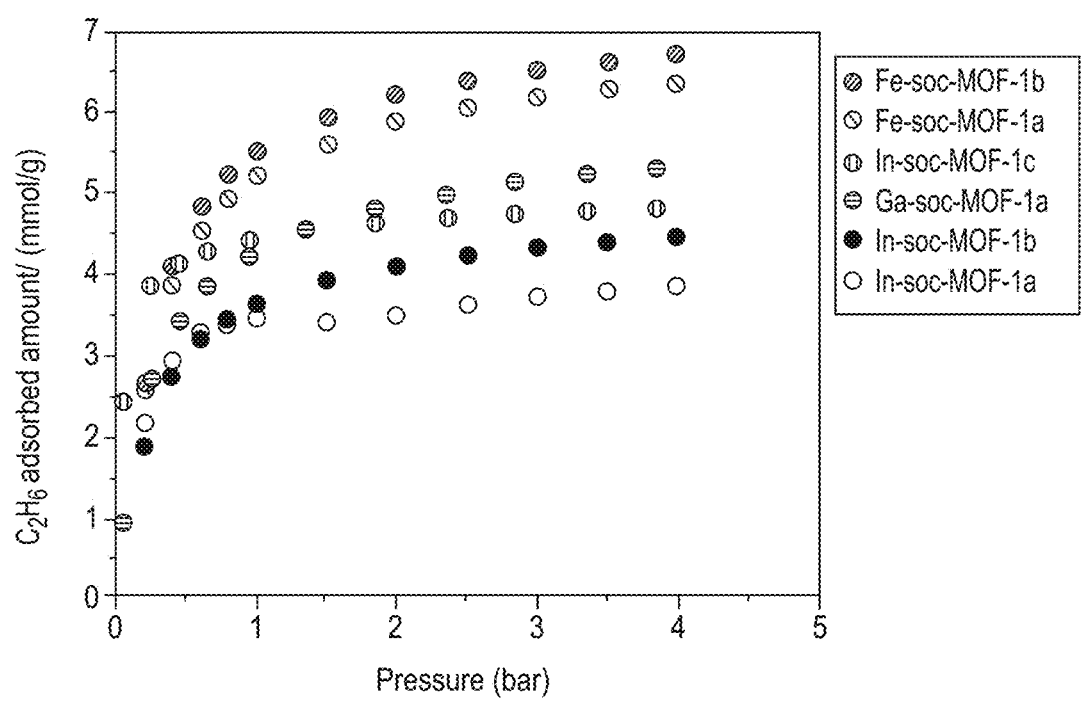
FIG. 18 is a graphical view of $C_2H_6$ adsorption isotherms on all of soc-MOF analogues at 298 K, according to one or more embodiments of the present disclosure.
Figure 19:
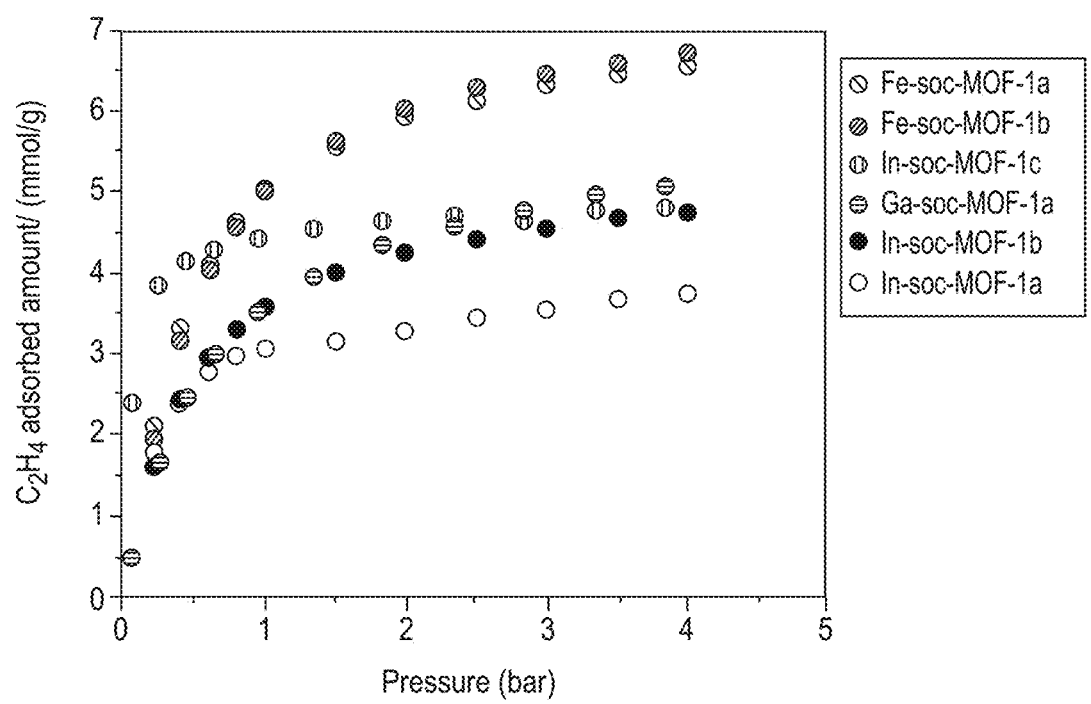
FIG. 19 is a graphical view of $C_2H_4$ adsorption isotherms on all of soc-MOF analogues at 298 K, according to one or more embodiments of the present disclosure.
Figure 20:
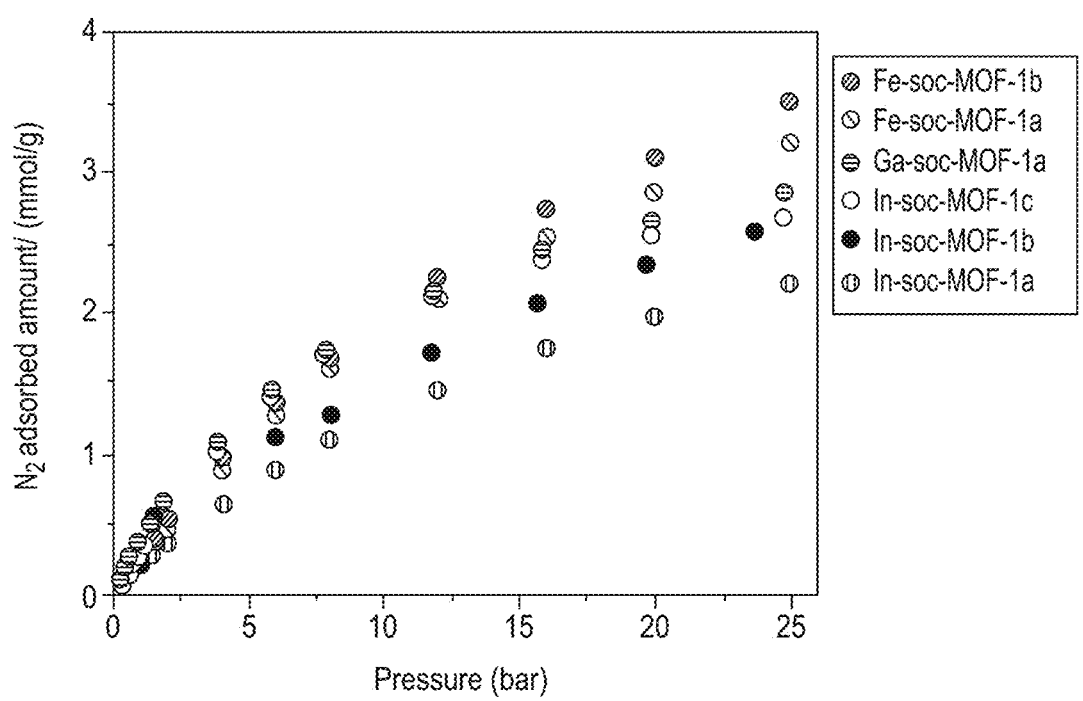
FIG. 20 is a graphical view of $N_2$ adsorption isotherms on all of soc-MOF analogues at 298 K, according to one or more embodiments of the present disclosure.
Figure 21:
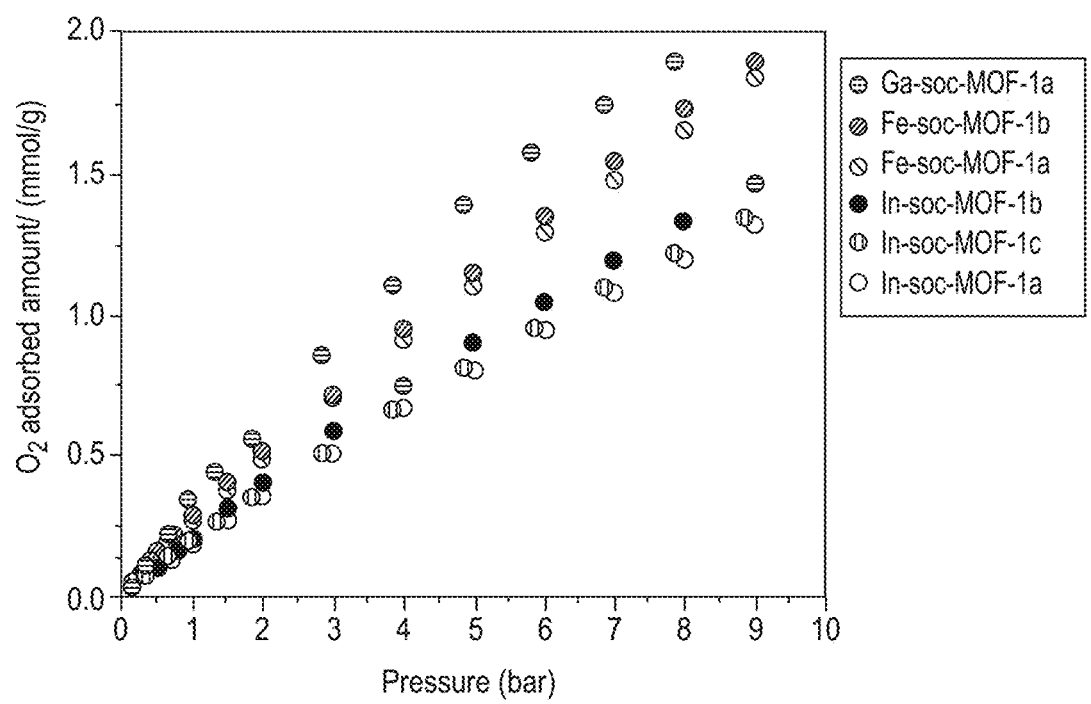
FIG. 21 is a graphical view of $O_2$ adsorption isotherms on all of soc-MOF analogues at 298 K, according to one or more embodiments of the present disclosure.

Encouraged by the high $C_3H_8/CH_4$ separation factor, the potential of the soc-MOF platform for $C_{2+}/CH_4$ separations was explored. Comparing the $C_3H_6$ (FIG. 10B), $C_3H_8$ (FIG. 10C), $C_2H_6$ (FIG. 18) and $C_2H_4$ (FIG. 19) adsorption isotherms for all of the evaluated soc-MOFs revealed much higher $C_{2+}$ adsorption uptakes for Fe-soc-MOF-1a and Fe-soc-MOF-1b, unlike the other gallium- and indium-based analogues with different counter ions. Notably, the trends of $CH_4$ (FIG. 10D), $N_2$ (FIG. 20) and $O_2$ (FIG. 21) adsorption were similar for all soc-MOFs, and the uptakes were substantially lower, particularly at low relative pressures. Given the lower adsorption uptake and polarizability (Table 5) of $N_2$ and $H_2$ relative to $CH_4$ and the much higher uptake and polarizability of $C_{2+}$ ($C_2H_6$, $C_3H_8$ and $C_4H_{10}$), the selectivity for separating gas pair systems, such as $C_{2+}/N_2$ and $C_{2+}/H_2$, was expected to be higher than that for $C_{2+}/CH_4$.

TABLE 5

Polarizability of major common gases containing in NG and ROG

| Gas | Polarizability × $10^{25}/cm^3$ |
|---|---|
| $H_2$ | 08.00 |
| $N_2$ | 17.40 |
| $O_2$ | 15.80 |
| $CH_4$ | 25.93 |
| $C_2H_6$ | 44.50 |
| $C_2H_4$ | 42.50 |
| $C_3H_8$ | 64.00 |
| $C_3H_6$ | 62.60 |
| n-$C_4H_{10}$ | 82.00 |

Figure 22:
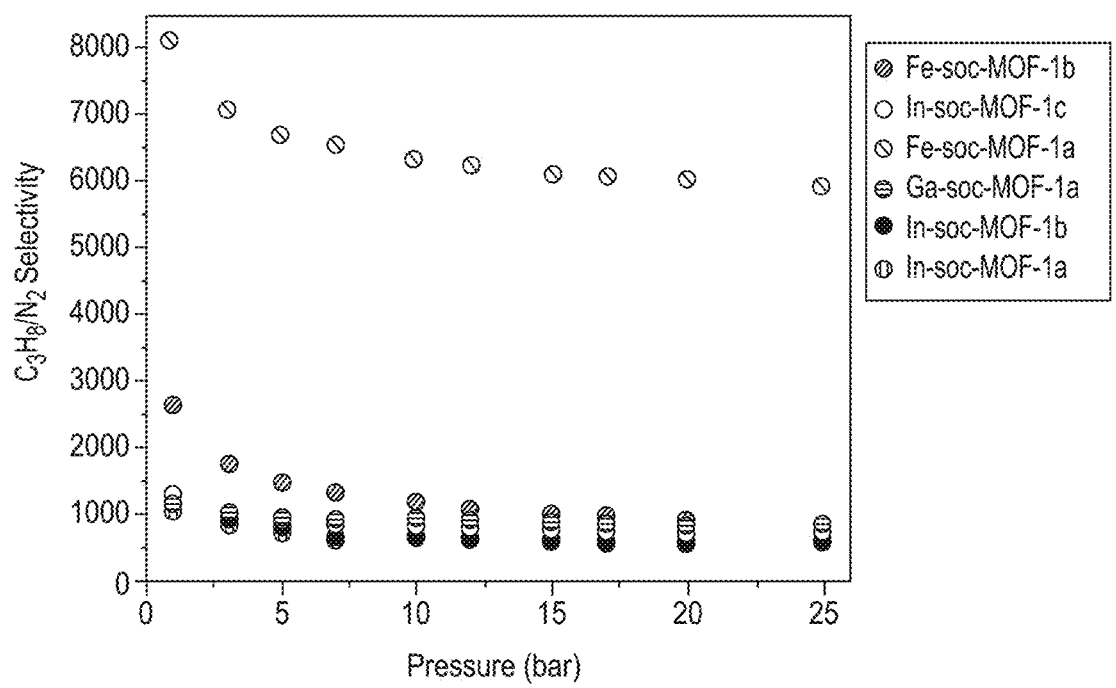
FIG. 22 is a graphical view of $C_3H_8/N_2$ selectivity for all soc-MOFs as determined using IAST combined with Toth Model, according to one or more embodiments of the present disclosure.

Analyzing the single-gas adsorption data of $C_3H_8$ and $N_2$ using the combination of the Toth and IAST models revealed very high $C_3H_8/N_2$ selectivities (FIG. 22) for all of the evaluated soc-MOF analogues. Although accurately predicting the $C_3H_8/H_2$ selectivity using macroscopic modeling was not possible because of the low uptake and high degree of uncertainty in the single-gas adsorption of $H_2$, a very high $C_{2+}/H_2$ equilibrium selectivity can be foreseen using the soc-MOF platform.

Figure 17:
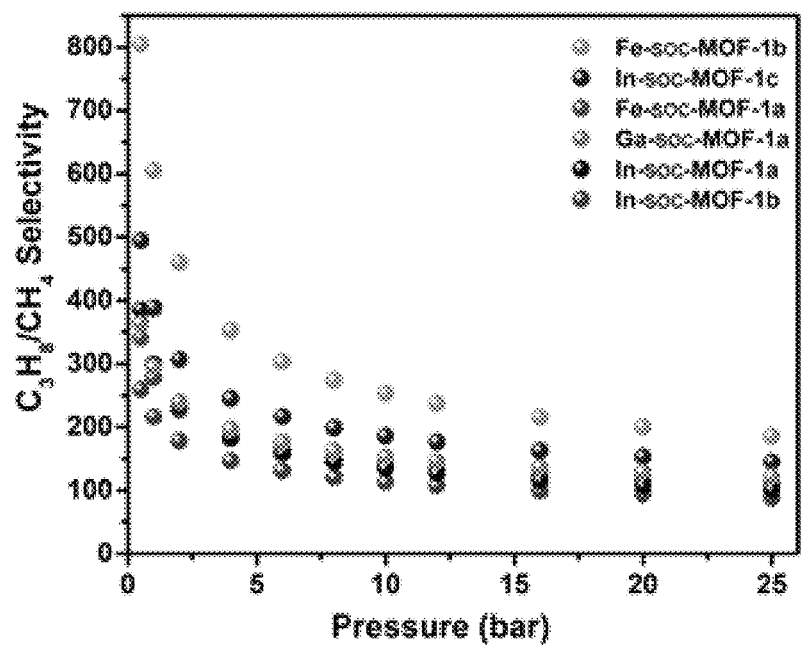
FIG. 17 FICS. 17A 17B is a graphical view of $C_3H_8/CH_4$ selectivities of all the soc-MOF analogues studied in this work, according to one or more embodiments of the present disclosure.

To better understand the observed $C_{2+}/CH_4$ equilibrium selectivity, the heats of adsorption of $CH_4$, $C_3H_8$ and n-$C_4H_{10}$ were experimentally determined using a thermogravimetry-differential scanning calorimetry (TG-DSC) setup for the Ga-soc-MOF-1a. Interestingly, the $C_3H_8$ and n-$C_4H_{10}$ heats of adsorption were 40.3 and 50.1 kJ/mol, respectively, whereas that of $CH_4$ was substantially lower and more difficult to quantify using the TG-DSC measurements (26±5 kJ/mol) due to the low uptake of $CH_4$. The relatively open soc-MOF framework, which has an estimated channel size of 5.2-6.5 Å that favors non-resistant diffusion, suggested that the $C_{2+}$ and $CH_4$ separation was mainly governed by the adsorption equilibrium, which led to relatively strong interactions and uptake of $C_{2+}$ compared to $CH_4$ and, thus, supported the observed selectivity toward $C_{2+}$, as exemplified by the $C_3H_8/CH_4$ gas mixture (FIG. 17). This behavior was reflected in the much steeper $C_{2+}$ adsorption isotherms obtained at relatively low pressures (FIG. 10), which translated into larger k energetic (Toth) parameters (Table 6), as determined by fitting the $C_3H_8$ adsorption isotherms to the Toth model.

TABLE 6

Toth parameters for adsorption on soc-MOF analogues

| | Parameters | Gases | | | | | |
|---|---|---|---|---|---|---|---|
| | | $CH_4$ | $C_2H_6$ | $C_3H_8$ | n-$C_4H_{10}$ | $CO_2$ | $N_2$ |
| In-soc-MOF-1a | $n_s$ | 5.4 | 4.04 | 4.2 | — | 8.23 | 5.2 |
| | K* | 0.107 | 5.7 | 77.7 | — | 0.32 | 0.03 |
| | m | 1.06 | 1.01 | 0.59 | — | 1.04 | 0.82 |
| In-soc-MOF-1b | $n_s$ | 5.9 | 4.77 | 4.7 | — | 9.14 | 4.99 |
| | K* | 0.12 | 3.23 | 393 | — | 0.32 | 0.04 |
| | m | 1.03 | 0.99 | 0.42 | — | 1.05 | 1.05 |
| In-soc-MOF-1c | $n_s$ | 5.49 | 5.04 | 4.63 | — | 8.25 | 4.7 |
| | K* | 0.13 | 0.43 | 599 | — | 0.43 | 0.08 |
| | m | 1.04 | 1 | 0.41 | — | 1 | 0.79 |
| Fe-soc-MOF-1a | $n_s$ | 7.65 | 7.01 | 6.13 | — | 11.64 | 6.35 |
| | K* | 0.12 | 2.84 | 1716 | — | 0.34 | 0.043 |
| | m | 1.02 | 1.01 | 0.52 | — | 1.06 | 0.967 |
| Fe-soc-MOF-1b | $n_s$ | 8.33 | 7.54 | 6.52 | 2 | 12.5 | 8.43 |
| | K* | 0.102 | 2.61 | 1957 | 193 | 0.33 | 0.03 |
| | m | 1.06 | 0.35 | 0.35 | 0.55 | 1.06 | 0.84 |
| Ga-soc-MOF-1a | $n_s$ | 6.04 | 5.99 | 5 | 3.99 | 8.8621 | 4.71 |
| | K* | 0.12 | 4.58 | 315 | 3600 | 0.308 | 0.09 |
| | m | 1.003 | 0.78 | 0.47 | 0.33 | 1.24 | 0.8 |
| Al-soc-MOF-1d | $n_s$ | 8 | 6.34 | 5.7 | 4.89 | — | — |
| | K* | 0.14 | 3.37 | 80.4 | 1116 | — | — |
| | m | 0.92 | 1.21 | 0.77 | 0.61 | — | — |

*parameter K has direct relation to the heat of adsorption

Figure 23:
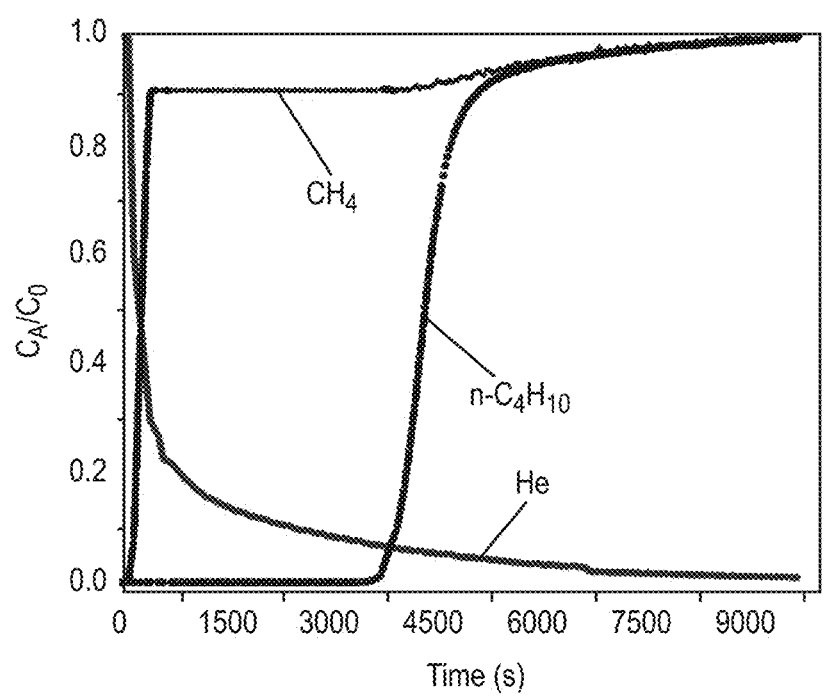
FIG. 23 is a graphical view of n-$C_4H_{10}/CH_4$: 2/98 column breakthrough test performed on Fe-soc-MOF-1b at 298 K and 1 bar, according to one or more embodiments of the present disclosure.
Figure 24A:
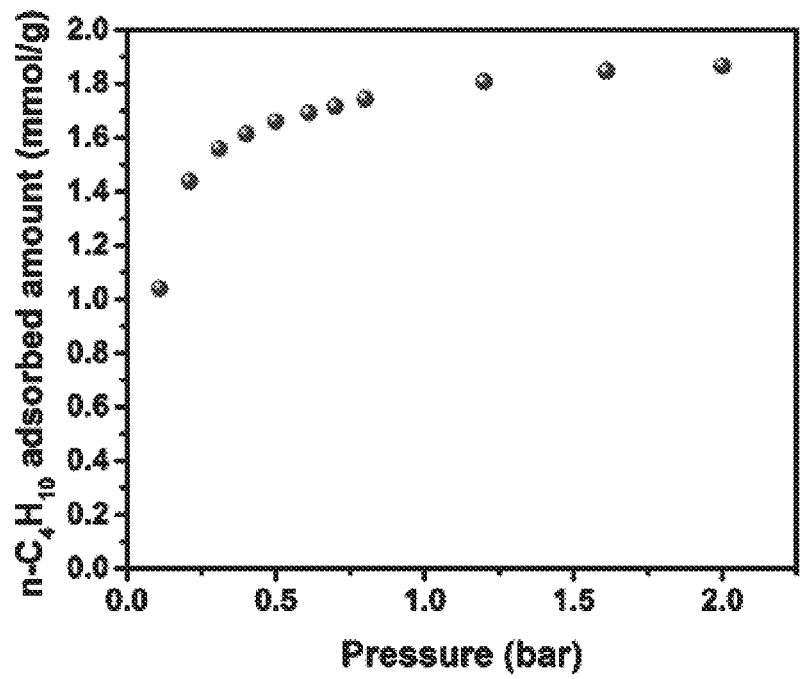
FIGS. 24A-24B is a graphical view of (top) n-$C_4H_{10}$ adsorption isotherm and (bottom) n-$C_4H_{10}/CH_4$ selectivity for Fe-soc-MOF-1b as determined using IAST combined with Toth Model, according to one or more embodiments of the present disclosure.
Figure 24B:
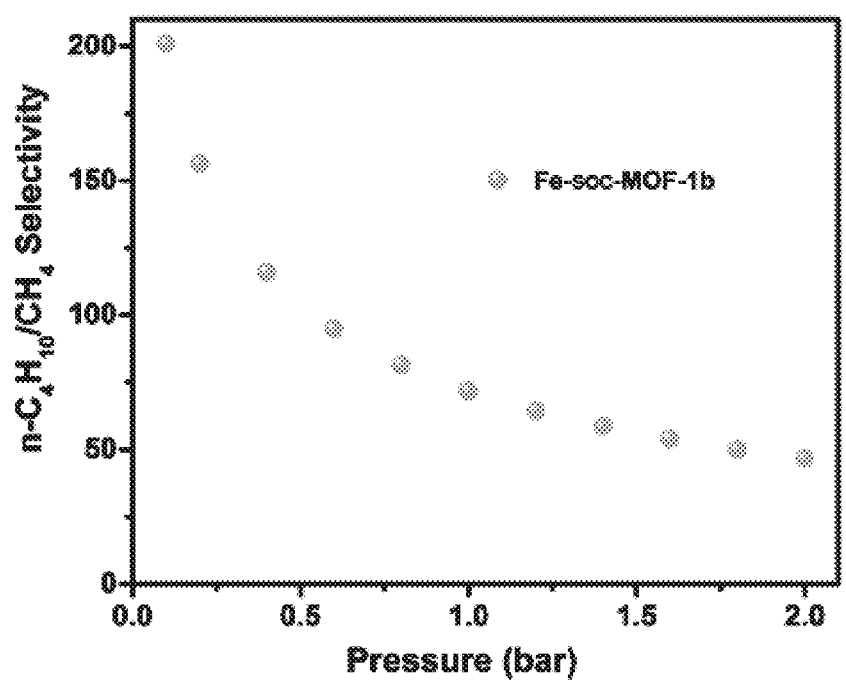

The performance of the soc-MOF analogues, which was determined by performing single-gas adsorption and calorimetric studies and making macroscopic mixed-gas predictions for $C_{2+}$/$CH_4$ gas pair systems, was further experimentally confirmed by n-$C_4H_{10}$/$CH_4$ (2/98) mixed-gas adsorption on Fe-soc-MOF-1b and column breakthrough studies. FIG. 23 shows that $CH_4$ passed through the column (initially pressurized with helium) almost immediately, whereas n-$C_4H_{10}$ was retained for about 3500 s, which was equivalent to 0.85 mmol/g of n-$C_4H_{10}$ adsorbed in the column. This result was in a good agreement with the uptake determined from the single-gas adsorption isotherm recorded for n-$C_4H_{10}$ at 298 K (FIG. 24A). Notably, because the amount of $CH_4$ retained in the column was not quantifiable in gas mixture, precisely determining the n-$C_4H_{10}$/$CH_4$ selectivity was not possible. However, at 2% n-$C_4H_{10}$, the very high separation ability of this material was apparent. Interestingly, this significant selectivity was directly correlated with the interactions between the guest molecules and the host adsorbent, as evidenced by the obvious difference in the isosteric heats of adsorption between n-$C_4H_{10}$ (50.1 kJ/mol) and $CH_4$ (26±5 kJ/mol).

Microscopic Mechanisms of Separation in soc-MOFs

Figure 25:
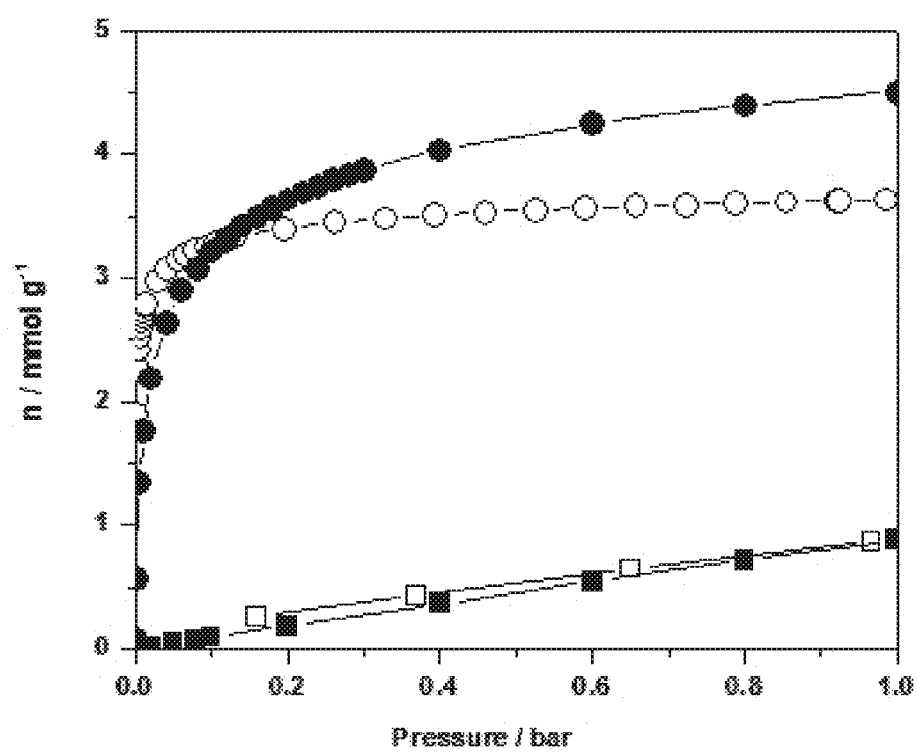
FIG. 25 is a comparison of the single component adsorption isotherms for $CH_4$ (squares) and n-$C_4H_{10}$(circles) at 298 K in Ga-soc-MOF-1a: GCMC simulations (full symbols and solid lines) and experiments (empty symbols and dashed lines), according to one or more embodiments of the present disclosure.
Figure 26:
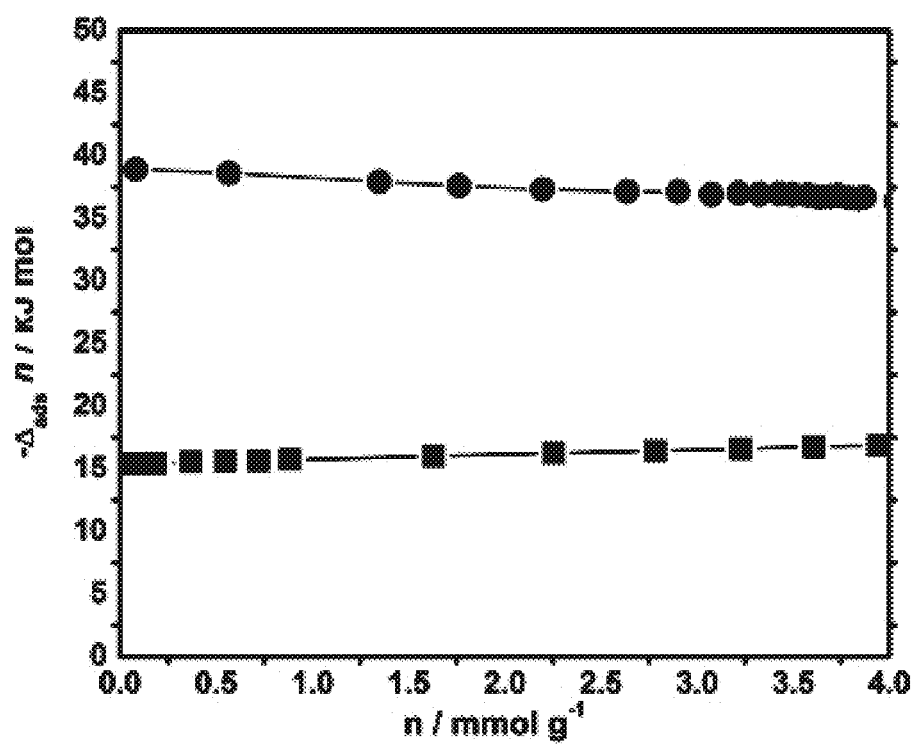
FIG. 26 is a comparison of the single component adsorption isotherms for $CH_4$ (squares) and $n-C_4H_{10}$ (circles) at 298 K in Ga-soc-MOF-1a: GCMC simulations (full symbols and solid lines) and experiments (empty symbols and dashed lines), according to one or more embodiments of the present disclosure.
Figure 27A:
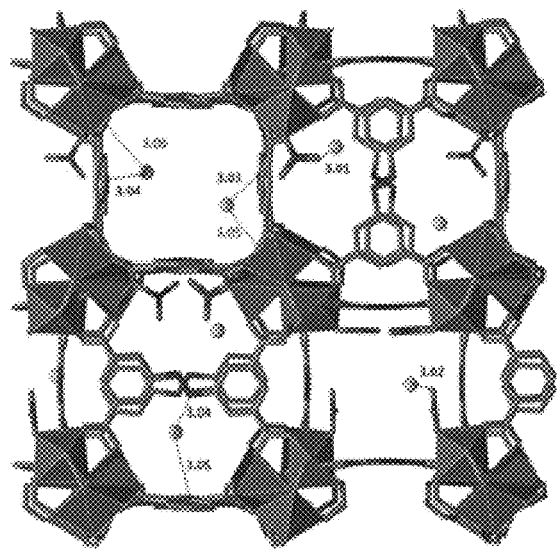
FIGS. 27A-27D are snapshots of local views along the ab axis extracted from the GCMC simulations performed on Ga-soc-MOF-1a for single components—$CH_4$ at 0.5 bar (a) and $n-C_4H_{10}$ (b) at 0.01 bar—and the binary mixture $n-C_4H_{10}/CH_4$:02/98 considering the accessibility (c) and non-accessibility (d) of the cages for $CH_4$. The interacting distances are reported in Å, and the framework atoms and molecules are represented as follows: Ga, brown polyhedra; C, grey; O, red; H, white; $CH_4$, green; and $n-C_4H_{10}$, cyan, according to one or more embodiments of the present disclosure.
Figure 27B:
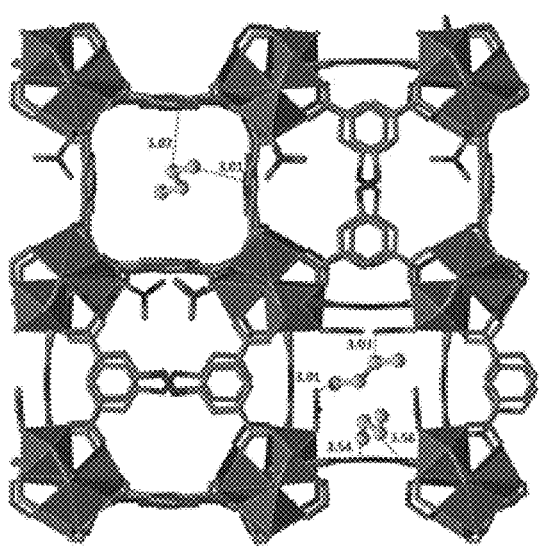
Figure 28:
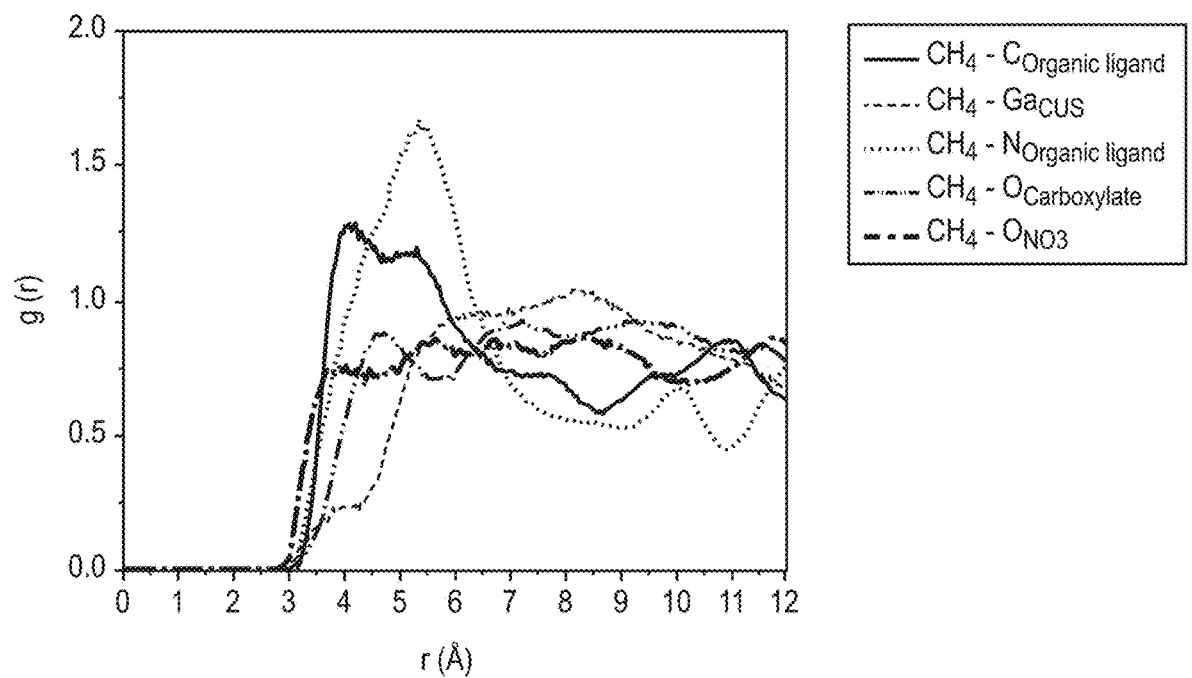
FIG. 28 is a graphical view of radial distribution functions between $CH_4$ and the atoms of the MOF framework (organic linker carbon, $C_{Organic\ Linker}$: black, carboxylate oxygen, $O_{Carboxylate}$: m red, organic linker nitrogen, $N_{Organic\ Linker}$: blue, nitrate oxygen, $O_{NO3}$: green and CUS Gallium $Ga_{CUS}$: cyan) extracted from the single component adsorption in Ga-soc-MOF-1a at 0.1 bar and 298 K, according to one or more embodiments of the present disclosure.
Figure 29A:
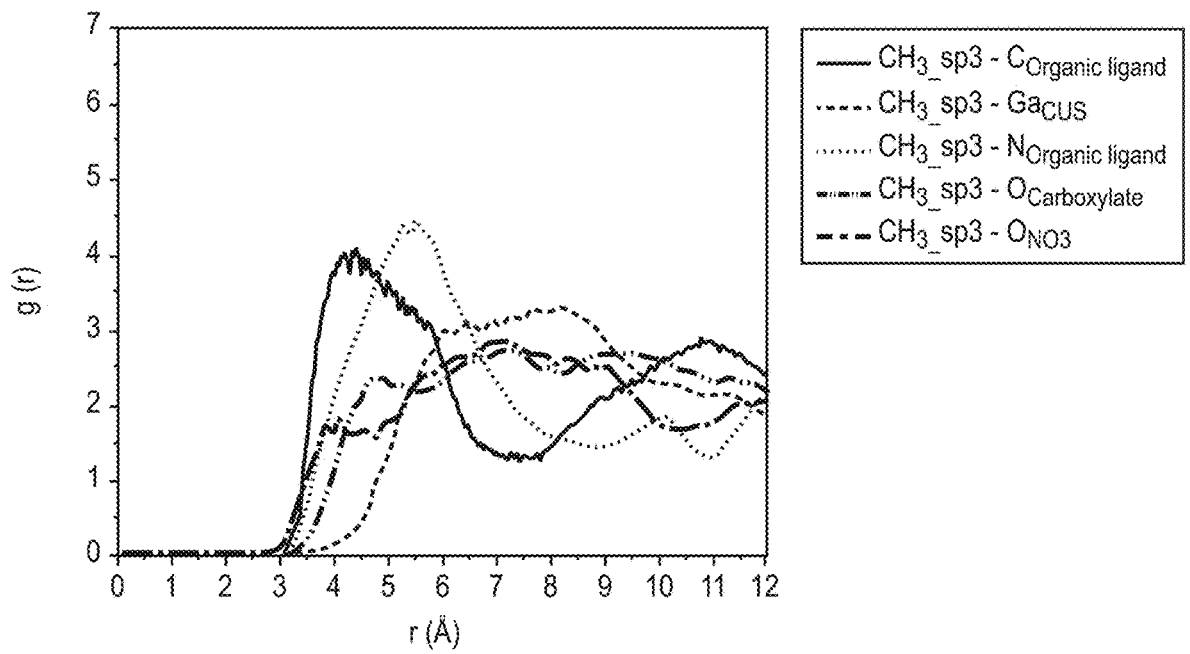
FIGS. 29A-29B are graphical views of radial distribution functions between $n-C_4H_{10}$ and the atoms of the MOF framework: —$CH_3$ (a) and —$CH_2$— (b) centers (organic linker carbon, $C_{Organic\ Linker}$: black, carboxylate oxygen, $O_{Carboxylate}$: red, organic linker nitrogen, $N_{Organic\ Linker}$: blue, nitrate oxygen, $O_{NO3}$: green and CUS Gallium $Ga_{CUS}$: cyan) extracted from the single component adsorption in Ga-soc-MOF-1a at 0.01 bar and 298 K, according to one or more embodiments of the present disclosure.
Figure 29B:
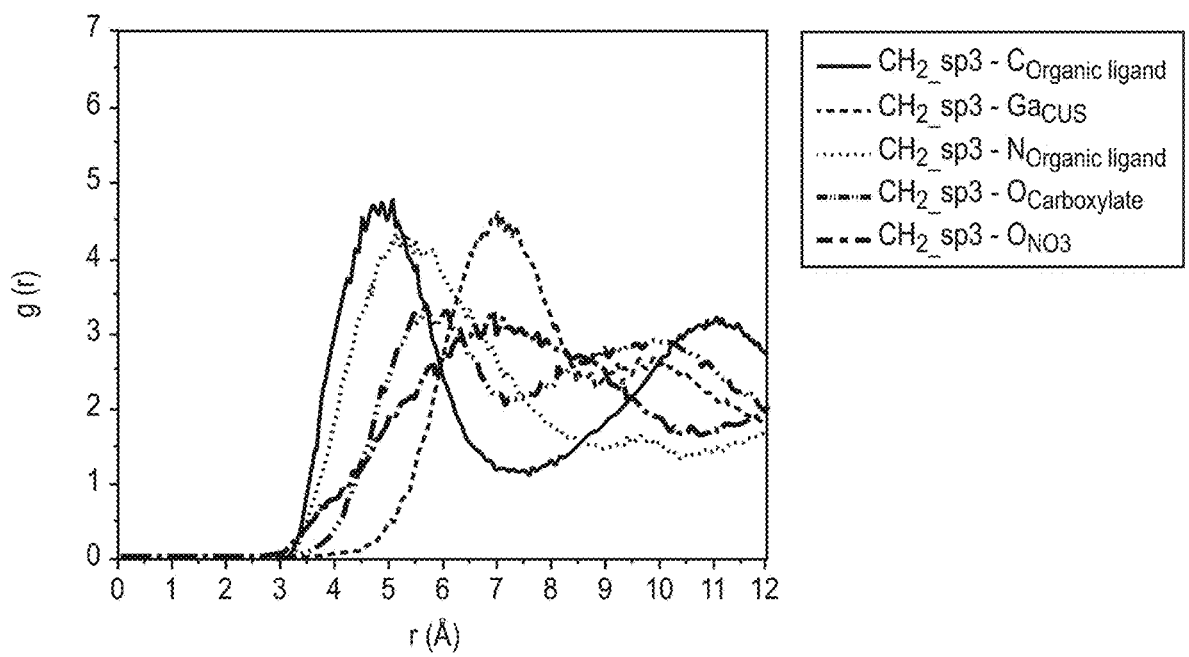
Figure 30A:
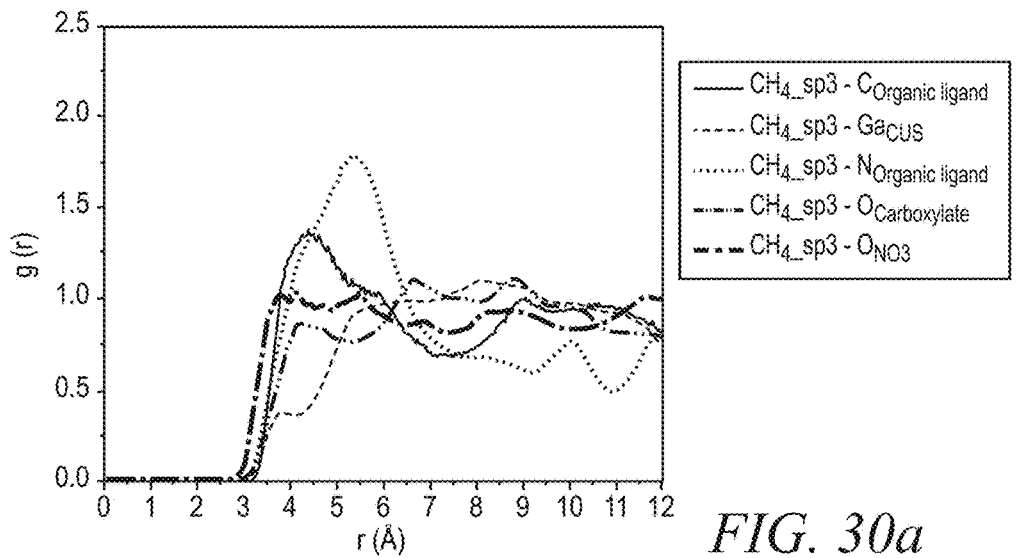
FIGS. 30A-30C are graphical views of radial distribution functions between both $CH_4$ and $n-C_4H_{10}$ and the atoms of the MOF framework: $CH_4$ (a), $CH_3$ (b), and —$CH_2$— (c) centers (organic linker carbon, $C_{Organic\ Linker}$: black, carboxylate oxygen, $O_{Carboxylate}$: red, organic linker nitrogen, $N_{Organic\ Linker}$: blue, nitrate oxygen, $O_{NO3}$: green and CUS Gallium $Ga_{CUS}$: cyan) extracted from the GCMC simulations for a binary mixture (5% $n-C_4H_{10}$, 95% $CH_4$) in Ga-soc-MOF-1a at 1 bar and 298 K, according to one or more embodiments of the present disclosure.
Figure 30B:
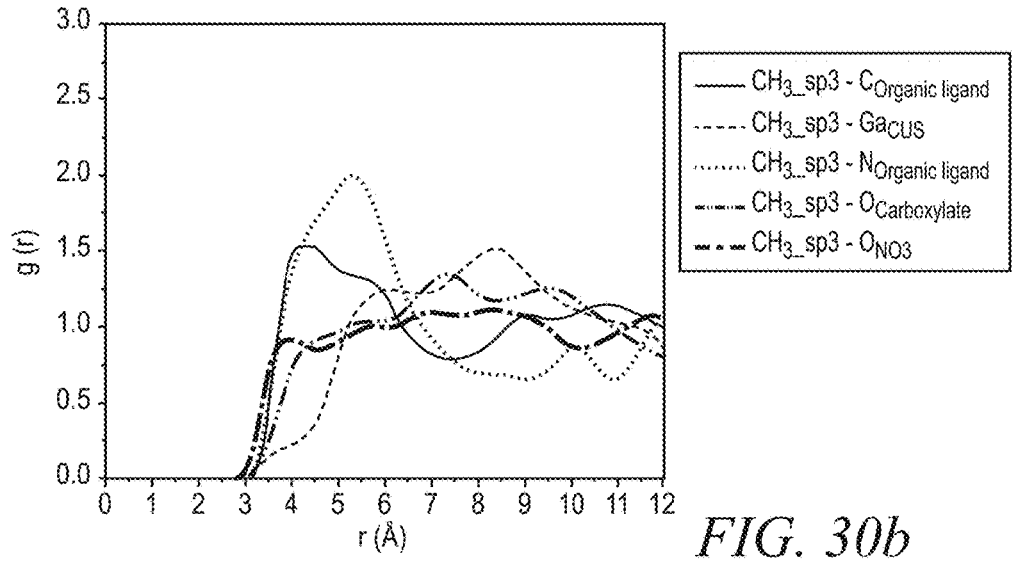
Figure 30C:
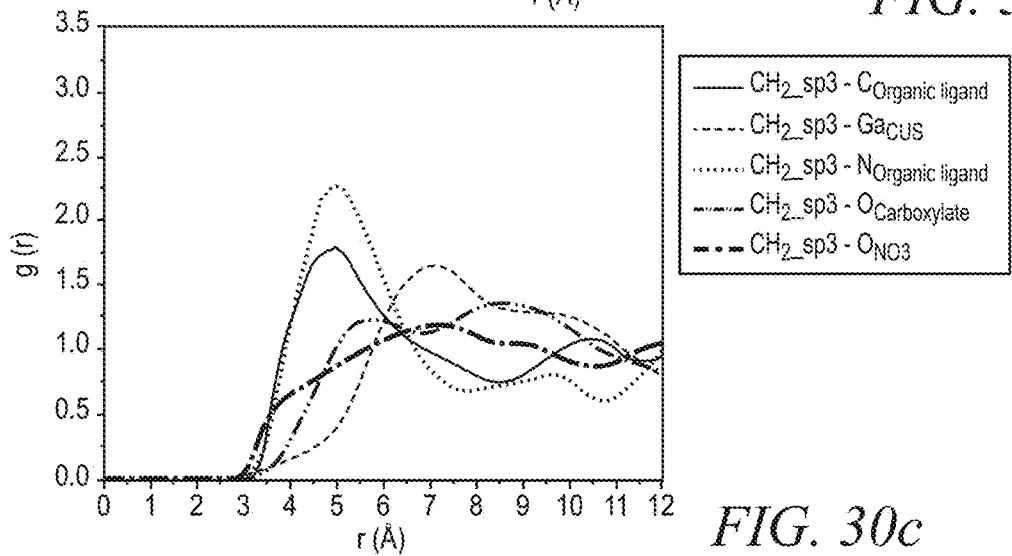
Figure 31A:
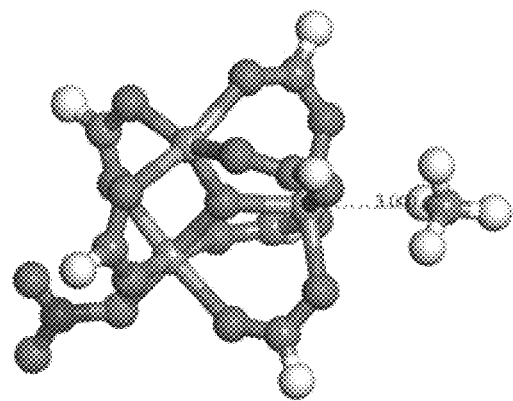
FIGS. 31A-31B are schematic diagrams of DFT geometry optimization of the $CH_4$—Ga-soc-MOF-1a cluster (a) and the $n-C_4H_{10}$—Ga-soc-MOF-1a cluster (b), where the arrow indicates the considered direction considered to displace step-wise the guest from the cluster (the color code is the same as defined in FIG. 11), according to one or more embodiments of the present disclosure.
Figure 31B:
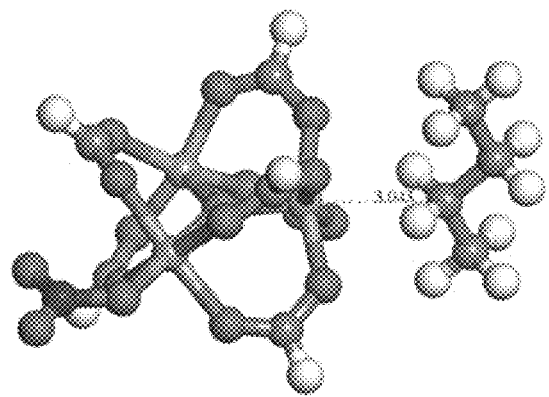

Since the treatment of high-spin state (d elements) cations (e.g. $Fe^{3+}$) was still much more challenging using quantum calculation, computational work, regarding the separation mechanism, focused on the $Ga^{3+}$ (p element) analogue. In this work, Grand canonical Monte Carlo (GCMC) simulations based on the use of a new density functional theory (DFT)-derived guest/Ga(III) force fields (see the SI) were employed to shed light on the equilibrium adsorption mechanism responsible for the high $C_{2+}$/$CH_4$ selectivity. As a preliminary step, these calculations reasonably reproduced the adsorption isotherms for $CH_4$ and n-$C_4H_{10}$ (FIG. 25) and confirmed the observed higher affinity for n-$C_4H_{10}$ than for $CH_4$, yielding theoretical adsorption enthalpies at low coverages of −38.9 kJ/mol and −18.1 kJ/mol, respectively (FIG. 26). Analyzing the adsorption mechanism revealed that $CH_4$ molecules were equally distributed over cages and channels via weak interactions with both the organic node and the Ga(III) metal sites, showing characteristic interacting distances of ~3.0 Å (see FIG. 27A and the radial distribution functions for the corresponding pairs in FIGS. 28-30). Notably, the relatively large kinetic diameter of n-$C_4H_{10}$ (4.3 Å) preventeds its passage through the narrow window aperture (~4.5-Å pore size) to reach the cages of the Ga-soc-MOF-1a. Thus, these alkane molecules preferentially occupied the centers of the channels associated with cumulative van der Waals (vdW) interactions between each methyl group and the soc-MOF pore walls, showing characteristic distances exceeding 3.0 Å (FIGS. 27B and 31).

Figure 27C:
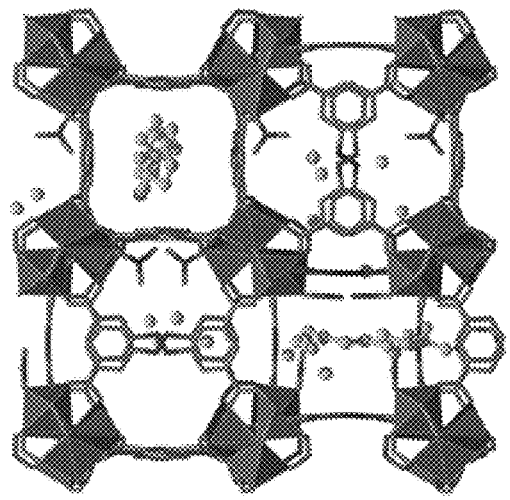
Figure 27D:
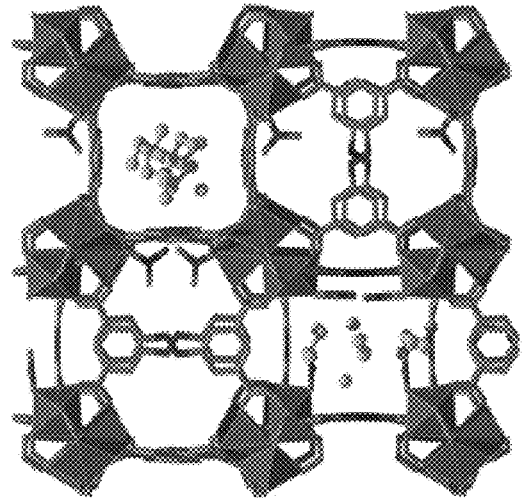
Figure 32:
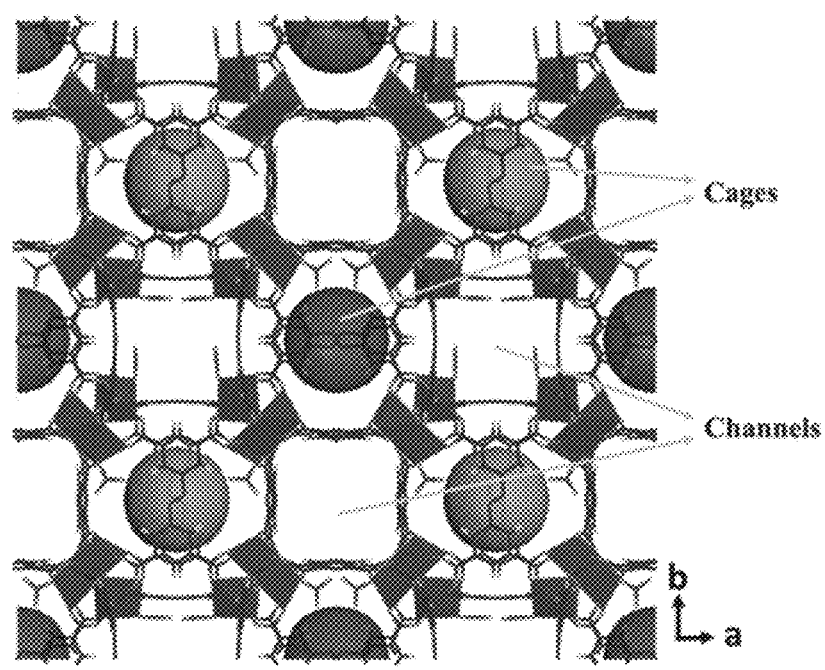
FIG. 32 is a schematic diagram of the inaccessible cages of Ga-soc-MOF-1a for $n-C_4H_{10}$ due to steric limitation induced by windows of smaller size than the kinetic diameter of this alkane molecule (color code: Ga, brown; C, dark gray; O, red; N, blue; H, light gray), according to one or more embodiments of the present disclosure.

Interestingly, the simulation studies predicted that the Ga-soc-MOF-1 would be thermodynamically selective toward n-$C_4H_{10}$ over $CH_4$ at pressures up to 1 bar for a molar mixture composition of n-$C_4H_{10}$/$CH_4$ of 02/98. The GCMC-simulated n-$C_4H_{10}$/$CH_4$ selectivity of 186 at 298 K and 1 bar was slightly lower than that obtained by applying the IAST model (~300). This deviation was associated with an overestimation of the simulated $CH_4$ uptake in the gas mixture because of the possibility that this guest molecule occupied the cages, as shown in FIG. 27C. In fact, n-$C_4H_{10}$ can impede $CH_4$ from accessing the cages. This scenario was mimicked in further GCMC simulations by blocking the cages with dummy atoms (FIG. 32). The resulting high n-$C_4H_{10}$/$CH_4$ selectivity was in good agreement with the experimental value. The origin of this selectivity was explained by performing an in-depth analysis of the microscopic co-adsorption mechanism. FIG. 27D shows that both guests coexisted in the channels; however, relatively more n-$C_4H_{10}$ molecules were adsorbed because of their stronger interactions with the pore walls compared to those of $CH_4$. This molecular-level insight regarding the governing mechanism supported the thermodynamically driven nature of the present separation. The conclusions drawn from this study on the key role of the coordinately unsaturated sites were transferable to $In^{3+}$ case and the most complex case of $Fe^{3+}$.

$H_2S$ Removal from ROG and NG Using the soc-MOF Platform

One of challenging upgrading steps in the treatment of ROG and NG is the handling of $H_2S$ that is generally present in ROG and NG at various compositions ranging from ppm to percentage levels. The removal of $H_2S$ is necessary to avoid poisoning of both the adsorbents used in different processes of the upgrading procedure and the catalyst involved in the subsequent utilization of $H_2$ and $CH_4$. The exceptional capabilities of the soc-MOF platform for removing $C_{2+}$ from important commodities, such as $CH_4$, led to exploring the suitability of this MOF platform to effectively remove $H_2S$. Notably, depending on the compositions of ROG and NG, which dictate the stage at which $H_2S$ must be removed and the nature of the process selected, specific requirements for the separation agents regarding their affinities for $H_2S$ vs. $CH_4$, $C_{2+}$ and $CO_2$ should be considered.

Figure 33:
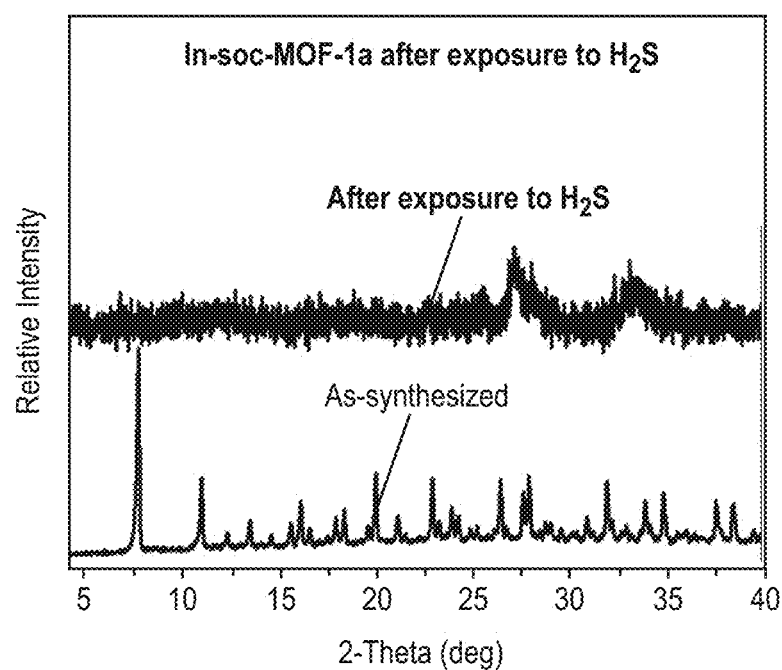
FIG. 33 is a PXRD of In-soc-MOF-1a after $H_2S$ exposure, according to one or more embodiments of the present disclosure.
Figure 34:
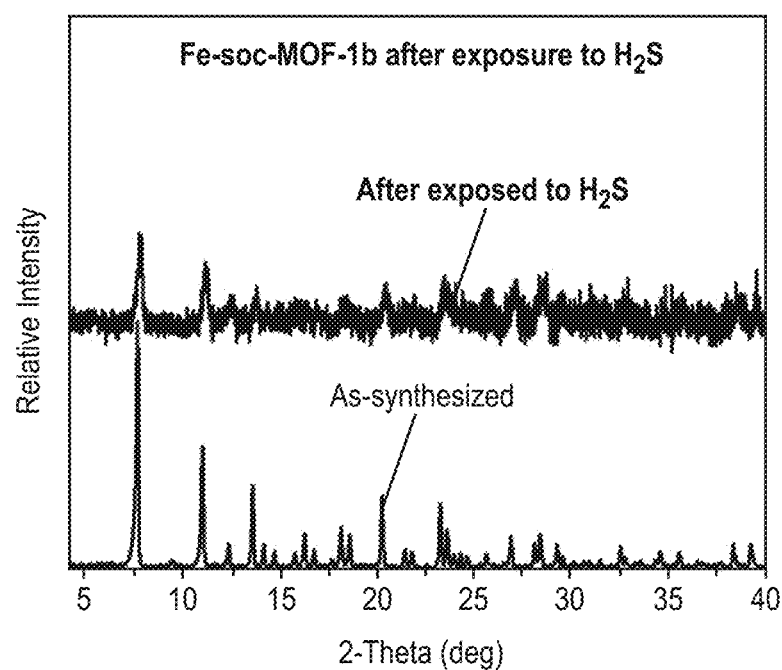
FIG. 34 is a PXRD of Fe-soc-MOF-1b after $H_2S$ exposure, according to one or more embodiments of the present disclosure.
Figure 35:
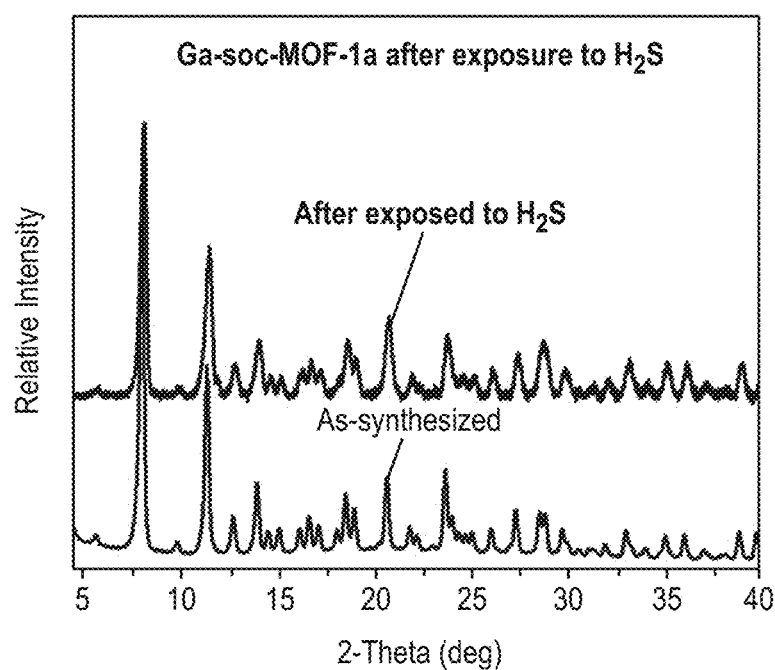
FIG. 35 is a PXRD of Ga-soc-MOF-1a after $H_2S$ exposure, according to one or more embodiments of the present disclosure.

The investigation of the use of various soc-MOF analogues revealed that the $In^{3+}$ and $Fe^{3+}$ analogues exhibited low tolerances to $H_2S$ and a loss of crystallinity, as evidenced by the powder X-ray diffraction (PXRD) patterns collected for In-soc-MOF-1a (FIG. 33) and Fe-soc-MOF-1b (FIG. 34) after $H_2S$ adsorption cycles. In contrast, Ga-soc-MOF-1a showed a high $H_2S$ tolerance and stability, as evidenced by the similarity between the PXRD patterns obtained before and after exposure to $H_2S$ (FIG. 35). In this case, the judicious choice of the intra-framework metal was very crucial for the soc-MOF chemical stability.

Figure 36:
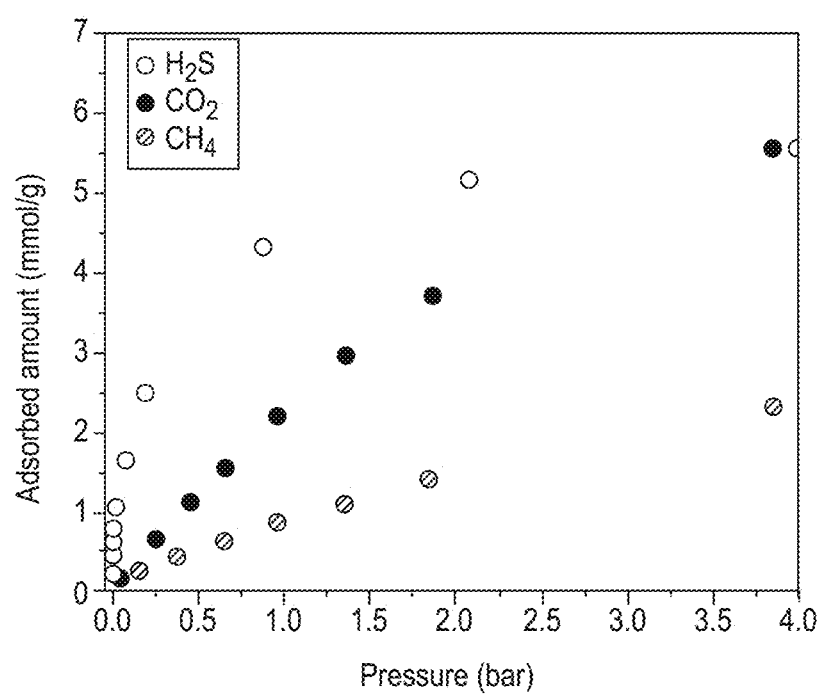
FIG. 36 is a graphical view of $H_2S$ and $CO_2$ and $CH_4$ adsorption up to 4 bar on Ga-soc-MOF-1a, according to one or more embodiments of the present disclosure.

Accordingly, single-component $H_2S$ gas adsorption was performed at 298 K on Ga-soc-MOF-1a (FIG. 36), and the results were compared to those collected for $CH_4$ and $CO_2$. The initial evaluation of the affinity toward $H_2S$ based on the steepness of $H_2S$, $CH_4$ and $CO_2$ adsorption isotherms revealed that $H_2S$ exhibited the highest affinity toward the Ga-soc-MOF-1a framework, which is a desirable feature for an $H_2S$ adsorbent in NG upgrading.

Figure 37:
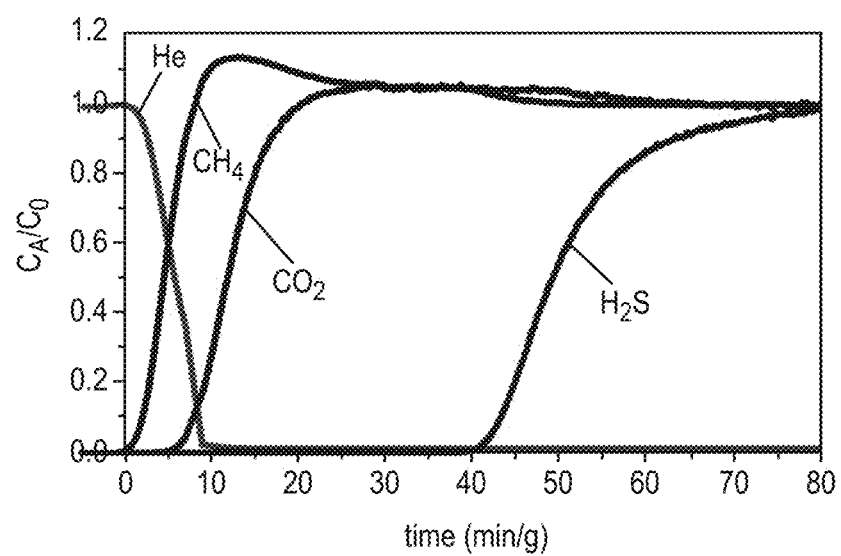
FIG. 37 is a graphical view of column breakthrough test of $CO_2/H_2S/CH_4$:5/5/90 with a flow rate of 10 $cm^3/min$ using Ga-soc-MOF-1a at 298 K in TSR mode, according to one or more embodiments of the present disclosure.
Figure 38:
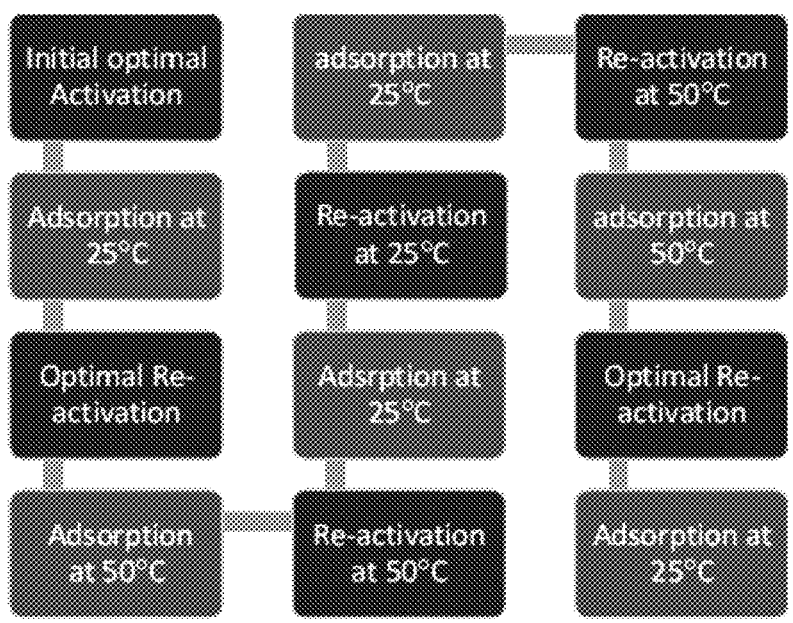
FIG. 38 is a flowchart of a sequence of tests for adsorption column breakthrough studies to evaluate the performances of the materials in temperature swing cyclic (TSR) and vacuum swing regeneration (VSR) modes using $CO_2/H_2S/CH_4$:5/5/90 mixture, according to one or more embodiments of the present disclosure.

Furthermore, the favorable selectivity toward $H_2S$ and performance stability were confirmed by repetitive column breakthrough tests (the 1st cycle is represented in FIG. 37) under various conditions in a cyclic manner, which is relevant to the temperature swing regeneration (TSR) and vacuum swing regeneration (VSR) modes (FIG. 38).

Figure 39:
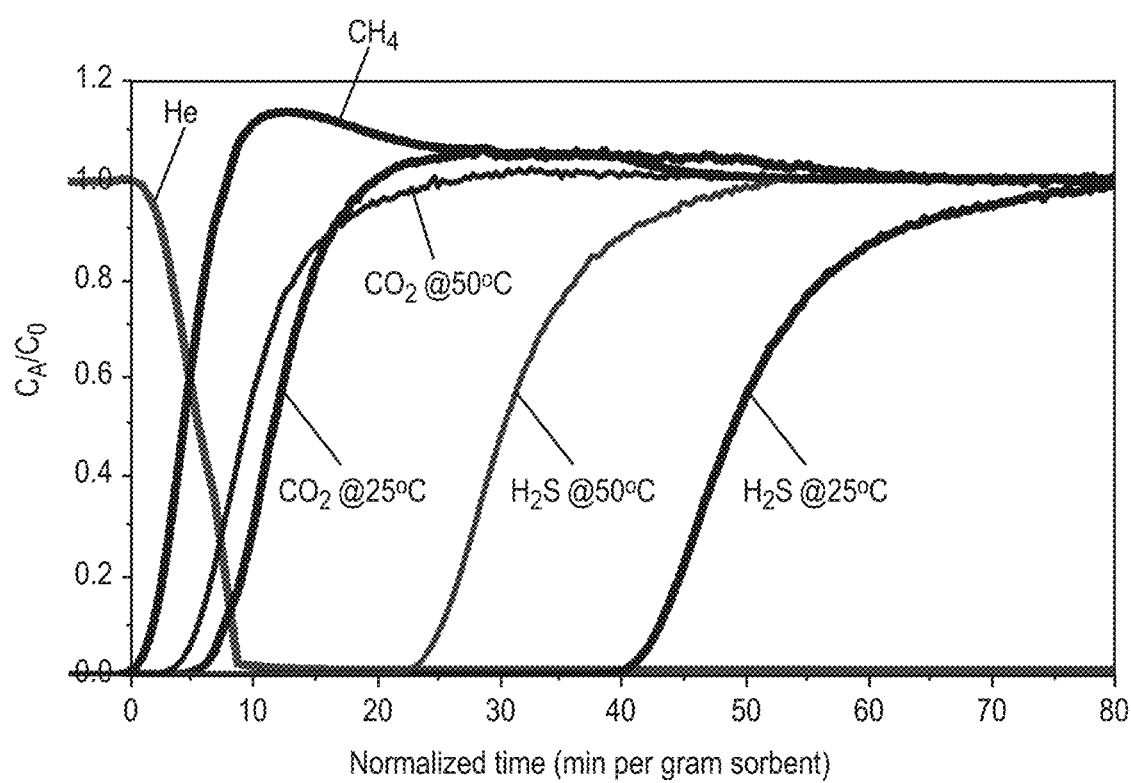
FIG. 39 is a graphical view of column breakthrough tests of $CO_2/H_2S/CH_4$:5/5/90 with 10 $cm^3/min$ flow rate on Ga-soc-MOF at 25° C. and 50° C. (1 bar) respectively using TSR mode (effect of adsorption temperature on the retention time), according to one or more embodiments of the present disclosure.

Using a $CO_2$/$H_2S$/$CH_4$:5/5/90 mixture at a flow rate of 10 $cm^3$/min and 25° C. in TSR mode, $H_2S$ and $CO_2$ were retained in the column for nearly 40 and 5 min, respectively. In contrast, as expected, $CH_4$ passed through the column almost instantly, reflecting the favorable selectivity for $H_2S$ over $CH_4$ and $CO_2$ ($H_2S$/$CH_4$ and $H_2S$/$CO_2$) (FIG. 39). Notably, the high selectivity toward $H_2S$ in $CH_4$-, $CO_2$- and $H_2$-containing gas streams, such as NG and syngas, is of prime importance in the NG and oil refining industry. The observed high selectivity for $H_2S$ of Ga-soc-MOF-1a can be explained by the favorable binding of $H_2S$ in the exposed and coordinatively unsaturated Ga open metal sites.

Figure 40:
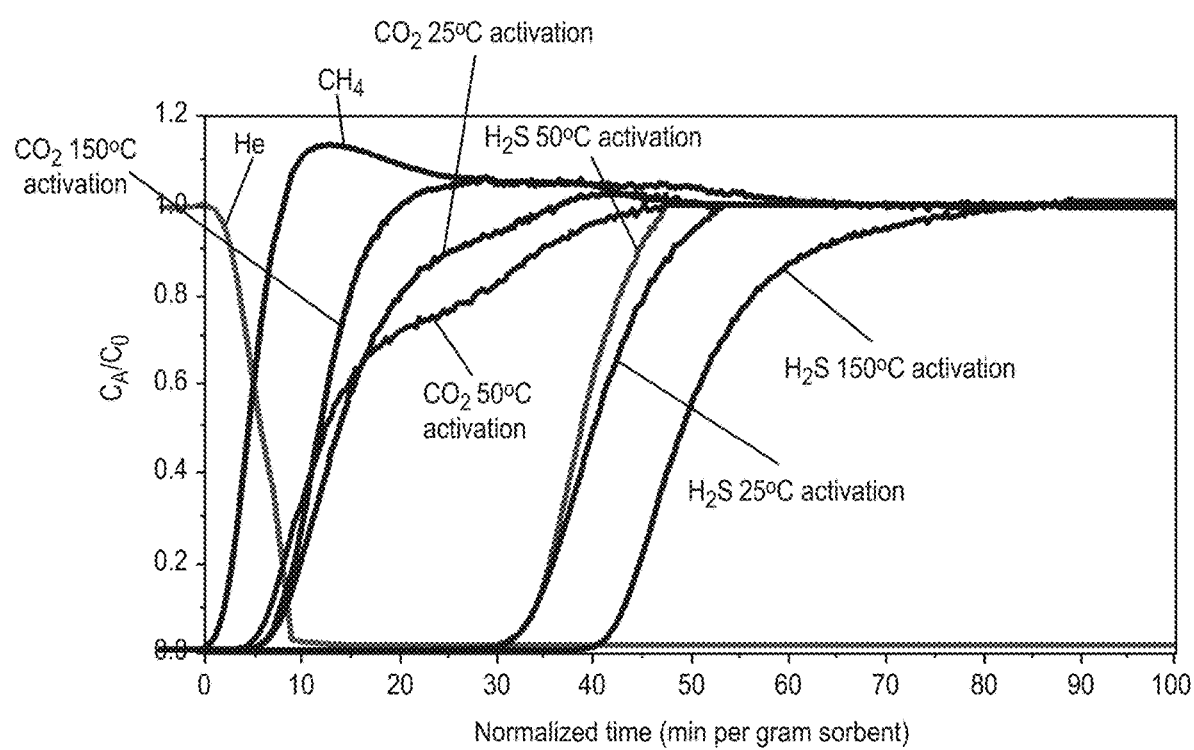
FIG. 40 is a graphical view of column breakthrough tests of $CO_2/H_2S/CH_4$:5/5/90 with 10 $cm^3/min$ flow rate on Ga-soc-MOF at 25° C. (1 bar) after activation at different temperatures (effect of activation temperature on retention time of different gases), according to one or more embodiments of the present disclosure.
Figure 41:
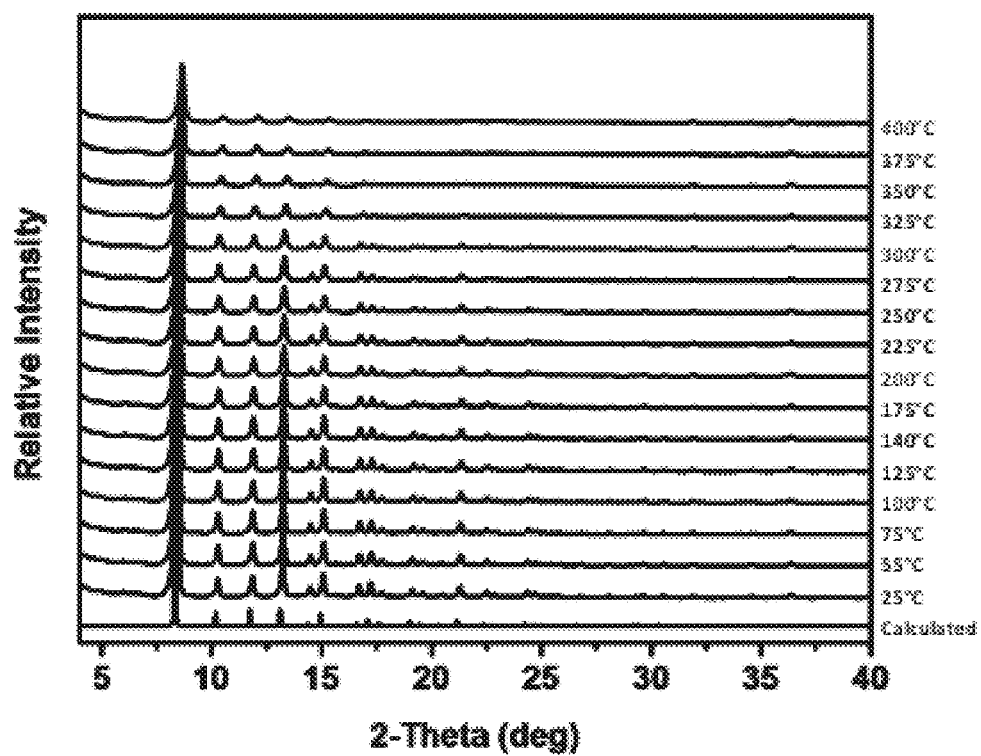
FIG. 41 is a graphical view of thermal stability of Al-soc-MOF-1d, according to one or more embodiments of the present disclosure.
Figure 42:
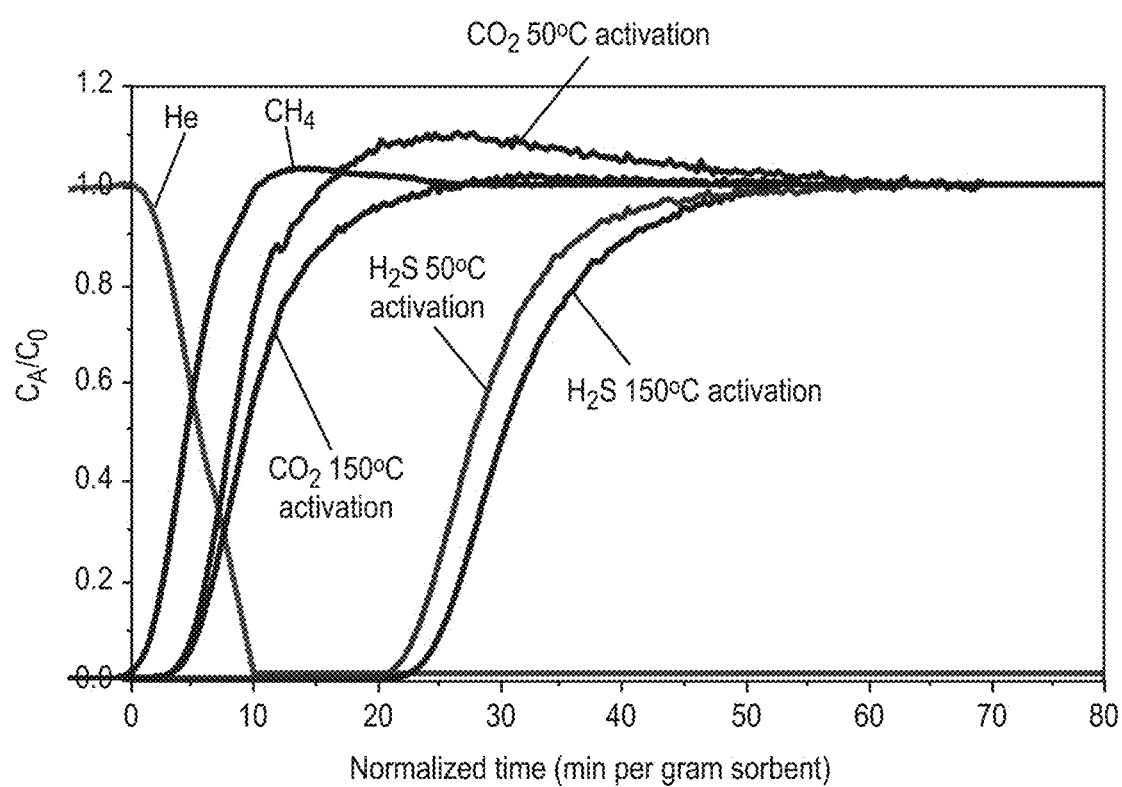
FIG. 42 is a graphical view of column breakthrough tests of $CO_2/H_2S/CH_4$:5/5/90 with 10 $cm^3/min$ flow rate on Ga-soc-MOF at 50° C. (1 bar) after activation at different temperatures (effect of activation temperature on retention time of different gases), according to one or more embodiments of the present disclosure.
Figure 43:
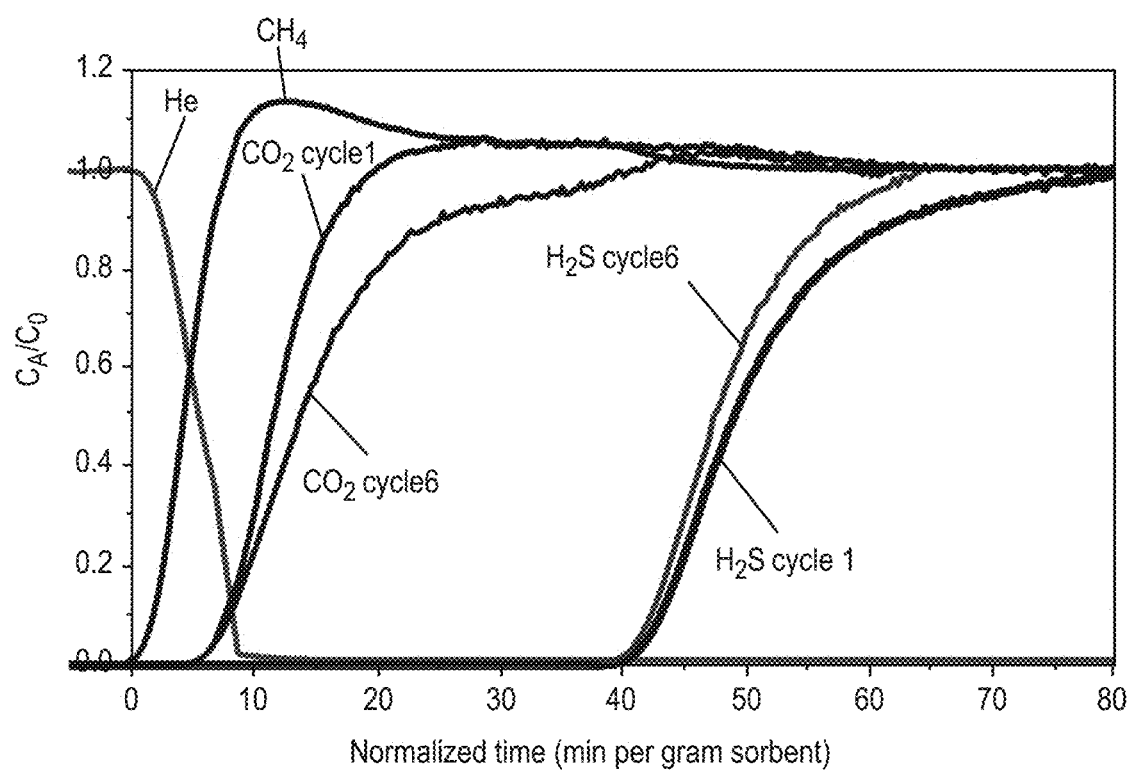
FIG. 43 is a graphical view of column breakthrough tests of $CO_2/H_2S/CH_4$:5/5/90 with 10 $cm^3/min$ flow rate on Ga-soc-MOF-1a at 25° C. (1 bar) after optimal activation (8 hours under flow of helium at 160° C. for cycles 1 and 5) with fresh sample and after five adsorption breakthrough cycles, confirming the recyclability of the material, where the conditions for adsorption-desorption cycles for 2, 3 and 4 are reported in FIG. 38, according to one or more embodiments of the present disclosure.

Heating the adsorption column during the second TSR cycle decreased the retention times to 24 and 3 min/g for $H_2S$ and $CO_2$, respectively (FIG. 40). FIG. 41 shows that TSR mode could be achieved using reactivation at 50° C. and that VSR mode can be deployed at 25° C. with only 25% loss of the $H_2S$ retention time and a slight de-crease in the $H_2S/CO_2$ selectivity. However, this conclusion was reached without considering the desorption kinetics. FIG. 42 demonstrates that the $H_2S$ and $CO_2$ uptakes and $H_2S/CO_2$ selectivity differed only slightly between the TSR and VSR modes when the adsorption was performed at 50° C. Finally, the reproducibility test (6th cycle) conducted after 5 adsorption-desorption tests (FIG. 43) revealed that the Ga-soc-MOF-1a exhibited reproducible $H_2S$ and $CO_2$ adsorption performances. All of the above results confirmed that Ga-soc-MOF-1a is a potential material for the subsequent removal of $H_2S$ and $CO_2$.

Cost Optimization of soc-MOFs

Figure 44A:
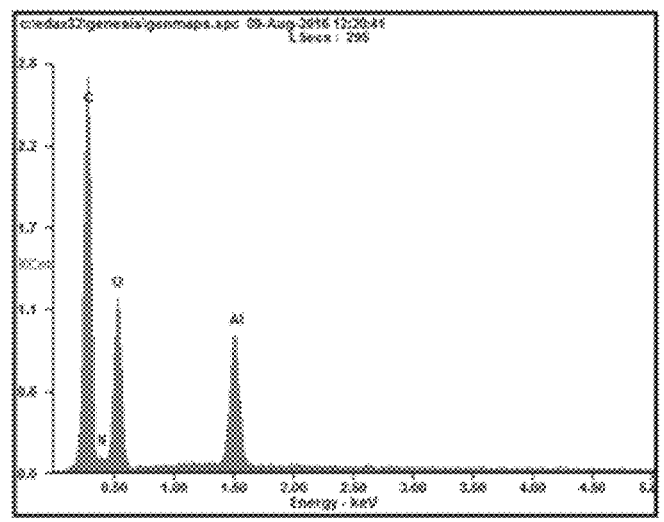
FIGS. 44A-44B are graphical views of (a) EDX data on Al-soc-MOF-1d confirming the absence of chloride; and (b) In-situ FTIR on dried Al-soc-MOF-1d confirming the presence of OH— as counter-ion, according to one or more embodiments of the present disclosure.
Figure 44B:
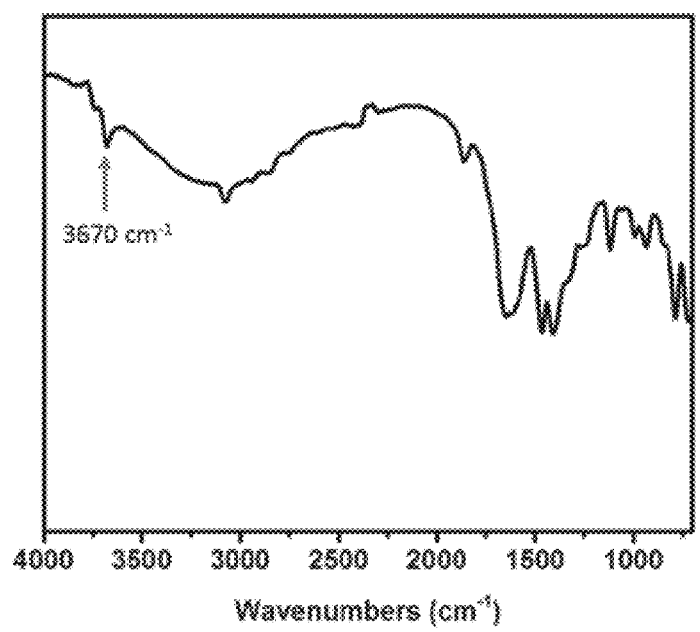
Figure 45:
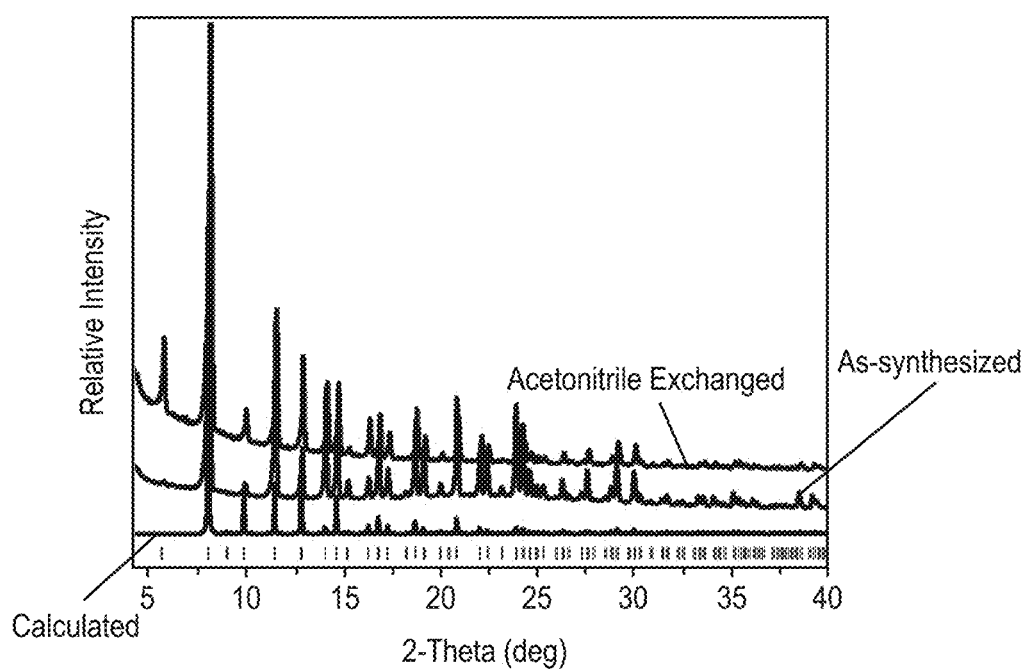
FIG. 45 is a graphical view of experimental and calculated PXRD patterns for Al-soc-MOF-1d, indicating the purity of the as-synthesized and acetonitrile exchanged samples, according to one or more embodiments of the present disclosure.
Figure 46:
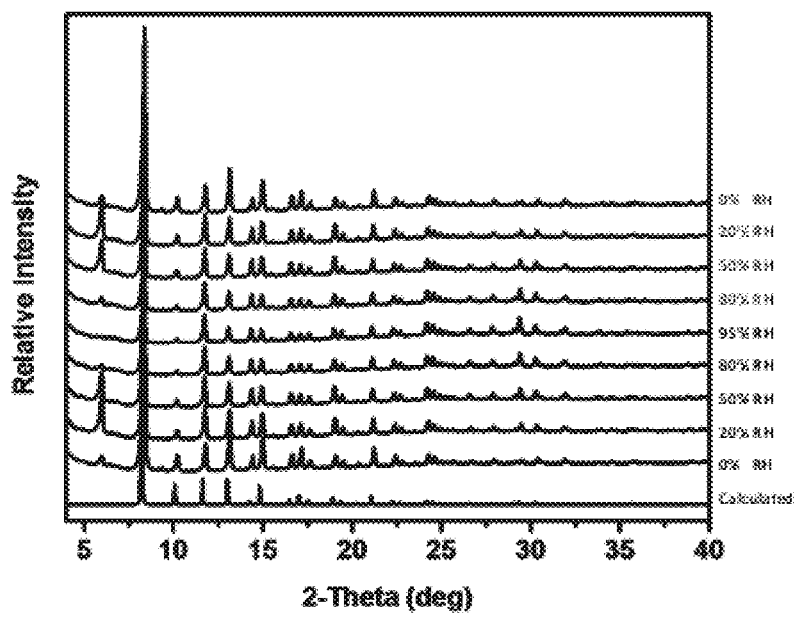
FIG. 46 is a graphical view of variable humidity PXRD on Al-soc-MOF-1d, according to one or more embodiments of the present disclosure.
Figure 47:
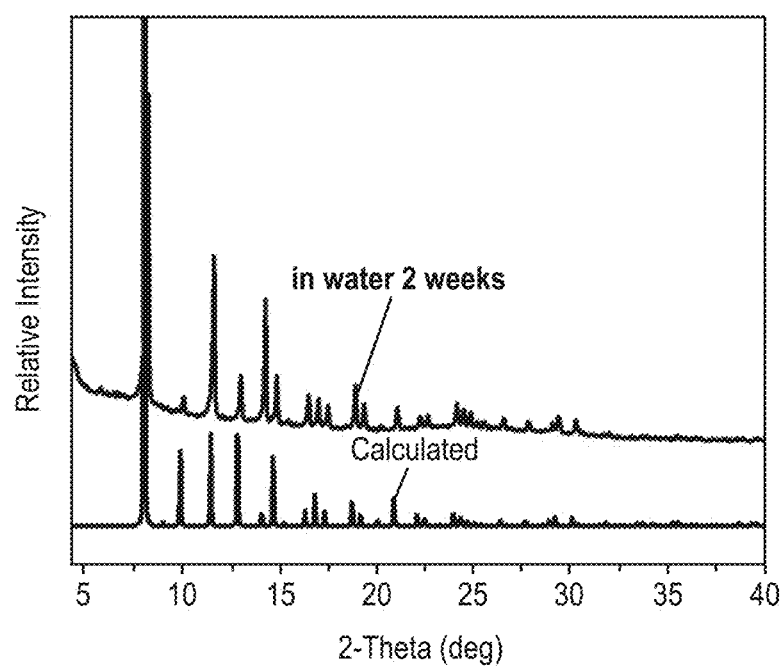
FIG. 47 is a graphical view of PXRD after soaking Al-soc-MOF-1d in liquid water for two weeks, according to one or more embodiments of the present disclosure.
Figure 48:
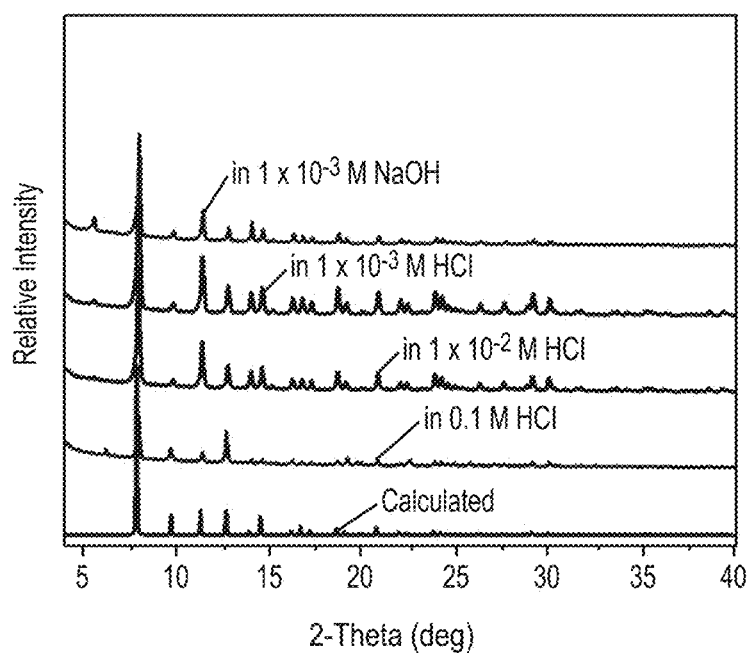
FIG. 48 is a graphical view of PXRD after soaking Al-soc-MOF-1d in different pH solutions for 6 days, according to one or more embodiments of the present disclosure.

To reduce the cost of adsorbents, MOFs based on the trinuclear aluminum(III) cluster were deliberately targeted. Importantly, MOFs based on the trinuclear Al(III) cluster $[Al_3(\mu_3-O)(O_2C—)_6]$, i.e., 6-connected MBBs, are very scarce, and only a few examples have been reported in the literature because of challenges in identifying reaction conditions that allow the in situ formation of the inorganic MBB. After countless attempts, the appropriate reaction conditions, as described herein, that consistently allow the in situ formation of the desired trinuclear aluminum(III) MBB (i.e., $[Al_3(\mu_3-O)(O_2C—)_6]$) and, consequently, the aluminum soc-MOF analogue with the following formula: $[A_3O(ABTC)1.5(OH)(H_2O)_2]$, were successfully isolated. In this case, the counter ion was not chloride, as was anticipated, but OH—, as evidenced by energy-dispersive X-ray spectroscopy (EDX) and in situ Fourier transform infrared (FTIR) studies (FIGS. 44A-44B). The phase purity of Al-soc-MOF-1d was confirmed by similarities between the experimental and calculated powder X-ray diffraction (PXRD) patterns (FIG. 45). Conventional activation conditions showed that the hosted guest molecules within the pores were easily removed using traditional approaches (i.e., vacuum and heating) without altering the microporosity of the overall framework. The lowest and highest optimal activation temperatures were found to be 130 and 220° C., respectively. Variable temperature (FIG. 41) and humidity (FIG. 46) PXRD tests revealed that Al-soc-MOF-1d exhibited outstanding thermal stability and high tolerance to water vapor. The stability of the framework in liquid water and different pH solutions was confirmed by soaking Al-soc-MOF-1d in aqueous solutions for 2 weeks (FIG. 47) and 6 days, respectively (FIG. 48).

Figure 49:
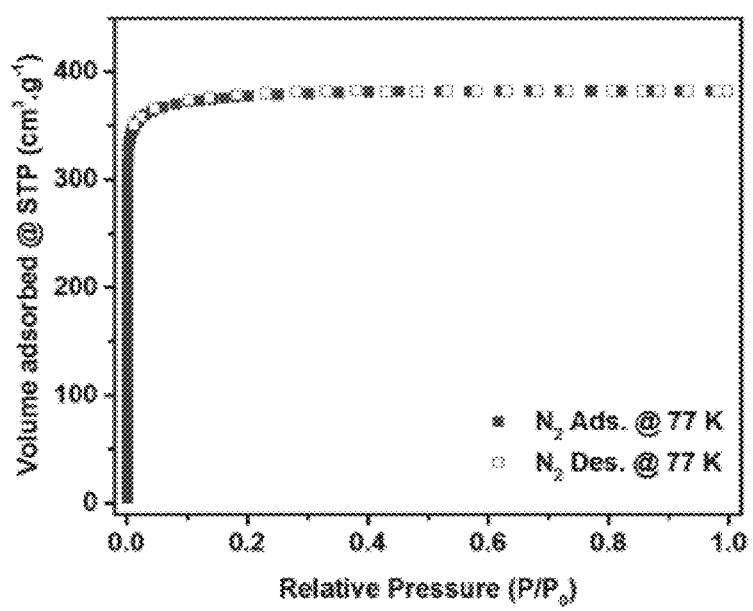
FIG. 49 is a graphical view of $N_2$ adsorption at 77 K on Al-soc-MOF-1d, according to one or more embodiments of the present disclosure.
Figure 50:
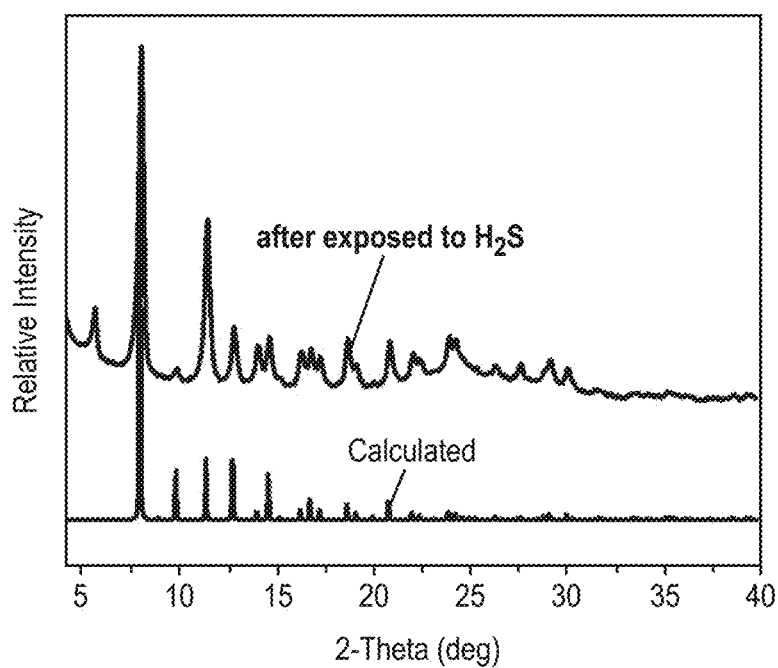
FIG. 50 is a graphical view of PXRD after exposure of Al-soc-MOF-1d to $H_2S$, according to one or more embodiments of the present disclosure.
Figure 51:
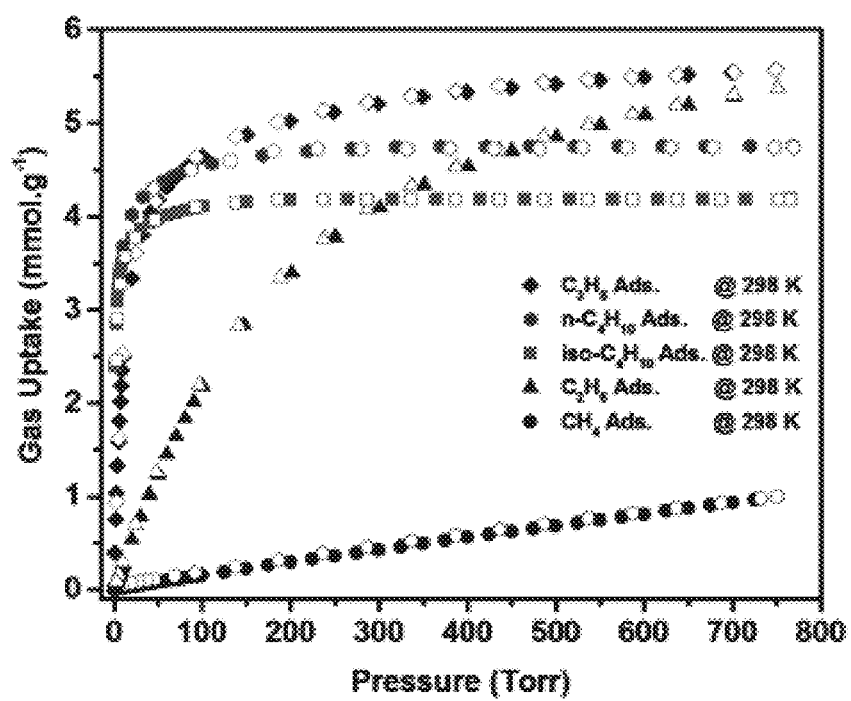
FIG. 51 is a graphical view of adsorption of $CH_4$, $C_2H_6$, $C_3H_8$, n-$C_4H_{10}$ and iso-$C_4H_{10}$ on Al-soc-MOF-1d, according to one or more embodiments of the present disclosure.
Figure 52:
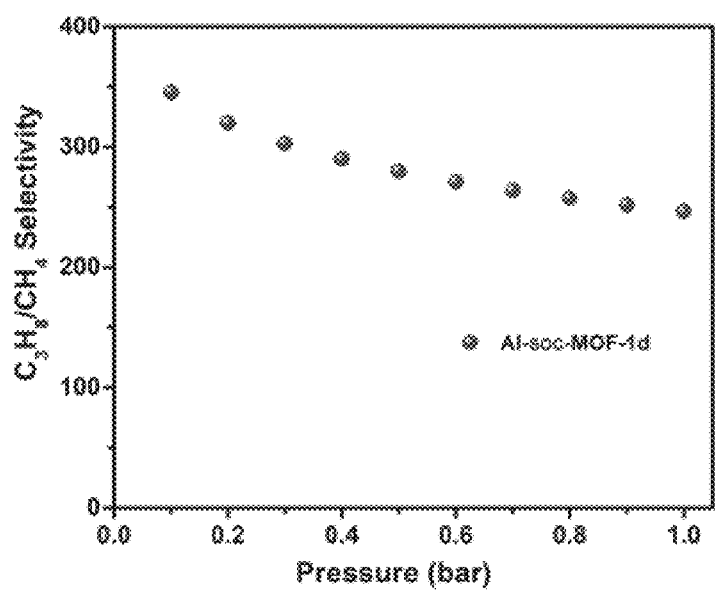
FIG. 52 is a graphical view of $C_3H_8/CH_4$ selectivity using Al-soc-MOF-1d predicted using IAST combined with Toth Model, according to one or more embodiments of the present disclosure.
Figure 53:
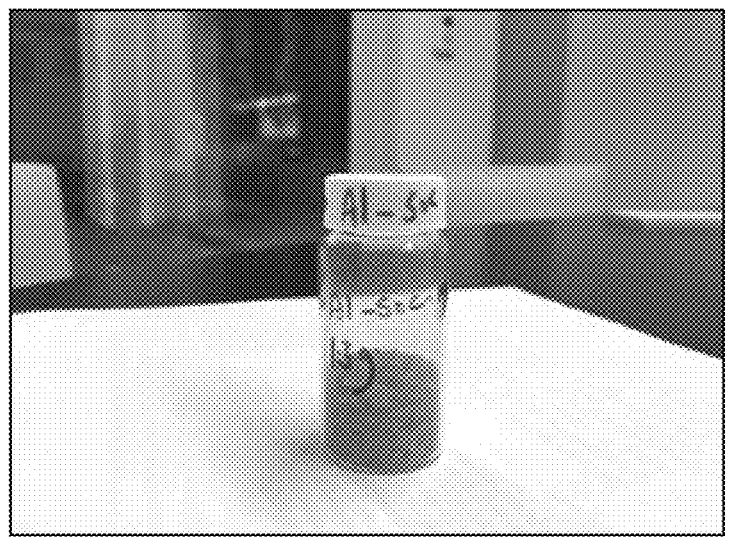
FIG. 53 is a picture of vial containing Al-soc-MOF-1d bulk material scaled up to 1 g, according to one or more embodiments of the present disclosure.

Nitrogen ($N_2$) adsorption measurements at 77 K were conducted on the acetonitrile exchanged samples and generated a fully reversible type-I isotherm representative of porous materials with permanent microporosity (FIG. 49). The apparent Brunauer-Emmett-Teller (BET) surface area and the pore volume were estimated and found to be 1500 $m^2/g$ and 0.56 $cm^3/g$, respectively. Because an adsorbent must have stability toward $H_2S$ to be used for NG and ROG upgrading, the tolerance of Al-soc-MOF-1d to $H_2S$ was investigated (FIG. 50). Similar to Ga-soc-MOF-1a, the PXRD patterns after the exposure to and adsorption of $H_2S$ showed that the aluminum analogue had the requisite tolerance to $H_2S$. Analyzing the $CH_4$, $CO_2$ and $C_{2+}$ single-gas adsorption data revealed that Al-soc-MOF-1d exhibited selective $C_{2+}/CH_4$ separation, as found for Ga-soc-MOF-1a (FIGS. 51-52). The successful synthesis of Al-soc-MOF-1d and its unique separation properties and stability in the presence of $H_2S$ make this material a prospective alternative to the unstable and relatively expensive isostructural Fe and In analogues, respectively. Initial attempts to scale-up the soc-MOF synthesis have afforded Al-soc-MOF-1d in gram quantities (FIG. 53).

soc-MOF Thin-Film Membrane

Figure 54A:
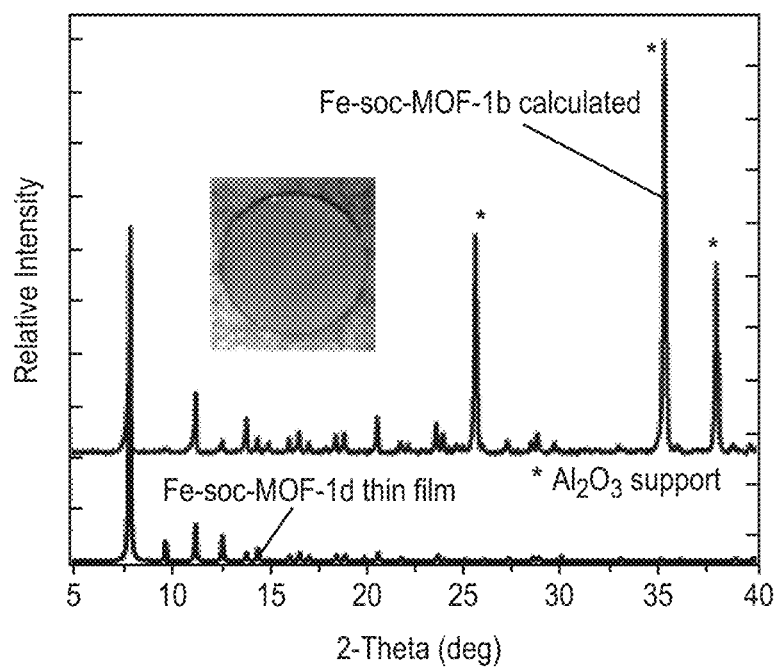
FIGS. 54A-54B are (a) an image of Fe-soc-MOF-1b membrane grown on alumina support and its PXRD pattern compared to the bulk material; and (b) a top-view (a, b and c) and (d) cross-sectional SEM images of the Fe-soc-MOF membrane grown on the alumina support, according to one or more embodiments of the present disclosure.
Figure 54B:
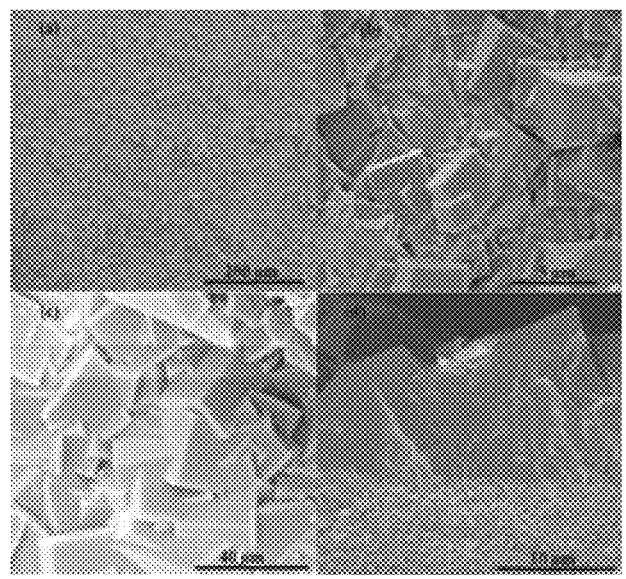
Figure 55:
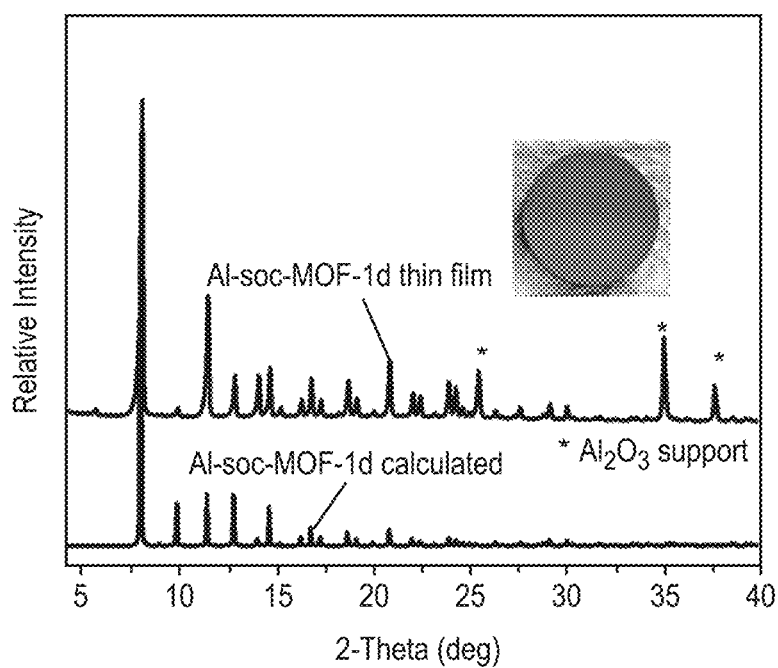
FIG. 55 is an image of Al-soc-MOF-1d membrane grown on alumina support and its associated powder X-ray diffraction as compared to the bulk material, according to one or more embodiments of the present disclosure.
Figure 56:
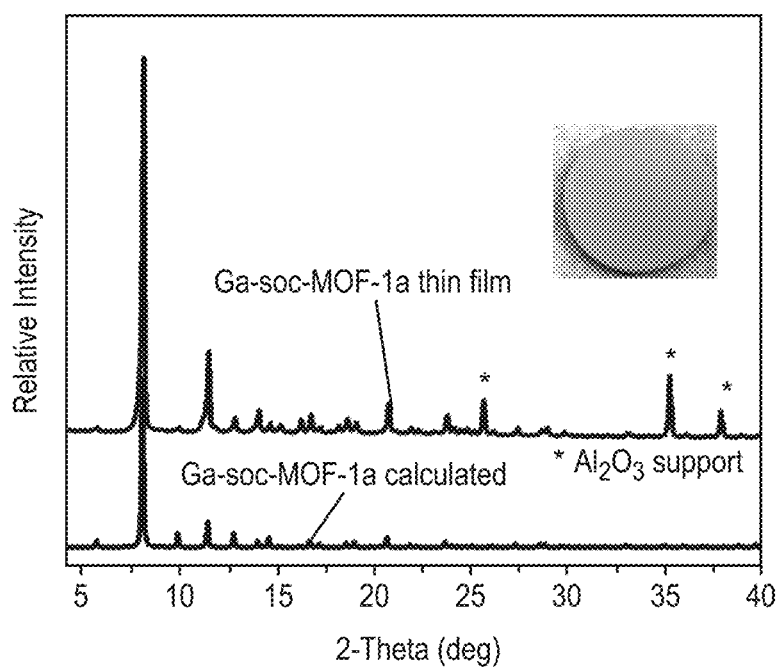
FIG. 56 is an image of Ga-soc-MOF-1a membrane grown on alumina support and its associated powder X-ray diffraction as compared to the bulk material, according to one or more embodiments of the present disclosure.
Figure 57A:
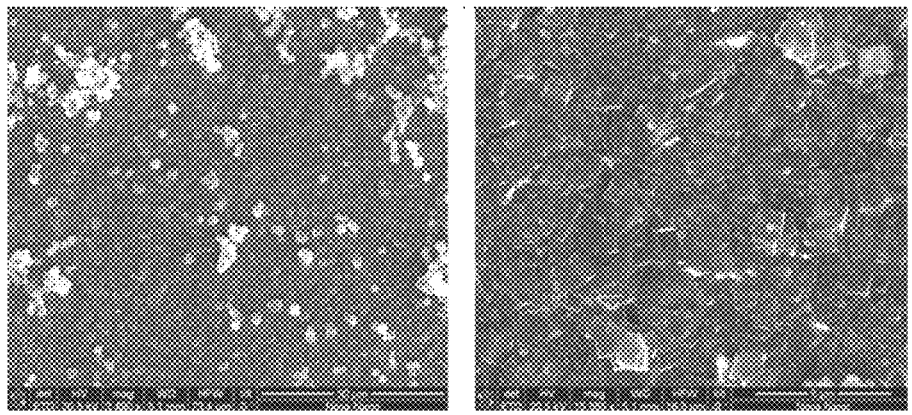
FIGS. 57A-57B are (a) top-view SEM images of the Ga-soc-MOF-1a membranes grown on the alumina support and (b) cross section image of the membrane, according to one or more embodiments of the present disclosure.
Figure 57B:
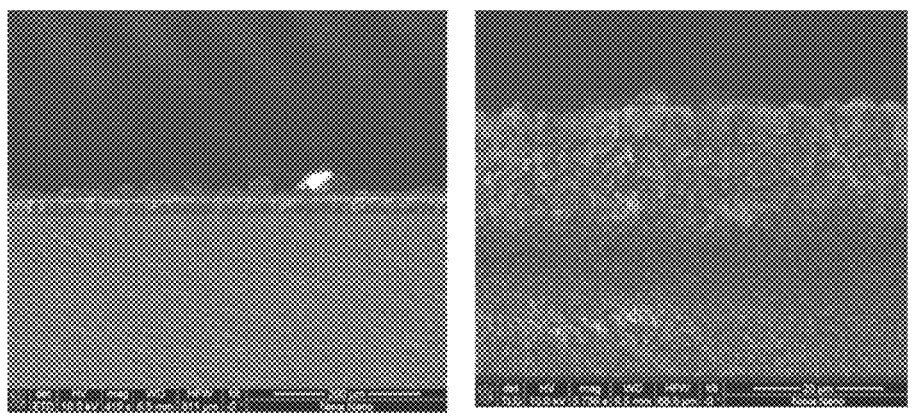

In adsorption technology, adsorbents are employed in bulk crystal/pellet forms or as particles in a fixed or moving bed column. The application of suitable separation agents as thin films, as in membrane technology, is another promising pathway that could offer many benefits, particularly with regard to enhancing the productivity and reducing the footprint/capital costs. Non-porous or low-porosity polymeric materials have been successfully fabricated as membranes and proven to be easily deployed in many challenging gas separation applica-tions. In contrast, only a limited number of studies have addressed the fabrication of continuous MOF thin films as membranes, although MOF thin films have been reported for many other applications. Given the interesting separation properties of the soc-MOF platform, efforts were dedicated to fabricating soc-MOF based membranes and evaluating their associated properties for gas separations in general and for ROG in particular. As a proof of concept, the crystal intergrowth approach was employed for the film fabrication of the Fe(III) (FIGS. 54A-54B) and Al(III) (FIG. 55) soc-MOF analogues. The controlled deposition of relatively uniform crystals of the soc-MOF on a highly porous alumina support led to the fabrication of a close thin film. FIGS. 54A-54B depict the well-intergrown and densely packed soc-MOF crystallites (≤1-5 μm) on the porous support surface with no evidence of macro-sized cracks or defects. The cross-sectional scanning electron microscopy (SEM) image supported the growth of a continuous thin film. The PXRD patterns of the resulting membrane revealed the growth of the respective pure soc-MOF phase (see FIG. 54A). The SEM images (FIG. 54B) reflected the continuity of the Fe-soc-MOF-1b thin-film membrane and facilitated precisely deriving the film thickness. Similarly, other soc-MOF analogues (Ga and Al) were grown as continuous closed thin films (FIG. 56), as confirmed by their PXRD patterns and SEM images (FIG. 57A-57B).

Figure 58B:
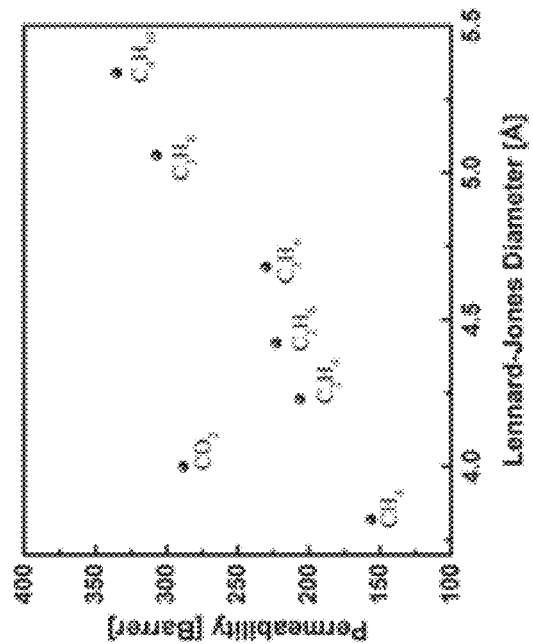
FIGS. 58A-58B are graphical views of permeation properties of Fe-soc-MOF-1b as a function of the kinetic diameters of $H_2$, $O_2$, $N_2$, $CH_4$, $CO_2$, $C_2H_4$, $C_2H_6$, $C_3H_6$, $C_3H_8$ and n-$C_4H_{10}$, according to one or more embodiments of the present disclosure.
Figure 58A:
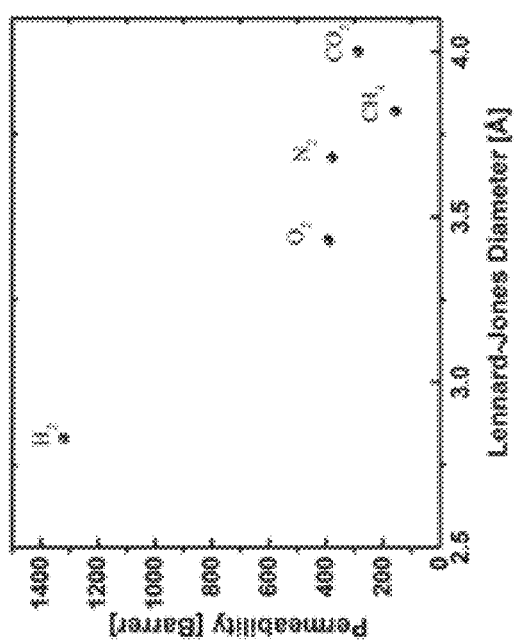
Figures 59A, 59B:
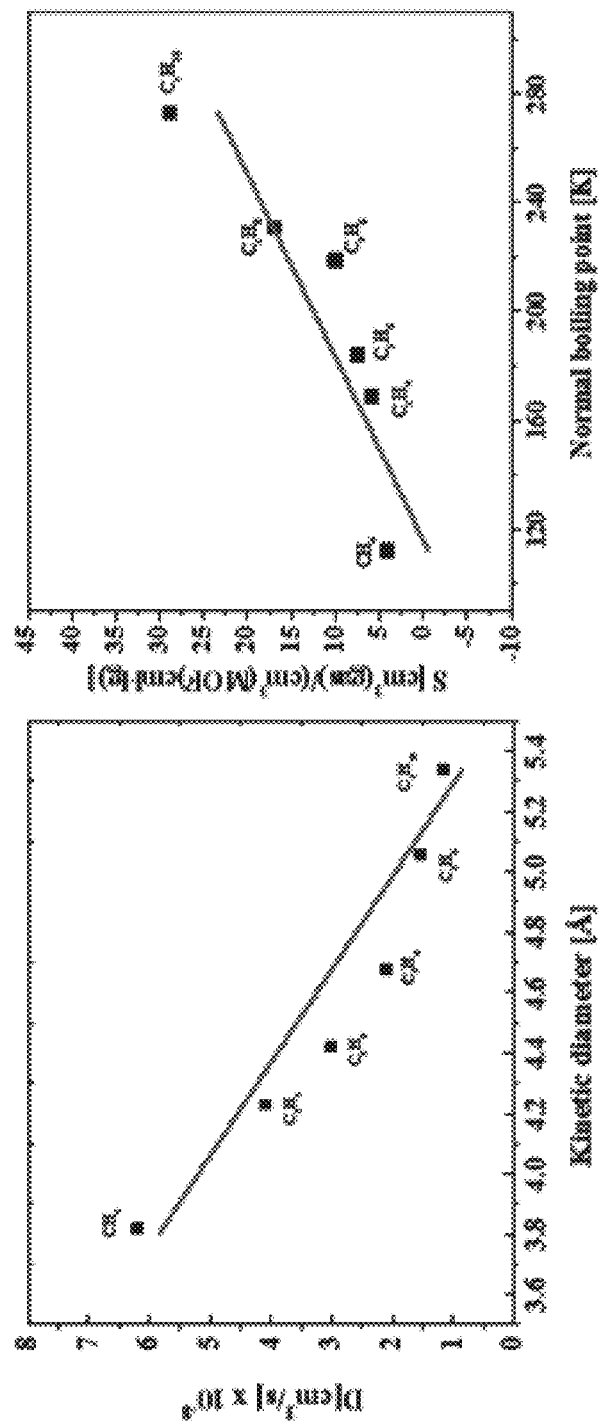
FIGS. 59A-59B are graphical views of (a) diffusion coefficient vs kinetic Diameter, and (b) Adsorption coefficient vs. Normal boiling point for Fe-soc-MOF-1a, according to one or more embodiments of the present disclosure.

The Fe-soc-MOF-1b thin-film membrane was selected as a case study for gas permeation measurements and evaluations of the associated gas transport properties. The permeation results for $H_2$, $O_2$, $N_2$, $CH_4$, $CO_2$, $C_2H_4$, $C_2H_6$, $C_3H_6$, $C_3H_8$ and $C_4H_{10}$ on various Fe-soc-MOF-1b membranes were determined to be reproducible. Notably, the permeability decreased as the Leonard-Jones diameter of the molecules increased from $H_2$ to $CH_4$. However, as the boiling point of the component increased, as exemplified by $C_2H_4$, $C_2H_6$, $C_3H_6$, $C_3H_8$ and n-$C_4H_{10}$, the permeability increased (FIGS. 58A-58B). Evaluating the solubility and diffusivity coefficients derived from the time lag tests (FIGS. 59A-59B) revealed that the increase in the permeability for $C_{2+}$ hydrocarbon was mainly attributable to the solubility effect, whereas the driving force based on diffusivity was not significant. The resulting ideal selectivity of $H_2/CH_4$ was high; however, most of the permeation of the ROG components was found to follow the Knudsen regime (Table 7). Although a high (almost infinite) n-$C_4H_{10}/CH_4$ adsorption selectivity was reported for the bulk Fe-soc-MOF-1b, the corresponding permeation selectivity of the continuous Fe-soc-MOF-1b membrane was only 2.2. This result was explained by the relatively large pore size aperture of the one-dimensional channels in the soc-MOF relative to the dimensions of the scarcely reported pure continuous MOF membranes, such as sod-ZMOFs. These findings suggested that adsorbent materials with very promising separation properties as bulk solids may not always retain their separation abilities as membranes. This observation/assessment was extremely critical for the selection of MOF materials as potential fillers/adsorbents in mixed-matrix mem-branes.

TABLE 7

Ideal selectivity for different gas mixtures calculated from single gas permeabilities

| Gas mixture | Ideal selectivity |
|---|---|
| $H_2/CO_2$ | 4.6 |
| $H_2N_2$ | 3.8 |
| $CO_2/CH_4$ | 1.8 |
| $C_2H_6/C_2H_4$ | 1.1 |
| $C_3H_8/C_3H_6$ | 1.3 |
| $C_4H_{10}/CH_4$ | 2.2 |

In sum, for the first time, the structure/separation property relationships for a series of isostructural MOFs with soc-topology were elucidated. $In^{3+}$-, $Fe^{3+}$-, $Ga^{3+}$- and $Al^{3+}$-based soc-MOFs were extensively studied as adsorbents and thin-film membranes for the separation-based production of high-quality hydrocarbons ($CH_4$, $C_3H_8$ and n-$C_4H_{10}$) and olefins from $H_2S$-containing gas streams. The combined features, which are rarely found in a single equilibrium-based separation agent, are necessary to fulfill the strict stability and selectivity requirements for producing high-purity $H_2$, $CH_4$ and $C_{2+}$ fractions at high rates. All of the soc-MOF analogues were shown to exhibit high selectivity for $C_2H_4$, $C_3H_6$ and n-$C_4H_{10}$. In particular, the Fe(III), Ga(III) and Al(III) analogues showed relatively enhanced $C_{2+}/CH_4$ adsorption selectivities. This finding was confirmed by GCMC simulations performed for the n-$C_4H_{10}$/$CH_4$ mixture, which indicated that the separation was mainly thermodynamically driven. Importantly, the Ga(III) and Al(III) analogues may be preferable given their high tolerance to $H_2S$. The Ga-soc-MOF-analogue was further examined for the selective adsorption of $H_2S$ in $CO_2$- and $CH_4$-containing streams, such as ROG and NG. Furthermore, the successful formation of a soc-MOF-1 separation agent based on abundant and inexpensive aluminum metal was described Subsequently, the possibility of scaling this material at a relatively low cost was thus practical. Additionally, it was determined that the judicious selection of an appropriate intra-framework metal for the construction of the soc-MOF adsorbent was vital for tuning the gas selectivity and tolerance to $H_2S$, which are prerequisites in various stages of ROG and NG upgrading. Finally, various soc-MOF analogues were deposited on a porous alumina support to produce continuous and defect-free films, and their gas permeation properties were evaluated. Notably, the permeation studies on the soc-MOF films are the first to offer insight into the structure/property relationships for MOF membranes in terms of the observed properties of bulk MOF adsorbents.

TABLE 8

Crystal datea and refinement conditions of Al-soc-MOP-1d

| | |
|---|---|
| Identification code | Al-soc-MOF-1d |
| Empirical formula | $C_{24}H_{17}Al_3N_3O_{17.5}$ |
| Formula weight | 708.34 |
| Crystal system, space group | Cubic, P─43n |
| Unit cell dimensions | a = 21.4934(5) Å |
| Volume | 9929.2(7) Å$^3$ |
| Z, calculated density | 8, 0.948 Mg m$^{-3}$ |
| F(000) | 2888 |
| Temperature (K.) | 100.0(1) |
| Radiation type | Cu K□ |
| Absorption coefficient | 1.18 mm$^{-1}$ |
| Absorption correction | Multi-scan |
| Max and min transmission | 0.653 and 0.753 |
| Crystal size | 0.01 × 0.02 × 0.02 mm |
| Shape color | Square pyramid, yellow |
| θrange for data collection | 5.0-65.5° |
| Limiting indices | $-22 \leq h \leq 21, -25 \leq k \leq 24, -25 \leq l \leq 23$ |
| Reflection collected/unique/ observed with I > 2σ(I) | 34324/2916 ($R_{int}$ = 0.041)/2806 |
| Completeness to $\square_{max}$ = 40.0° | 99.3% |
| Refinement method | Full-matrix least-squares on F$^2$ |
| Data/restraints/parameters | 2916/3/154 |
| Final R indices [I > 2□(I)] | $R_1$ = 0.033, w$R_2$ = 0.089 |
| Final R indices (all data) | $R_1$ = 0.034, w$R_2$ = 0.090 |
| Weighting scheme | $[\sigma^2(F_o^2) + (0.0644P)^2 + 1.4289P]^{-1}$* |
| Goodness-of-fit | 1.02 |
| Largest diff peak and hole | 0.32 and −0.25 e Å$^{-3}$ |

*P = ($F_o^2$ + 2Fc$^2$)/3

Example 2

Synthesis of Indium-soc-MOF

Figure 60:
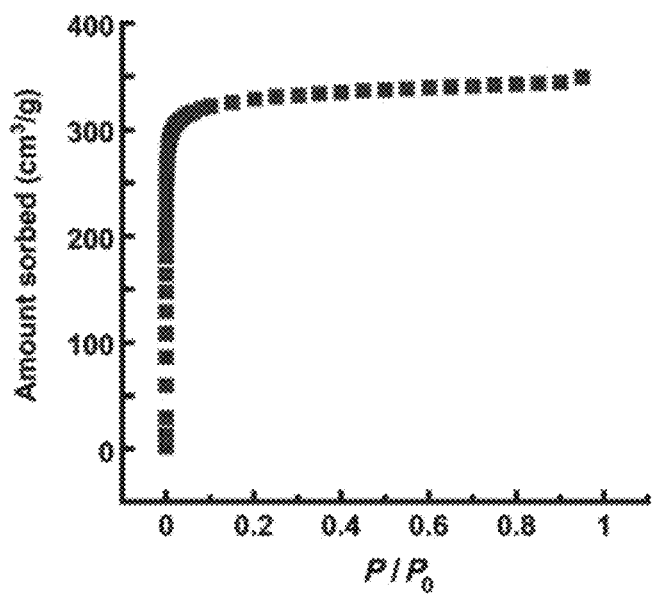
FIG. 60 is a graphical view of the results of a $N_2$ adsorption/desorption study for a M-soc-MOF, according to one or more embodiments of the present disclosure.

In this example, an In-soc-MOF formulated as [$In_3O$ ($C_{16}N2O_8H_6$)$_{1.5}$($H_2O$)$_3$]($H_2O$)$_3$($NO_3$) was synthesized by reacting 3,3',5,5'-azobenzenetetracarboxylic acid and $In(NO_3)_3 \cdot 2H_2O$ in a N,N-dimethylformamide (DMF)/$CH_3CN$ solution in the presence of piperazine. The resulting In-soc-MOF consisted of orange polyhedral crystals. It's structure included indium trimer building blocks, each trimer containing three {$InO_5(H_2O)$} octahedra sharing one central m3-oxo anions, and networked by six separate 3,3', 5,5'-azobenzenetetracarboxylate ligands. The total solvent-accessible volume for the In-soc-MOF was determined to be 57.2% by summing voxels more than 1.2 Å away from the framework using PLATON software. FIG. 60 illustrates the results of a $N_2$ adsorption/desorption study, which revealed a reversible type I isotherm with no hysteresis. Such results are characteristic of a microporous material with homogeneous pores. The estimated Langmuir surface area and pore volume for In-soc-MOF are 1417 m2 g$^{-1}$ and 0.50 cm3 g$^{-1}$, respectively.

Other interesting structural features of the crystalline In-soc-MOF structure are the two types of infinite channels. The first type is hydrophilic, because the water molecules coordinated to the indium centers are pointed inside these channels. Guest water molecules occupy the remaining free volume in these channels and form hydrogen bonds with coordinated water molecules. The second type of channels have a diameter of approximately 1 nm diameter, and are guest-free as-synthesized.

The synthesis methods of this study are generally applicable to similar M-soc-MOFs, including those with lighter trivalent metals.

Example 3

CO$_2$ and H$_2$ Sorption by Gallium-soc-MOF

This example utilizes use of metal organic frameworks as sorbents for use in simultaneous or subsequent removal of CO$_2$ and H$_2$S. The Ga-soc-MOF in question is constructed based on the assembly of Gallium-carboxylate trimer molecular building block (TMBB) and 3,3',5,5'-azobenzenetetracarboxylate. The oxygen-centered gallium-carboxylate TMBB, [Ga$_3$O(CO$_2$)$_6$(H$_2$O)$_3$] comprises a 6-connected node having trigonal-prismatic geometry networked by 3,3',5,5'-azobenzenetetracarboxylate tetradentate ligands.

Figure 61:
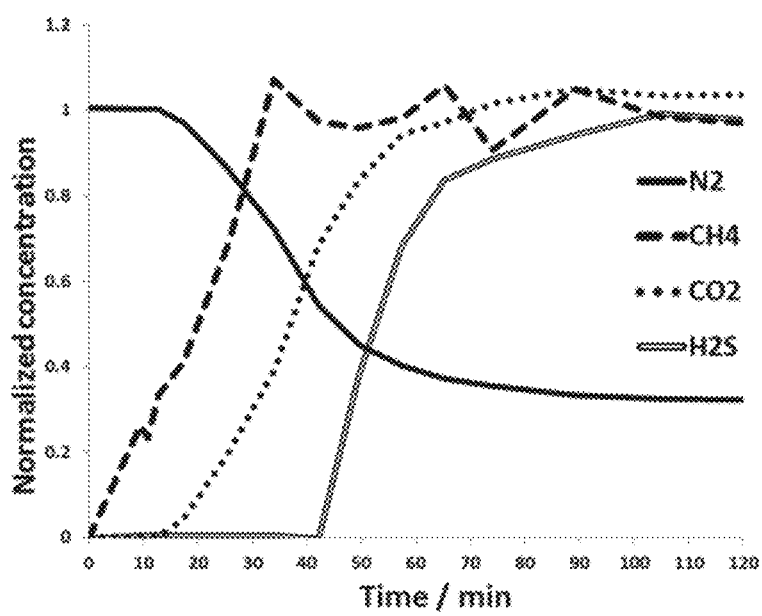
FIG. 61 is a graphical view of a $H_2S/CO_2/N_2/CH_4$:1/30/10/59 mixture adsorption data for a Ga-soc-MOF, according to one or more embodiments of the present disclosure.
Figure 62:
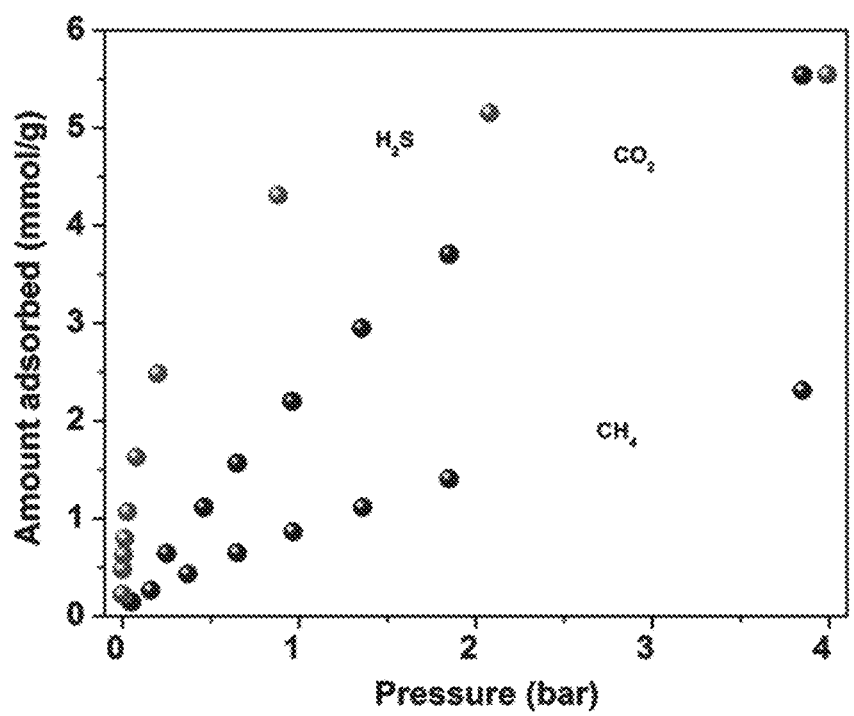
FIG. 62 is a graphical view of $CO_2$, $H_2S$, and $CH_4$ adsorption isotherms at 25° C. for the Ga-soc-MOF, according to one or more embodiments of the present disclosure.

FIG. 61 illustrates H$_2$S/CO$_2$/N$_2$/CH$_4$:1/30/10/59 mixture adsorption experiments performed in a column breakthrough set-up. The Ga-soc-MOF adsorbed H$_2$S and CO$_2$ from CH$_4$ with high selectivity. The 1% (of 15 ml/min) H$_2$S was retained for 40 min, while 30% CO$_2$ (of 15 ml/min) was retained for about 15 minutes, indicative of the potential of selective removal of H$_2$S and CO$_2$ from CH$_4$ containing gas streams. FIG. 62 illustrates CO$_2$, H$_2$S, and CH$_4$ adsorption isotherms at 25° C. for the Ga-soc-MOF, indicating selectivity for CO$_2$ and H$_2$S over CH$_4$.

Other embodiments of the present disclosure are possible. Although the description above contains much specificity, these should not be construed as limiting the scope of the disclosure, but as merely providing illustrations of some of the presently preferred embodiments of this disclosure. It is also contemplated that various combinations or sub-combinations of the specific features and aspects of the embodiments may be made and still fall within the scope of this disclosure. It should be understood that various features and aspects of the disclosed embodiments can be combined with or substituted for one another in order to form various embodiments. Thus, it is intended that the scope of at least some of the present disclosure should not be limited by the particular disclosed embodiments described above.

Thus the scope of this disclosure should be determined by the appended claims and their legal equivalents. Therefore, it will be appreciated that the scope of the present disclosure fully encompasses other embodiments which may become obvious to those skilled in the art, and that the scope of the present disclosure is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims.

The foregoing description of various preferred embodiments of the disclosure have been presented for purposes of illustration and description. It is not intended to be exhaustive or to limit the disclosure to the precise embodiments, and obviously many modifications and variations are possible in light of the above teaching. The example embodiments, as described above, were chosen and described in order to best explain the principles of the disclosure and its practical application to thereby enable others skilled in the art to best utilize the disclosure in various embodiments and with various modifications as are suited to the particular use contemplated. It is intended that the scope of the disclosure be defined by the claims appended hereto Various examples have been described. These and other examples are within the scope of the following claims.

What is claimed is:

1. A method of sorbing one or more compounds from a H$_2$S—containing fluid, comprising:
    contacting a M-soc-MOF composition with a fluid containing at least H$_2$S and one or more C$_{2+}$ compounds, wherein the M-soc-MOF composition is a continuous thin film on a support; and
    sorbing at least one of the one or more C$_{2+}$ compounds from the fluid.

2. The method of claim 1, wherein the fluid is one or more of refinery-off gases and natural gas.

3. The method of claim 1, wherein the metal of the M-soc-MOF is one or more of In$^{3+}$, Fe$^{3+}$, Ga$^{3+}$, and Al$^{3+}$.

4. The method of claim 1, wherein a ligand of the M-soc-MOF is 3,3',5,5'-azobenzenetetracarboxylate.

5. The method of claim 1, wherein an extra-framework counter-ion of the M-soc-MOF is one or more of NO$_3^-$, Cl$^-$, Br$^-$, and OH$^-$.

6. The method of claim 1, wherein the M-soc-MOF is one or more of Fe-soc-MOF, Ga-soc-MOF, and Al-soc-MOF.

7. The method of claim 1, wherein the C$_{2+}$ compounds include one or more of C$_2$H$_6$, C$_2$H$_4$, C$_3$H$_6$, C$_3$H$_8$, and n-C$_4$H$_{10}$.

8. The method of claim 1, wherein the fluid further comprises one or more of CH$_4$, H$_2$, and N$_2$.

9. The method of claim 1, wherein the M-soc-MOF exhibits a selectivity for C$_{2+}$ over CH$_4$, H$_2$, and N$_2$.

10. A method of sorbing one or more compounds from a H$_2$S-containing fluid, comprising:
    contacting a M-soc-MOF composition with a fluid containing at least H$_2$S and one or more C$_{2+}$ compounds, wherein the M-soc-MOF composition is a continuous thin film on a porous alumina support; and
    sorbing at least one of the one or more C$_{2+}$ compounds from the fluid.

* * * * *